(12) United States Patent
Bennington et al.

(10) Patent No.: US 12,517,264 B2
(45) Date of Patent: Jan. 6, 2026

(54) ARCHITECTURE FOR PROVIDING FORECASTS OF LOW EARTH ORBIT (LEO) SATELLITE OBSCURATION AND MULTIPATH

(71) Applicant: Spirent Communications Plc, Paignton (GB)

(72) Inventors: Jeremy C. Bennington, Greenwood, IN (US); Paul Hansen, Cambridge (GB); Esther Anyaegbu, Northampton (GB); Samuel Nardoni, Paignton (GB); Matthew Pottle, Paignton (GB)

(73) Assignee: Spirent Communications Plc, West Sussex (GB)

( * ) Notice: Subject to any disclaimer, the term of this patent is extended or adjusted under 35 U.S.C. 154(b) by 292 days.

(21) Appl. No.: 18/369,114

(22) Filed: Sep. 15, 2023

(65) Prior Publication Data
US 2024/0103181 A1    Mar. 28, 2024

Related U.S. Application Data

(63) Continuation-in-part of application No. 17/948,190, filed on Sep. 19, 2022, now Pat. No. 12,282,101, and
(Continued)

(51) Int. Cl.
*G01S 19/25* (2010.01)
*H04B 7/19* (2006.01)
*H04B 7/195* (2006.01)

(52) U.S. Cl.
CPC .......... *G01S 19/258* (2013.01); *H04B 7/195* (2013.01)

(58) Field of Classification Search
CPC ............................ G01S 19/258; H04B 7/195
(Continued)

(56) References Cited

U.S. PATENT DOCUMENTS

| 4,284,160 A | 8/1981 | DeLiban et al. |
| 5,548,814 A | 8/1996 | Lorang et al. |

(Continued)

FOREIGN PATENT DOCUMENTS

| CN | 101776766 A | 7/2010 |
| CN | 106131101 A | 11/2016 |

(Continued)

OTHER PUBLICATIONS

User Manual—Detailed Guide to Usage of Application, Spirent Communications, dated Jul. 1, 2020, 17 pages, SPIR 1139-1.
(Continued)

*Primary Examiner* — Harry K Liu
(74) *Attorney, Agent, or Firm* — HAYNES BEFFEL & WOLFELD LLP; Ernest J. Beffel, Jr.

(57) ABSTRACT

Disclosed is a method of providing DOP forecasts for LEO navigation for routing of vehicles, aircraft, alerting humans in vehicles, or wireless devices, and bandwidth forecasts for LEO communications. The method includes accessing a 3D map of an area including structure solids and generating cuboids in spaces not contained in the structure solids; and iteratively over time increments, calculating LEO satellites visible from the cuboids using the map and, using at least the calculated visibility, determining forecasts for the cuboids at the time increments. Also included is compressing the determined forecast spatially and temporally; and distributing the compressed DOP forecast via a CDN, responsive to queries from requestors. Systems of the requestors can take into account the forecast for routing vehicles or alerting humans in vehicles to a predicted navigation impairment. Risk analysis is applied to improving computation and distribution of forecasts. Forecasts are applied to satellite deployment.

21 Claims, 10 Drawing Sheets

Related U.S. Application Data a continuation-in-part of application No. 17/948,176, filed on Sep. 19, 2022, and a continuation-in-part of application No. 17/948,218, filed on Sep. 19, 2022, now Pat. No. 12,292,515, and a continuation-in-part of application No. 17/948,182, filed on Sep. 19, 2022, now Pat. No. 12,298,409, and a continuation-in-part of application No. 17/948,213, filed on Sep. 19, 2022, and a continuation-in-part of application No. 17/948,171, filed on Sep. 19, 2022, now Pat. No. 12,265,159.

(60) Provisional application No. 63/407,589, filed on Sep. 16, 2022, provisional application No. 63/407,579, filed on Sep. 16, 2022.

(58) Field of Classification Search
USPC .................................................. 342/357.64
See application file for complete search history.

(56) References Cited

U.S. PATENT DOCUMENTS

| | | |
|---|---|---|
| 5,761,486 A | 6/1998 | Watanabe et al. |
| 6,191,708 B1 | 2/2001 | Davidson |
| 6,208,841 B1 | 3/2001 | Wallace et al. |
| 6,396,825 B1 | 5/2002 | Jasper et al. |
| 6,560,459 B1 | 5/2003 | Wong |
| 6,571,082 B1 | 5/2003 | Rahman et al. |
| 6,636,721 B2 | 10/2003 | Threadgill et al. |
| 7,224,941 B2 | 5/2007 | Liu |
| 7,324,588 B2 | 1/2008 | Green et al. |
| 7,349,670 B2 | 3/2008 | Mlinarsky et al. |
| 7,395,060 B2 | 7/2008 | Liu |
| 7,398,056 B1 | 7/2008 | Ebert et al. |
| 7,508,868 B2 | 3/2009 | Chang |
| 7,539,489 B1 | 5/2009 | Alexander |
| 7,555,420 B2 | 6/2009 | Wang et al. |
| 7,606,165 B2 | 10/2009 | Qiu et al. |
| 7,646,338 B2 | 1/2010 | Monnerat |
| 7,693,082 B2 | 4/2010 | Wright |
| 7,809,404 B2 | 10/2010 | Daniels et al. |
| 8,150,675 B1 | 4/2012 | Ortmanns et al. |
| 8,213,957 B2 | 7/2012 | Bull et al. |
| 8,223,068 B2 | 7/2012 | Allan et al. |
| 8,364,090 B2 | 1/2013 | Ramasamy et al. |
| 9,008,964 B2 | 4/2015 | Mansour |
| 9,519,063 B2 | 12/2016 | Davis et al. |
| 9,945,956 B2 | 4/2018 | Chhokra et al. |
| 11,131,774 B2 | 9/2021 | Miya et al. |
| 11,150,353 B2 | 10/2021 | Nishi et al. |
| 11,226,416 B1 * | 1/2022 | Pullen .................... G01S 19/10 |
| 2001/0004380 A1 | 6/2001 | Mannermaa |
| 2001/0033627 A1 | 10/2001 | Syrjarinne |
| 2002/0066055 A1 | 5/2002 | Kim |
| 2002/0102992 A1 | 8/2002 | Koorapaty et al. |
| 2003/0061018 A1 | 3/2003 | Snyder |
| 2003/0236089 A1 | 12/2003 | Beyme et al. |
| 2005/0004787 A1 | 1/2005 | Kubischta et al. |
| 2005/0085223 A1 | 4/2005 | Liu |
| 2006/0040616 A1 | 2/2006 | Wheatley |
| 2006/0046658 A1 | 3/2006 | Cruz et al. |
| 2006/0072466 A1 | 4/2006 | Wang et al. |
| 2006/0209866 A1 | 9/2006 | Steenkiste et al. |
| 2006/0223522 A1 | 10/2006 | Guo et al. |
| 2006/0229018 A1 | 10/2006 | Mlinarsky et al. |
| 2006/0229019 A1 | 10/2006 | Mlinarsky |
| 2006/0229020 A1 | 10/2006 | Mlinarsky et al. |
| 2006/0233111 A1 | 10/2006 | Wright |
| 2006/0239198 A1 | 10/2006 | Mlinarsky et al. |
| 2006/0252419 A1 | 11/2006 | Liu |
| 2006/0264178 A1 | 11/2006 | Noble et al. |
| 2007/0010940 A1 | 1/2007 | Tan et al. |
| 2007/0019769 A1 | 1/2007 | Green et al. |
| 2007/0257838 A1 | 11/2007 | Cheng |
| 2008/0056340 A1 | 3/2008 | Foegelle |
| 2008/0111738 A1 | 5/2008 | Han |
| 2008/0239972 A1 | 10/2008 | Omar |
| 2008/0287140 A1 | 11/2008 | Lee et al. |
| 2009/0002233 A1 | 1/2009 | Huang et al. |
| 2009/0047925 A1 | 2/2009 | Rahman |
| 2009/0051590 A1 | 2/2009 | Pitt et al. |
| 2009/0094492 A1 | 4/2009 | Music et al. |
| 2009/0305702 A1 | 12/2009 | Toppinen et al. |
| 2010/0019937 A1 | 1/2010 | Mori et al. |
| 2010/0033370 A1 | 2/2010 | Lopez et al. |
| 2010/0066599 A1 | 3/2010 | Liu et al. |
| 2010/0145616 A1 | 6/2010 | van Diggelen et al. |
| 2010/0233969 A1 | 9/2010 | Frolik et al. |
| 2010/0273504 A1 | 10/2010 | Bull et al. |
| 2010/0304686 A1 | 12/2010 | Kennedy et al. |
| 2011/0199255 A1 | 8/2011 | Murray et al. |
| 2011/0217937 A1 | 9/2011 | Cook |
| 2011/0230143 A1 | 9/2011 | Lundstrom et al. |
| 2011/0234455 A1 | 9/2011 | Rosenfeld et al. |
| 2011/0257923 A1 | 10/2011 | Boulton |
| 2011/0263215 A1 | 10/2011 | Asplund et al. |
| 2011/0306306 A1 | 12/2011 | Reed |
| 2012/0209519 A1 | 8/2012 | Basnayake |
| 2012/0282946 A1 | 11/2012 | Wigren |
| 2012/0309323 A1 | 12/2012 | Guo et al. |
| 2013/0021912 A1 | 1/2013 | Finlow-Bates et al. |
| 2013/0106655 A1 | 5/2013 | Pujante Cuadrupani |
| 2013/0154879 A1 | 6/2013 | Ramakrishnan et al. |
| 2013/0162466 A1 | 6/2013 | Mcdanell et al. |
| 2013/0217418 A1 | 8/2013 | Maurin et al. |
| 2014/0024318 A1 | 1/2014 | Sevindik et al. |
| 2014/0267690 A1 | 9/2014 | Morin et al. |
| 2014/0336923 A1 | 11/2014 | Hwang et al. |
| 2014/0343765 A1 | 11/2014 | Suiter et al. |
| 2015/0065165 A1 | 3/2015 | Zhang et al. |
| 2015/0226857 A1 | 8/2015 | Davies |
| 2015/0301190 A1 | 10/2015 | Osipov et al. |
| 2016/0097861 A1 | 4/2016 | Li et al. |
| 2016/0146944 A1 | 5/2016 | Geren et al. |
| 2016/0280401 A1 | 9/2016 | Driscoll et al. |
| 2016/0282473 A1 | 9/2016 | Driscoll et al. |
| 2017/0059715 A1 | 3/2017 | Wietfeldt et al. |
| 2017/0070971 A1 | 3/2017 | Wietfeldt et al. |
| 2018/0074209 A1 | 3/2018 | Madhow et al. |
| 2018/0292839 A1 | 10/2018 | Wei et al. |
| 2018/0309508 A1 * | 10/2018 | Regan ................ H04B 7/18584 |
| 2018/0372877 A1 | 12/2018 | Syrjarinne |
| 2019/0094379 A1 | 3/2019 | Chhokra et al. |
| 2019/0250277 A1 | 8/2019 | Miya et al. |
| 2019/0265365 A1 | 8/2019 | Skupin et al. |
| 2020/0274643 A1 | 8/2020 | Kodaypak et al. |
| 2022/0018971 A1 | 1/2022 | Bennington et al. |
| 2022/0075079 A1 * | 3/2022 | Kassas ................... G01S 19/00 |
| 2022/0120914 A1 | 4/2022 | Johnson et al. |
| 2025/0224517 A1 * | 7/2025 | Bennington ........... G01S 19/21 |

FOREIGN PATENT DOCUMENTS

| | | | |
|---|---|---|---|
| CN | 108680937 A | | 10/2018 |
| CN | 109212570 A | | 1/2019 |
| CN | 109417595 A | | 3/2019 |
| EP | 3064964 A1 | | 9/2016 |
| GB | 2492547 A | | 1/2013 |
| GB | 2601861 A | | 6/2022 |
| JP | H06334636 A | | 12/1994 |
| JP | H0962353 A | | 3/1997 |
| TW | 201022705 A | | 6/2010 |
| WO | 9903009 A2 | | 1/1999 |
| WO | 2010093999 A2 | | 8/2010 |
| WO | 2011046455 A1 | | 4/2011 |
| WO | WO-2022015873 A2 * | 1/2022 | ............ G01S 19/06 |

OTHER PUBLICATIONS

PNT-Assurance System Architecture, Navigation Assurance Forecast, Spirent, dated Jun. 2020, 7 pages.

(56) References Cited

OTHER PUBLICATIONS

Autonomous emergency manoeuvering and movement monitoring for road and transport security, TransSec, dated Jul. 31, 2018, 33 pages.
Recommendation ITU-R P.1407-7, Multipath propagation and parameterization of its characteristics, Radiocommunication Sector of International Telecommunication Union, dated Aug. 2019, 31 pages.
Recommendation ITU-R P.681-11, Propagation data required for the design systems in the land mobile-satellite service, Radiocommunication Sector of International Telecommunication Union, dated Aug. 2019, 63 pages.
Radisic et al., The Effect of Terrain Mask on RAIM Availability, Journal of Navigation, dated Jan. 2010, 15 pages.
Gadgil, Ring Buffers, Kalyani Gadgil's blog, dated Feb. 4, 2019, 5 pages. Retrieved on Jun. 18, 2020. Retrieved from the internet [URL: https://kalyanigadgil.wordpress.com/2019/02/04/ring-buffers/].
Hsu et al., NLOS Correction/Exclusion for GNSS Measurement Using RAIM and City Building Models, Sensors, published Jul. 17, 2015, 21 pages.
GNSS Planning Website, Trimble, dated Jul. 27, 2018, 5 pages.
Spirent, Realistic Multipath and Obscuration Simulation—Simulating the Impact of the Local Environment on GNSS Signals, Spirent Sim3D, dated Jan. 2020, 4 pages.
Spirent, SimGEN Software Suite for Spirent GNSS Constellation Simulation Systems, dated May 2020, 45 pages.
GNSS Mission Planning, Navmatix, 4 pages. Retrieved on Jun. 17, 2020. Retrieved from the internet [URL: http://gnssmissionplanning.com/ ].
Recommendation ITU-R P.2145-2, Model Parameters for the physical-statisical wideband model, Radiocommunication Sector of International Telecommunication Union, dated Sep. 2017, 101 pages.
Rakipi et al., Integrity Monitoring in Navigation Systems: Fault Detection and Exclusion RAIM Algorithm Implementation, Journal of Computer Communications, published May 28, 2018, 9 pages.
Technical Standard Order, Traffic Awareness Beacon System (TABS), Federal Aviation Administration—Department of Transportation, dated Oct. 10, 2014, 48 pages.
Berres et al., GNSS Receiver Performance Assessment in Varied Multipath Environments with Real-World Simulation System, Association for Unmanned Vehicle Systems International (AUVSI) Proceedings, dated 2020, 17 pages.
Diggelen, End Game for Urban GNSS: Google's Use of 3D Building Models, Inside GNSS (IG), dated Mar. 21, 2021, 16 pages. Retrieved on Jul. 6, 2021. Retrieved from the internet [URL: https://insidegnss.com/end-game-for-urban-gnss-googles-use-of-3d-building-models/ ].
NovAtel Inc., An Introduction to GNSS—Chapter 5—Resolving Errors—Real-Time Kinematic, Second Edition, published 2015, 2 pages.
Section 2—Area Navigation (RNAV) and Required Navigation Performance (RNP), Federal Aviation Administration, 8 pages. Retrieved on Oct. 22, 2021. Retrieved from the internet [URL: https://tfmlearning.faa.gov/publications/atpubs/AIM/Chap1/aim0102.html#RCtM?129mweb ].
Synopsys, The 6 Levels of Vehicle Autonomy, dated 2021, 7 pages. Retrieved on Oct. 22, 2021. Retrieved from the internet [URL: https://www.synopsys.com/automotive/autonomous-driving-levels.html ].
Stanford, Ray Tracing Alternatives, dated 1997-98, 2 pages. Retrieved on Jun. 15, 2021. Retrieved from the internet [URL: https://cs.stanford.edu/people/eroberts/courses/soco/projects/1997-98/ray-tracing/alternatives.html ].
Li et al., A Tightly Coupled Positioning Solution for Land Vehicles in Urban Canyons, Hindawi, Journal of Sensors, dated 2017, 11 pages.
OneSky SDSP Services, OneSky Systems Inc., 7 pages. Retrieved on Oct. 22, 2021. Retrieved from the internet [URL: https://saas.onesky.xyz/SDSP/Documentation/Navigation ].

PCT/US2021/041664—Partial Search Report dated Nov. 4, 2021, 18 pages.
Nakaaki et al., "Development of a Precision Index and a Precision Forecast System for RTK-GNSS", 2019 IEEE Vehicular Networking Conference (VNC), 3-5-1 Johoku, Hamamatsu, Shizuoka 432-8011, Japan, Dec. 4, 2019, pp. 1-7.
Suh et al., "Evaluation of Satellite-Based Navigation Services in Complex Urban Environments Using a Three-Dimensional GIS", IEICE Transaction on Communication, Communications Society, Tokyo, JP, vol. E90B, No. 7, Jul. 1, 2007, pp. 1816-1825.
Causa et al., "Multi-UAV Path Planning for Autonomous Missions in Mixed GNSS Coverage Scenarios", Sensors, vol. 18, No. 12, Nov. 29, 2018, 27 pages.
Spirent, "Enabling reliable GNSS performance for autonomous urban driving", a Spirent Ebook, Oct. 5, 2021, 12 pages.
Parkinson et al., "Global Positioning System: Theory and Applications", vol. 1, vol. 163 Progress in Astronautics and Aeronautics, Published by the American Institute of Aeronautics and Astronautics, Inc., Washington, DC, 1996, 44 pages.
Geohash, Wikipedia—Geohash 2008 public domain, 7 pages, retrieved on Dec. 22, 2010. Retrieved from the internet [URL: http://en.wikipedia.org/wiki/Geohash ].
Anonymous, Algorithm for Finding Nearby Points?—Stack Overflow, 3 pages, retreieved on Dec. 22, 2010. Retrieved from the internet [URL: http://stackoverflow.com/questions/838344/algorithm-for-finding-nearby-points ].
Butler, Playing Nice—LBS and Hybrid location technologies, EETImes, dated Dec. 8, 2009, 4 pages. Retrieved on Dec. 22, 2010. Retrieved from the internet [URL: https://www.eetimes.com/General/DisplayPrintViewContent?contentItemId=4016855 ].
Kojo, Seawind: a Wireless Network Emulator, Proceedings of 11th GI/ITG Conference of Measuring, Modelling and Evaluation of Computer and Communication Systems, 2001, 16 pages.
CiteSeerX—Seawind: a Wireless Network Emulator Summary, dated 2001, 2 pages, retrieved on Feb. 20, 2014. Retrieved from the internet [URL: http://citeseerx.ist.psu.edu/viewdoc/summary?doi=10.1.1.25.3281].
INS—Integrated Navigation Systems, GNSS Product Design, GNSS Solutions. Retrieved on Sep. 21, 2012. Retrieved from the internet [URL: http://inavsystems.com/index_files?Page607.htm ].
Global Positioning System. Wikipedia, the Free Encyclopedia. last modified on Nov. 6, 2012, retrieved on Nov. 9, 2012. Retrieved from the internet <http://en.wikipedia.org/w/index.php?title=Global_Positioning_System&oildid=521739076>.
Synchros Interactive, Proximity Searching with GeoHash, dated Aug. 2, 2010, 4 pages. Retrieved on Dec. 22, 2010. Retrieved from the internet [URL: http://www.synchrosinteractive.com/blog/1-software/38-geohash ].
Eppstein, Geometry in Action, Cartography and Geographic Information Systems, 6 pages, retrieved on Dec. 9, 2010. Retrieved from the internet [URL: http://www.ics.uci.edu/~eppstein/gina/carto.html ].
Gupta R, How to Use GNSS Simulators to Test RTK Positioning Systems, Spirent. com, Feb. 1, 2016, 6 pages (downloaded from https://spirent. com/blogs/how-to-use-gnss-simulators-to-test-RTK).
Obst et al "Urban Multipath Detection and Mitigation with Dynamic 3D Maps for Reliable Land Vehicle Localization", Proceedings of IEEE Ion Plans 2012, /Ion Plans, Apr. 26, 2012 (Apr. 26, 2012), pp. 685-691.
Zhang et al "A New Path Planning Algorithm Using a GNSS Localization Error Map for UAVs in an Urban Area", Journal of Intelligent, vol. 94, No. 1, Aug. 3, 2018 (Aug. 3, 2018) , pp. 219-235.
PCT/US2021/041664—Internatioal Search Report & Written Opinion dated Mar. 31, 2022, 34 pages.
GB2110163.9—Partial Search Report dated Apr. 6, 2022 , 2 page.
GB2110164.7—Search Report dated Apr. 6, 2022 , 2 pages.
GB2110165.4—Search Report dated Apr. 4, 2022 , 1 pages.
Anonymous, The Essential CDN Guide—Chapter 1, What is a CDN, Imperva, retreived on Jun. 3, 2022, 14 pages. Retrieved from the internet [URL: https://www.imperva.com/learn/performance/what-is-cdn-how-it-works/ ].

(56) References Cited

OTHER PUBLICATIONS

Misener, SAE Connected Vehicle Standards, SAE International, CES 2016, dated Jan. 6, 2016, 10 pages.
Pineiro et al., How to evaluate models: Observed vs. predicted or predicted vs. observed, Ecological Modelling, dated Sep. 2008, 2 pages.
GB2110163.9—Search Report dated Apr. 12, 2022 , 2 pages.
Imperva, The Essential CDN Guide, Chapter 1: What is a CDN?, Apr. 22, 2019, 5 pages.
U.S. Appl. No. 17/374,885, filed Jul. 13, 2021, now U.S. Pat. No. 11,287,531, Mar. 29, 2022, Granted.
U.S. Appl. No. 17/374,882, filed Jul. 13, 2021, now U.S. Pat. No. 11,789,161, Oct. 17, 2023, Granted.
U.S. Appl. No. 17/374,891, filed Jul. 13, 2021, now U.S. Pat. No. 11,536,855, Dec. 23, 2022, Granted.
2110163.9, Jul. 14, 2021, GB 2601860, Jun. 15, 2022, Pending.
2110163.9, Jul. 14, 2021, GB 2601861, Jun. 15, 2022, Pending.
2110165.4, Jul. 14, 2021, GB 2601584, Jun. 8, 2022, Pending.
U.S. Appl. No. 13/786,020, filed Mar. 5, 2013, now U.S. Pat. No. 9,519,063, Dec. 13, 2016, Granted.
U.S. Appl. No. 17/948,171, filed Sep. 16, 2022, US 20230128817, Apr. 27, 2023, Pending.
U.S. Appl. No. 17/948,176, filed Sep. 16, 2022, US 20230118946, Apr. 20, 2023, Pending.
U.S. Appl. No. 17/948,182, filed Sep. 16, 2022, US 20230121760, Apr. 20, 2023, Pending.
U.S. Appl. No. 17/948,190, filed Sep. 16, 2022, US 20230118232, Apr. 20, 2023, Pending.
U.S. Appl. No. 17/948,213, filed Sep. 19, 2022, Pending.
U.S. Appl. No. 17/948,218, filed Sep. 19, 2022, US 20230016836, Jan. 19, 2023, Pending.
2391957.2, Jan. 25, 2023, Pending.
U.S. Appl. No. 18/369,119, filed Sep. 15, 2023, Pending.
PCT/US21/41664, Jul. 14, 2021, WO2022015873, Jan. 20, 2022, Expired.
PCT/US2021/041664—2nd Written Opinion dated Dec. 12, 2022, 16 pages.
GB2110165.4—Further Search Report dated Jan. 20, 2023, 3 pages.
PCT/US2021/041664—International Preliminary Report of Patentability dated Mar. 14, 2023, 17 pages.
GB2301057.2—Combined Search and Examination Report dated Jul. 21, 2023, 9 pages.
GNSS Foresight, Spirent Communications, Inc., Jun. 12, 2022, 9 pages (downloaded from https.www.spirent.com/products/gnss-foresight-forecasting.com).
GNSS Foresight for aviation, Spirent Communications, Inc. Jan. 2022, 4 pages.
Achieving Reliable GNSS Performance for Autonomous UAS Navigation, Spirent Communications, Inc,, MCD00454, Issue 1-00 , Sep. 2021, 12 pages.
Spirent Charts the Way Forward For Autonomous Systems with Industry-first BVLOS Mission Ebabler, Spirent Communications, Inc., Sep. 20, 2021 (downloaded from hhttps://www.spirent.com/newsroom/press-releases/spirent-charts-the-way-forward-for-autonomous-systems-with-industry-first Feb. 24, 2022].
Spirent Brings Realistic Testing to Emerging LEO Satellite Applications, Spirent Communications, Inc., Dec. 4, 2022, 4 pages (downloaded from https://www.spirent.com/newsroom/press-releases/spirent-brings-realistic-testing-to-emerging-leo-satellite-applications).
LEO Azimuth Tracking! APRS.org, (downloaded Sep. 14, 2023 from http://aprs.org/LEO-tracking.htm).
Giggenbach et al., System Aspects of Optical Leo-to-Ground Links, ICSO 2016 International Conference on Space Optics, Oct. 18-21, 2016, 8 pages.
GB2301057.2—Response to Combined Search and Examination Report filed Sep. 16, 2024, 14 pages.

\* cited by examiner

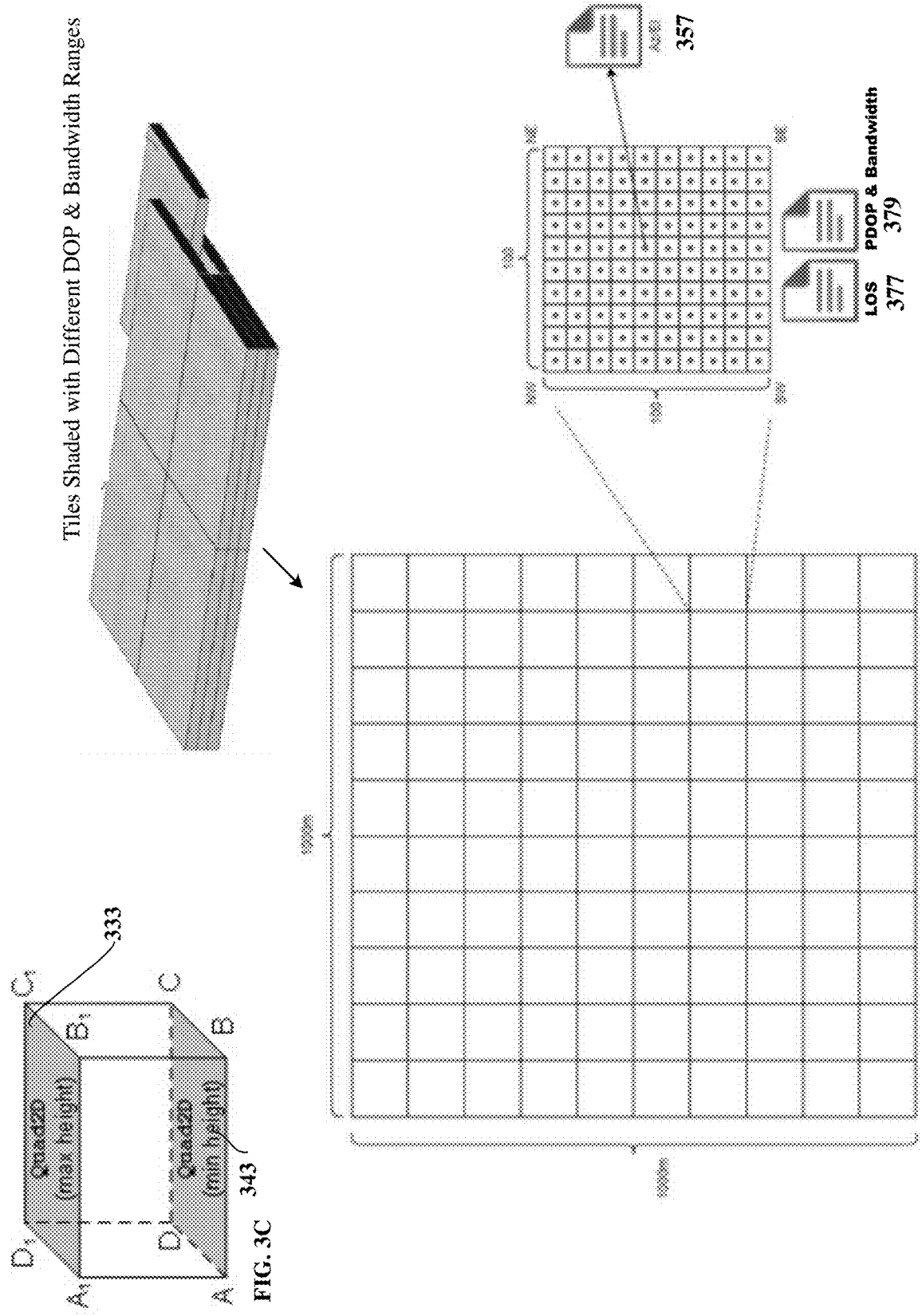

```
message ForecastBatch {                                    /* 305 */
  ForecastMetadata metadata = 1;
  oneof data {
    ForecastLOS los = 2;
    ForecastAzEl az_el = 3;
    ForecastDOP pdop_all = 4;    // PDOP calculation made
using all los satellites from all GNSS
    ForecastBandwidth bw = 5;    //Bandwidth calculation
made using all LEO satellites that are los for each
constellation
  }
}                                                          /* 321 */ message ForecastMetadata {
  ForecastType type = 1;
  GPSTimeRange forecast_period = 2; // Start and End of this
forecast
  Quad2D area = 3; // 2D Area of this forecast
  double agl_height_m = 4; // AGL height for all points in
forecast
  HeightRange agl_height_range = 5; // Min/Max above ground
height (0 == ground)
  HeightRange wgs84_height_range = 6; // Min/Max ellipsoidal
(WGS84) height
  double grid_resolution_m = 7; // Horizontal grid resolution
  double time_resolution_s = 8; // Time resolution of
forecasted period in seconds
}                                                          /* 351 */ message ForecastAzEl {
  repeated SatelliteAzElForecast az_el = 1;
} message ForecastLOS {                                      /* 375 */
  repeated PopintOfrecastLOS los = 1;
} message ForecastDOP {                                      /* 385 */
  repeated PointForecastDOP dop 1;
}                                                          /* 308 */ message ForecastBandwidth {
  repeated PointForecastBandwidth bw = 1;
}                                                          /* 365 */ message SatelliteAzElForecast {
  Satellite satellite = 1;
  repeated SatelliteAzEl coordinates = 2;
}                                                          /* 386 */ message SatelliteLOSForecast {
  Satellite satellite = 1;
  repeated LOSForecast measurement = 2;
} message PointForecastLOS {
  Point3DWGS84 point_wgs84 = 1;
  repeated SatelliteLOSForecast los = 2;
} message PointForecastDOP {
  Point3DWGS84 point_wgs84 = 1;
  repeated DOPForecast dop = 2;
} message PointForecastBandwidth {
  Point3DWGS84 point_wgs84 = 1;
  repeated BandwidthForecast bw = 2;
}
```

FIG. 3F

Ideal Map & Point 2D Example Error Calculation (no cuboid)

Angle/Estimates calculated from Satellite Position & Point on Earth

Example
A= 1000 Km
B= Building Height = 33m
D= Distance from point to building on ground = 30m
$\theta = \tan^{-1}(B/D) = 47.73°$

For Map variability of 3 meters:

B=30m    $\theta$=45°
B=36m    $\theta$=50.19°

Variability of $\theta = \Delta\theta = 5.19°$

X = distance of orbit path
X = $(\Delta\theta/360)*(2\pi r)$
r = 6378km (Earth) + 1000km (LEO)
X = 668 meters

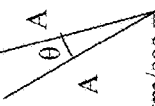

Speed of Satellite = 7.8 km/sec = S time to travel X = t t = X/S = 0.086 seconds Forecast Period = P = 50 minutes Forecast Period Error = +/P = e e = 0.003%

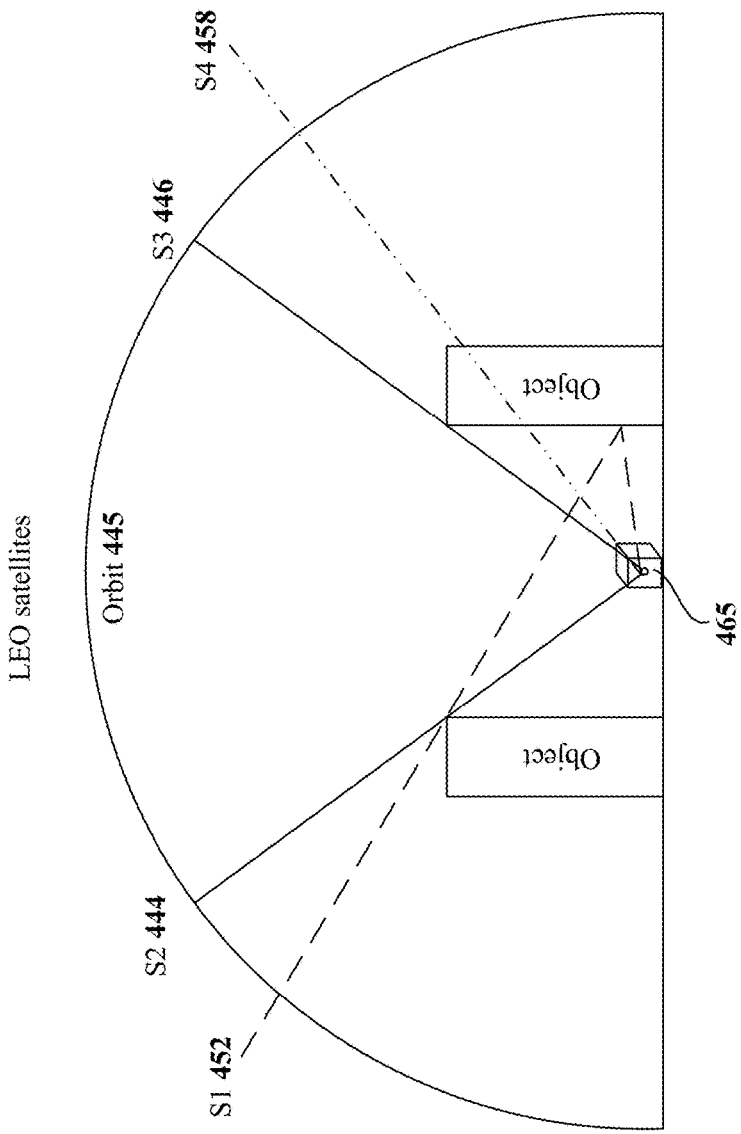

FIG. 4A

ARCHITECTURE FOR PROVIDING FORECASTS OF LOW EARTH ORBIT (LEO) SATELLITE OBSCURATION AND MULTIPATH

PRIORITY CLAIMS

This application claims priority to and incorporates by reference for all purposes as if fully set forth herein the following prior applications:

This application is a continuation in part of U.S. application Ser. No. 17/948,171 titled "GNSS Forecast Impacting Receiver Startup," filed 19 Sep. 2022 which claims the benefit of U.S. Provisional Patent Application No. 63/407,589 titled "Accuracy of a GNSS Receiver that has a Non-Directional Antenna," filed 16 Sep. 2022; and This application is a continuation in part of U.S. application Ser. No. 17/948,176 titled "GNSS Forecast and Spoofing/Jamming Detection," filed 19 Sep. 2022 which claims the benefit of U.S. Provisional Patent Application No. 63/407,589 titled "Accuracy of a GNSS Receiver that has a Non-Directional Antenna," filed 16 Sep. 2022; and This application is a continuation in part of U.S. application Ser. No. 17/948,182 titled "GNSS Forecast and Background Obscuration Prediction," filed 19 Sep. 2022 which claims the benefit of U.S. Provisional Patent Application No. 63/407,589 titled "Accuracy of a GNSS Receiver that has a Non-Directional Antenna," filed 16 Sep. 2022); and This application is a continuation in part of U.S. application Ser. No. 17/948,190 titled "GNSS Forecast and Line of Sight Detection," filed 19 Sep. 2022 which claims the benefit of U.S. Provisional Patent Application No. 63/407,589 titled "Accuracy of a GNSS Receiver that has a Non-Directional Antenna," filed 16 Sep. 2022; and This application is a continuation in part of U.S. application Ser. No. 17/948,213 titled "Utilizing GNSS Risk Analysis Data For Facilitating Safe Routing of Autonomous Drones," filed 19 Sep. 2022 which claims the benefit of U.S. Provisional Patent Application No. 63/407,579 titled "Generating and Distributing GNSS Data for Facilitating Safe Routing of Autonomous Drones," filed 16 Sep. 2022.

This application is a continuation in part of U.S. application Ser. No. 17/948,218 titled "Generating and Distributing GNSS Risk Analysis Data for Facilitating Safe Routing Of Autonomous Drones," filed 19 Sep. 2022 which claims the benefit of U.S. Provisional Patent Application No. 63/407,579 titled "Generating and Distributing GNSS Data for Facilitating Safe Routing of Autonomous Drones," filed 16 Sep. 2022.

RELATED CASES

This application is related to contemporaneously filed U.S. Application Ser. No. 18/369,119 titled "Utilizing Low Earth Orbit (LEO) Satellite Data For Obscuration and Multipath Risk Analysis", filed 15 Sep. 2023. The related case is incorporated by reference for all purposes as if fully set forth herein:

This application is also related to the following:

U.S. application Ser. No. 17/374,885 titled "An Architecture for Providing Forecasts of GNSS Obscuration and Multipath," filed 13 Jul. 2021, now U.S. Pat. No. 11,287,531, issued 29 Mar. 2022 which claims priority to U.S. Provisional Patent Application No. 63/051,849 filed 14 Jul. 2020 and U.S. Provisional Patent Application No. 63/161,386 filed 15 Mar. 2021; and U.S. application Ser. No. 17/374,882, titled "Improving Accuracy of a GNSS Receiver That has a Non-Directional Antenna," filed 13 Jul. 2021, now U.S. Pat. No. 11,789,161, issued 17 Oct. 2023; and U.S. application Ser. No. 17/374,891, titled "Path Planning Using Forecasts Of Obscuration And Multipath," filed 13 Jul. 2021, now U.S. Pat. No. 11,536,855, issued 27 Dec. 2022.

The related cases are incorporated by reference for all purposes as if fully set forth herein:

FIELD OF THE TECHNOLOGY DISCLOSED

The technology disclosed relates to data processing, vehicles, satellites, navigation and relative location. The technology disclosed provides for electrical computers, digital data processing systems, and data processing processes for transferring data between a plurality of computers or processes wherein the computers or processes employ the data before or after transferring and the employing affects the transfer of data there between.

In particular, the technology disclosed relates generally to the field of Low Earth Orbit (LEO) satellites, a plurality of satellites forming a constellation, radio communication, radio navigation, positioning, navigation and timing. More specifically, the technology focuses on the process for generating a prediction of LEO signals based on time, position, environmental data and maps, and then providing the predictions over an Internet cloud architecture to millions of users. The disclosed system can also be delivered to a customer as a platform, or to their computing entity for their use, including as an element on the end user device.

The disclosed process uses various methods to determine satellite obscurations based on position, time, environmental data and maps. Moreover, the process uses various methods to determine satellite signal degradation due to multipath and other interference based on position, time, environmental data and maps. The disclosed architecture includes the design, interfaces and methods to gather satellite data, environmental data, maps, algorithms, store data, distribute on a cloud architecture, or by other means including elements installed on end user devices, or using data collected by the end user device, and interface with users.

The disclosed process uses various methods to improve the efficiency of determining areas that need to be constantly computed for obscuration or multipath versus areas that have statistically sufficiently good signals and do not further predictions.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Low Earth Orbit (LEO) satellites, or constellations (a multitude of satellites in a plurality of orbits) are a new and rapidly growing segment of the space market. The growth in LEO over the past decade has been supported by lower cost launch capabilities, and continued improvements in technology to enable more technical capabilities in smaller, lower power, and lower cost satellites. As an example, the leading satellite launch provider typically launches as many as seventy satellites on a single rocket launch. The economy of scale for LEO is finally in reach, thus enabling hundreds of companies to devise new businesses to leverage LEO. However, they face some significant new challenges.

Three primary segments of the LEO market are Non-Terrestrial Networks (NTN), Position Navigation and Timing (PNT), and Earth Observation (EO). Descriptions of services for LEO-NTN, LEO-PNT and LEO-EO follow.

LEO-NTN companies offer broadband data services and include companies like Starlink. These companies launch hundreds, or even thousands, of satellites to provide data services available globally. LEO-NTN satellites have lower latency than other satellite data services since they are a shorter distance from the Earth's surface. LEO satellites also typically have a higher received signal strength due to their low orbit. As an example, the latency from a LEO-NTN service is around 40 ms, almost as fast as a 4G terrestrial service, versus a 500 ms latency from a geostationary satellite (GEO). A key benefit of LEO-NTN is complete regional or global coverage when compared to terrestrial networks. This ubiquity could mean that users could have emergency, text, data, voice, and video communications anywhere in the world. Thousands of LEO-NTN satellites are in operation or undergoing deployment, notably including Starlink™.), OneWeb™, Kuiper™, and Galaxy Space™ constellations. For efficiency this will likely mean that smartphones, cars, aircraft, and any communications device will eventually use a combination of LEO-NTN and terrestrial wireless services like 4G and 5G. A complication related to LEO-NTN communication signals arises from beamforming by particular satellites. Beamforming can impact whether LEO-NTN satellites will effectively be available to provide a signal of opportunity. The beamforming plan needs to be obtained from the satellite operators.

LEO-PNT companies offer services that complement or replace the use of Global Navigation Satellite Systems (GNSS) like GPS operating in Medium Earth Orbit (MEO). LEO-PNT signals are much stronger than GNSS and therefore are more resilient to jamming and spoofing. In some cases, with enough satellites LEO-PNT can also be more precise and accurate than GNSS. As of submission of this application, LEO-PNT constellations have not yet been implemented, though some are in late planning stages.

LEO-EO companies offer services that use cameras and other sensors to observe the Earth atmosphere, surface, or sub-surface. LEO-EO companies are changing the way we see the world by having so many satellites that imagery and maps can be updated weekly or even daily. Historical technologies might update images and maps for commercial use every six to eighteen months. The increased frequency of image and map updates can be critical for geospatial services, maps for self-driving cars, agriculture, conservation, aviation, and military uses.

These three LEO segments: NTN, PNT, and EO, have some similar characteristics and face common challenges. We describe effects of higher atmospheric drag and changing impacts of gravity, decreased signal coverage area, required speed to remain in orbit, and signal degradation due to atmospheric and obscuration effects next.

Any satellite in low orbit will experience higher atmospheric drag and changing impacts of gravity as it orbits the Earth, thus making orbit determination and adjustment more challenging, and also shortens the useful life of LEO satellites.

LEO satellites are closer to the Earth's surface, so the signal coverage or aperture of a sensor covers a much smaller area than higher orbit (MEO, or GEO) satellites. This means that in order to have regional or global coverage hundreds or thousands of satellites are needed in a multitude of orbital planes. Since it may take years to launch enough LEO satellites into orbit it is critical that the LEO companies simulate the orbits and constellations of their final configuration to match their desired service. For LEO-NTN this might be the minimum bandwidth available globally. For LEO-PNT this might be the minimum navigational accuracy. Since it takes years to get enough satellites in orbit, the interim constellation configurations are equally important to understand when they will deliver minimum levels of service in different areas as they grow.

LEO satellites are closer to Earth and therefore must have a much faster speed to remain in orbit. This results in higher doppler shift in signals, relativity effects, and each satellite only remaining visible to a receiver (ground unit or device) for a short amount of time. This means that the receiver needs to track and switch between satellites more often. This also requires a very complex ground control network, networking, or even networking between satellites in order to have consistent services.

LEO satellites signals will experience degradation due to the atmosphere and more importantly due to obscuration from buildings and terrain on the Earth's surface. Due to the low orbit and speed. the line-of-sight (LOS) to each satellite in suburban and urban areas is rapidly changing. The rapidly changing signal environment can make the resulting service for NTN and PNT highly variable, especially when there are fewer satellites in orbit.

LEO-PNT services can be offered in a variety of ways. LEO-PNT services consist of a multitude of satellites with deterministic orbital positions. The LEO-PNT satellites have methods applied to achieve a precise relative synchronization between LEO satellites in the same constellation, and potentially also synchronized to a MEO GNSS. Each LEO-PNT satellite transmits a signal that a LEO-PNT receiver uses to synchronize, and using trilateration, calculate a position in orbit above the Earth, similar to GNSS positioning on the surface of the earth. Most LEO-PNT satellites do not have highly accurate atomic clocks due to the power and weight limitations of a LEO satellite. In order to be synchronized and determine their orbital position, most LEO-PNT satellites use a GNSS receiver to receive signals from GNSS satellites in higher orbit. Hence, the LEO-PNT satellites use GNSS for position, navigation, and timing of the satellite and resulting services. Since the LEO-PNT satellites are in orbit, the quality of the GNSS signals is usually excellent and results in high quality time and navigation. Even though the LEO-PNT satellites are using GNSS, the LEO-PNT service is typically more robust because resulting signals are more resilient to jamming and spoofing, and with enough satellites can provide higher accuracy. It's also possible for LEO-PNT and LEO-NTN services to be provided from the same satellites and thus simplify implementation.

Since LEO satellites are closer to Earth, LEO constellations require more satellites to offer coverage over the whole or part of the Earth. This requires multiple orbital planes with multiple satellites in each orbital plane. As an example, a LEO-PNT service might need four hundred satellites to have enough satellites in view on the ground to have the same accuracy as a GPS service that has only has thirty-one satellites. LEO-NTN providers will need thousands of satellites to offer enough coverage and bandwidth for their services. Starlink estimates that they could offer 10% of a typical city's broadband services. To do this globally and offer services outside cities they have approval to launch nearly thirty thousand satellites.

Since LEO satellites are closer to Earth, each satellite covers a smaller area of the Earth and is moving much faster than a satellite in a higher orbit. This results in a LEO receiver needing to acquire and track potentially more satellites very quickly when compared to GEO and MEO satellites services. This can in turn lead to more complex, larger and more power-hungry LEO receivers that would be the case for other satellite systems.

LEO satellites are rarely "overhead" and spend most of their in-view times well below 30 degrees. In suburban and urban environments this is a problem since buildings and terrain are likely to obscure the signals at low elevation angles. The obscuration of the signals can block the signal entirely, create multipath, and degrade the signal. In addition to degrading the LEO-PNT or LEO-NTN service, this obscuration also makes tracking of satellites by the receiver more difficult. It may also mean that a LEO provider launches more satellites in order to have at least one or more at high elevation angles visible for any point on the ground.

An opportunity arises for providing dilution of precision (DOP) forecasts for LEO constellations providing PNT services for navigation for routing of vehicles, aircraft, alerting humans in vehicles, or wireless devices. An opportunity also emerges for providing DOP forecasts for LEO constellations providing NTN Communications services not intended for navigation in order for navigation to be possible using the LEO NTN signals as a signal of opportunity with high precision and integrity for navigation for routing of vehicles, aircraft, alerting humans in vehicles, or wireless devices. Further an occasion is present for relaying dilution of precision forecasts for LEO PNT navigation for routing of vehicles or alerting humans in vehicles; and for providing available bandwidth forecasts for LEO constellations providing NTN services for broadband communication. The disclosed technology can improve both real time and route planning for both terrestrial and airborne vehicles, providing improved information about the reliability of the signals being processed by LEO receivers, and providing the predictions over an Internet cloud architecture to millions of users.

SUMMARY

Due to the speed and number of satellites the complexity of the LEO obscuration computation is high. To determine the number of line-of-sight (LOS) LEO satellites from each fixed location in a city requires highly scalable computing to determine the orbits, obscurations, and resulting LOS for each time period (on a per second/1 Hz update rate). Adding to the complexity is considering the multipath and degradation of non-line-of-sight (NLOS) LEO satellites, and then based on the LOS and NLOS satellite signals determining the satellites that a LEO signal receiver should use and the resulting service quality. For LEO-NTN, this may be measured as the bandwidth. For LEO-PNT, this could be the Dilution of Precision (DOP) for PNT.

The disclosed technology provides a LEO receiver with the information of which satellites will be available LOS and when the satellites will be available, making it simpler to acquire and track the useful LEO satellites. For a moving LEO receiver, the disclosed technology can update the LEO receiver, predicting which satellites to use, for enabling the receiver to prepare for and request handover to a different satellite, which can also reduce effort and complexity on the network side. The ability to provide to a LEO receiver at a particular location the identity(s) of specific satellites to acquire and track, with predictions for the required receiver time period, can generate more stable operation with increased performance and lower processing and power requirements.

The technology disclosed addresses providing dilution of precision (DOP) forecasts for LEO PNT navigation for routing of vehicles or alerting humans in vehicles. The technology disclosed addresses bandwidth forecasts for LEO NTN communications. This includes accessing a 3D map of an area including structure solids and generating cuboids in spaces not contained in the structure solids, iteratively over time increments, calculating LEO satellites visible from the cuboids using the 3D map and, using at least the calculated visibility, and determining a DOP or bandwidth forecast for LEO signals observable in the cuboids at the time increments. The disclosed technology also includes compressing the calculated forecast spatially and temporally, and distributing the compressed forecast via a content delivery network (CDN), responsive to queries from requestors to an API of the CDN, whereby the requestors' systems can take into account the forecast for communications, routing the vehicles or alerting the humans in the vehicles to a predicted navigation impairment. The technology disclosed can also provide forecasts for performance improvements and integrity improvements for communications or navigation. Orbital predictions are also used when calculating the LEO satellites visible from the cuboids, for visualizing when the field of view of a satellite's instrument passes over an area of interest in some implementations of the disclosed technology.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3C shows an example bounding box, usable to facilitate the selection of Forecast Batch data that correspond to a particular user point/trajectory/area.

FIG. 3D shows a sketch of a stack of shaded tiles and an example 1 Km$^2$ output buffer of FES.

FIG. 3F describes snippets of an example forecast file for a given area (tile) over a time period.

FIG. 4A shows an example 2D map orbit with LEO satellites, and an example error calculation for a 2D point.

DETAILED DESCRIPTION

Figure 1:
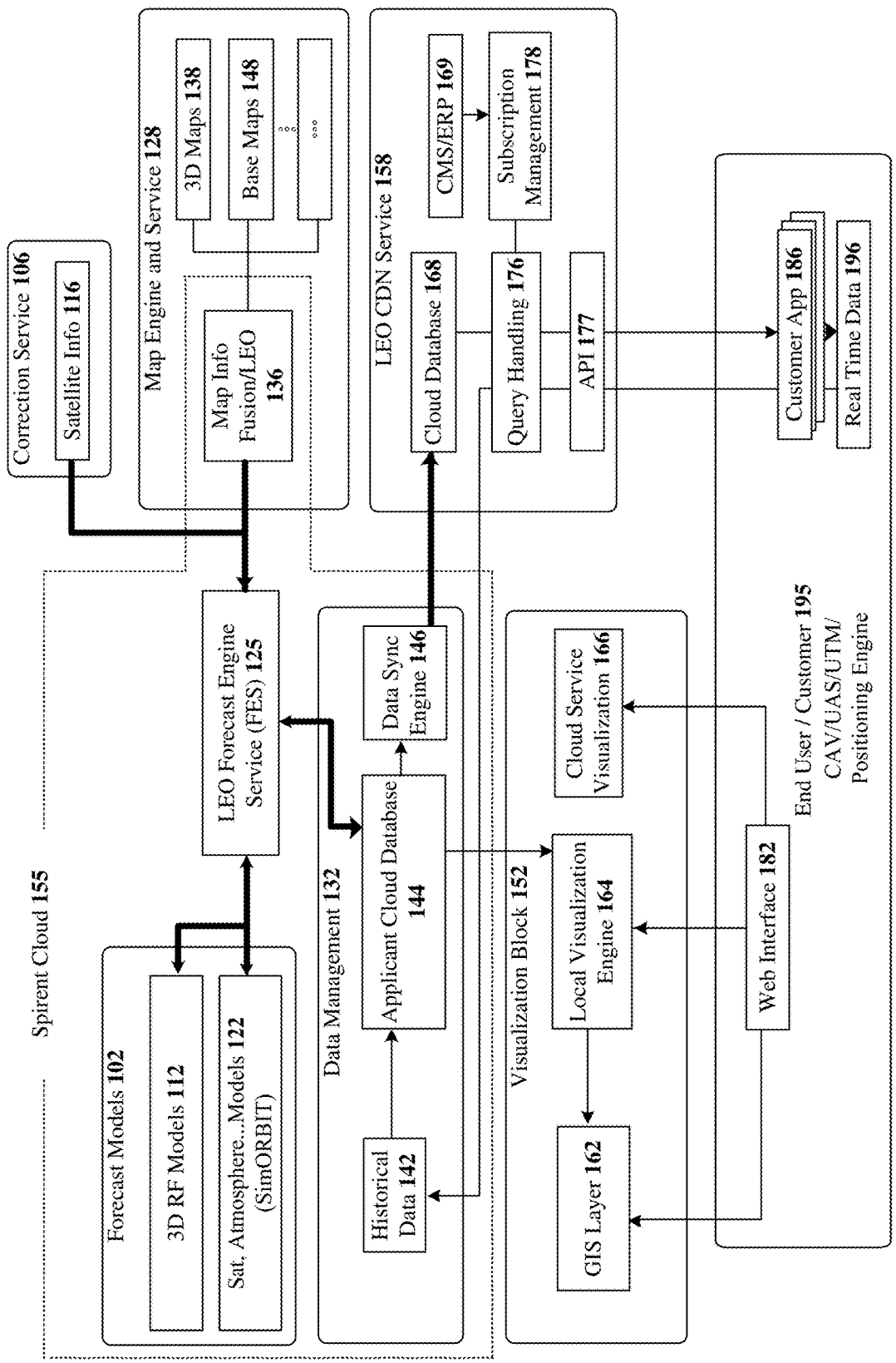
FIG. 1 shows example system architecture for providing dilution of precision (DOP) forecasts for LEO navigation for routing of vehicles, aircraft, alerting humans in vehicles, or wireless devices, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

LEO satellite orbits are more complex than GNSS satellite orbits, requiring the modeling of atmospheric drag and gravity changes over different parts of the Earth. LEO satellites orbit much faster, requiring different sampling rates than GNSS or interpolation functions between samples. A LEO satellite may only be visible from a fixed point on the Earth's surface for 5 to 20 minutes per day, depending on the orbital altitude versus hours for a GNSS satellite. LEO constellations contain more orbital shells, planes, and satellites. This requires much more ray-casting and computation to determine which LEO satellites are LOS. LEO-PNT satellites will transmit signals intended for navigation. LEO-NTN, however, may only transmit communications signals and are, which potentially can be used for navigation as a signal of opportunity. Moreover, critical assumptions about elevation cutoff and what elevations to compute LOS are important.

The number of LEO satellites can be a factor of 300 times more than GNSS, for a single LEO operator. Meanwhile, the time to orbit the Earth for LEO satellites is between 90 and 120 minutes versus 10 to 15 hours for GNSS. These differences between LEO satellites and GNSS satellites prompts the need for different sampling, data compression, data storage, and data distribution rates and methods, as well as potentially the distribution of the computation closer to the end device, either in a typical edge compute environment to enable on demand processing, or movement of processing to the end device, given that it can be provided with appropriate assistance data to enable the computations to be performed.

A mixture of techniques may be required to determine which satellites are LOS. This may begin with determination of the potentially visible satellites. This process will reduce the number of satellites from the total constellation of 100s or 1000s of satellites to 10s of satellites for a specific location and time. Once the potentially visible satellites have been reduced the system will then use ray-casting to determine the LOS satellites. Then optionally the system may use additional techniques to determine the NLOS satellite signal properties that may include ray trace techniques which also allow for side-view/spotbeams from the satellites, to check for satellite coverage from adjacent orbital planes and hence additional LOS satellite coverage.

Once LOS signals are determined, the remaining signals are non-line-of-sight (NLOS). NLOS signals can in many cases be received by the LEO receiver, albeit with signal quality impaired in some ways. For LEO signals, the reflections of the NLOS signals and multipath can be calculated in situations in which there is an insufficient number of LOS signals for a LEO receiver to use. These techniques can include raytracing, building reflectivity/transmissibility, and other standard models for determining multipath.

Using the LOS and NLOS calculations, the resulting service quality for LEO-NTN and LEO-PNT can be calculated. One simple method to determine the DOP is to use the existing calculations used in determining GNSS DOP and apply the same formulas for LEO. One of the key differences is the rate of change over time for a LEO-PNT DOP compared to a GNSS DOP calculation since LEO satellites are moving so quickly. In some cases, a DOP can be calculated using both LEO-PNT and GNSS satellites.

One simple method to determine the bandwidth availability for a point of Earth for LEO-NTN is to multiply the number of LOS satellites by the amount of bandwidth possible for each satellite. Similar models can calculate the amount of bandwidth degradation for NLOS signals. Since LEO-NTN services typically have multiple ground units using the same satellites, the forecasting of bandwidth is the minimum, maximum, nominal, other statistical representations of bandwidth for the area available to one or more LEO-NTN modems/receivers.

The rejection of NLOS LEO satellites for positioning improves the accuracy of the position fix, i.e. 10s of meters versus sub meter. For communications satellites it helps predict lower signal strength as the satellite moves across the sky from the receivers position. If a signal is going to vary a lot it will impact the bandwidth stability and availability.

The applicant discloses a system architecture for completing DOP and bandwidth LEO calculations for real-time applications, similar to Foresight calculations for GNSS described in the related applications. The use of the LEO predictions for LEO-PNT services can improve performance by prioritizing the use of LOS signals, faster signal acquisition time, better tracking, and result in higher accuracy PNT. Since the forecasts are done in the cloud for large areas, not just a single point, the LEO-PNT receiver can use LOS for adjacent areas or areas along a path to improve integrity, track the best satellites in motion, and use for path/flight planning to stay in areas that meet the minimum PNT requirements. For LEO-NTN, similar performance improvements can be gained by prioritizing the LOS signals, for faster signal acquisition time, better tracking, and integrity when in motion and also higher available signal bandwidth.

Since LEO satellites move much faster and are only visible for short amounts of time, the ability for Foresight to provide real-time predictions to assist with signal acquisition and tracking is a key benefit.

The applicant also discloses LEO Foresight Risk Analysis for completing LEO calculations as statistical forecasts. Foresight can determine the LEO-PNT or LEO-NTN performance for each point of interest on the Earth over multiple epochs of time. A heatmap can then be generated showing the best performance, worst performance, performance percentile, maximum number of satellites LOS, worst number of satellites LOS, percentile number of satellites LOS, duration of the worst performance, and total amount of time under or above a performance threshold for a given amount of time.

Since LEO constellations are complex and not fully launched, the ability of Foresight to predict service quality benefits LEO operators, as well as users. LEO Foresight Risk Analysis can help the LEO operator determine the performance of their services in any constellation's configuration. For example, it can be used with a Block I (first) configuration and then subsequent configurations as more LEO satellites are launched. The resulting analysis can help a LEO service provider understand when they will have a minimum viable service and at what point they will have the optimal constellation configuration to meet their service requirements, and it can all be done in simulation, before launching any satellites. LEO Foresight Risk Analysis can also be used to determine service impacts when satellites are not operating due to errors, end-of-life, de-orbiting, or any other reason that one or more satellites cannot be used, enabling LEO constellation redundancy to be designed, or quality of service to be determined and updated during operation of the LEO constellation, for any location, or area of interest.

The applicant further discloses an important use for Foresight Risk Analysis as a method to determine where Foresight Live (real-time) services are needed. Thresholding is the most common method. A Foresight Risk Analysis can determine that if the worst case GNSS or LEO-PNT DOP in an area meets a "good" threshold then the use of Foresight Live may not provide enough benefit to predict that area in real time. For example, Foresight Risk Analysis determines an area has a worst-case DOP of 2. This would be common in areas without buildings or varying terrain, or above areas with buildings or varying terrain. In these areas a GNSS or LEO-PNT receiver does not need augmentation using Foresight Live to determine the LOS satellites to use, because they are numerous and easy for an un-aided receiver to determine. These areas that Foresight Risk Analysis determines have a worst case DOP of 2 would not be continuously calculated using Foresight Live. This reduces the amount of computation, data storage, and data transmission. This disclosed approach may also be applied for LEO-NTN and signal bandwidth availability calculations, for both initial coverage maps and also on-going operation, with reduced continuous Foresight Live calculations. In both cases, Foresight Live can be activated when needed due to e.g. satellite reductions due to failure, or maintenance. This could either be performed upon demand when satellite service changes, or in a predictive sense, running a number of scenarios using Foresight Risk Analysis, to then produce a series of responses to different scenarios, or events in advance, to support LEO service Operation, Administration and Maintenance (OAM) systems.

LEO services and configurations are significantly more complex and varied than GNSS. The architectures to forecast LEO satellite positions, LOS, DOP, and bandwidth require new methods. Predicting LEO service quality and coverage is needed to support the emerging LEO industry to ensure optimal LEO constellation configurations, improve performance, and assure integrity.

Acronyms

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed here:

| | |
|---|---|
| ADAS | Advanced Driver-Assisted System |
| AGL | Above Ground Level |
| API | Application Programming Interface |
| ASIL | Automotive Safety Integrity Level |
| AWS | Amazon Web Services |
| BVLOS | Beyond Visual Line of Sight |
| CAV | Connected Autonomous Vehicles - self-driving cars and autonomous drones |
| CMS | Content Management System |
| CDN | Content Delivery Network |
| CDNG | CDN Gateway |
| DAV | Detect and Avoid |
| DCM | Digital City Map |
| DEM | Digital Elevation Model |
| DSM | Digital Surface Model - earth's surface and objects on it |
| DOP | Dilution of Precision |
| DTM | Digital Terrain Model |
| ECEF | Earth-centered, Earth-Fixed Positions |
| EO | Earth Observation |
| ERP | Enterprise Resource Planning |
| eVTOL | Electric Vertical Takeoff and Landing |
| F2CDNS | Forecast to CDN Service |
| FAN | Forecast Assured Navigation |
| FBX | Autodesk FilmBox Format (3D Data Interchange) |
| FCaaS | Flight Check as a Service |
| FC | Forecast Controller |
| FCBS | Forecast Call-back Service |
| FES | Forecast Engine Service |
| FO | Forecast Orchestrator |
| FPS | Forecast Processing Store |
| FSCB | Forecast Service Call Back |
| FWS | Forecast Worker Service |
| GEO | Geostationay Satellite |
| GIS | Geographical Information System |
| GNSS | Global Navigation Satellite System |
| GPS | Global Positioning System |
| GPU | Graphics Processing Unit |
| gRPC | Open-source Remote Procedure Call |
| HAV | Hybrid Air Vehicles |

-continued

| | |
|---|---|
| IaaS | Integrity as a Service |
| JSON | JavaScript Object Notation |
| LEO | Low Earth Orbit |
| LES | Logging and Event Service |
| LOS | Line of Sight |
| MCS | Map Curation Service |
| MEO | Middle Earth Orbit |
| MPP | Map Processing Pipeline |
| NLOS | Non-Line of Sight |
| NTN | Non-Terrestrial Network |
| NTP | Network Time Protocol |
| ODD | Operational Design Domain |
| OPR | Orbit Prediction Runner |
| OPS | Orbit Prediction Service |
| OSR | Observation Space Representation |
| P2CDNS | Public to CDN Service |
| PDOP | Position Dilution of Precision |
| PNT | Position, Navigation and Time |
| POC | Proof of Concept |
| PosApp | Positioning Application - Proprietary Spirent software application for multi-channel satellite navigation (GNSS) simulation systems |
| PNT | Position Navigation and Timing |
| PPP | Precise Point Positioning |
| RAIM | Receiver Autonomous Integrity Monitoring |
| RDVS | RINEX Downloader & Validator Service |
| REST | Representational State Transfer |
| RINEX | Receiver Independent Exchange Format |
| RM | Road Map |
| RNAV | Area Navigation |
| RNP | Required Navigation Performance |
| RPC | Remote Procedure Call |
| RTK | Real-Time Kinematic |
| SCS | Schedule Curation Service |
| SDSP | Supplemental Data Service Provider |
| SHP | Shape File - commercial standard for representing geospatial vector data |
| SimGEN | Mode of PosApp: full scenario environment development capability; extended data input/output options, user actions and commands; advanced remote control |
| SimORBIT | Client's orbital modelling software solution specifically developed for Low Eartg Orbit (LEO) satellite simulation |
| SLA | Service Level Agreement |
| SQL | Structured Query Language |
| SS | Scheduler Service |
| SSR | State Space Representation |
| TDOA | Time Difference of Arrival - multilateralization for geolocation of RF emitters |
| TLE | Two Line Element |
| TRANSSEC | Transmission Security |
| TSE | Total System Error |
| TTA | Time to Alarm |
| UA | Unmanned Aircraft |
| UAAA | Urban Advance Air Mobility |
| UAS | Unmanned Aerial System |
| UAV | Unmanned Aerial Vehicles |
| USS | Unmanned Service Supplier |
| UTM | Universal Transverse Mercator coordinate system |
| UTMP | Unmanned Traffic Management Program |
| VMPS | Vendor Map Processing Service |
| VOP | Valid Observable Points |
| WAAS | Wide Area Augmentation System |
| WGS84 | U.S. DoD global reference system for geospatial information for GPS |

The Forecast Assured Navigation (FAN) technology disclosed herein addresses the need of consumer devices, telecommunication equipment, navigation systems, avionics, and vehicles' "clients" that use LEO satellites for satellite communication and broadband access to know where and when the LEO signals will be available, impaired, or not available. The FAN technology can be employed to aid user capacity planning and can be used to provide a detailed analysis and system level evaluation of the throughput, coverage area, frequency of handovers, link absence periods and area capacity density performance of LEO NTN. Clients can exist in a laboratory environment for test and validation, in a planning system before operation of a system, or in a live environment. Existing integrity and augmentation techniques consider many variables, such as the atmosphere, satellite errors and orbits, to improve the performance and reliability of the client. The local environment, such as buildings, are not known to the client and are one of the primary unaddressed sources of errors due to loss of the signal due to obscuration or interference of the signal due to partial obscuration of the signal and multipath. When the client is given a prediction of throughput, frequency of handovers and area capacity density, these can be used to plan future deployments of LEO satellites in order to improve performance of the client.

Autonomous vehicles can benefit from improved information about the reliability of the LEO signals. This information is useful both in real time and for route planning. The process of generating a prediction of LEO signals based on time, position, environmental data, and maps uses various methods to determine satellite obscurations based on position, time, environmental data, and maps. Moreover, the process uses various methods to determine satellite signal degradation due to multipath and other interference based on position, time, environmental data and maps.

The disclosed technology for FAN uses environmental data (maps containing building locations, terrain, vegetation, and other obstacles) to determine LEO satellite obscurations (line-of-sight, non-line-of-sight, out-of-view) at some time in the past, present, or future and for specific locations, also referred to as a LEO obscuration forecast.

The disclosed technology also uses environmental data (maps containing building locations, terrain, vegetation, and other obstacles) to determine LEO satellite multipath at some time in the future and for specific locations, referred to as a LEO multipath forecast.

The disclosed technology applies statistical multipath models to 3D maps that represent a real environment. Existing models detailed in ITU-R P681-11, P. 2145-2, and P. 1407-7 are designed to model multipath for satellite communications. The disclosed technology can extend these and other models for use in LEO despite the fact that they do not use as many satellites or the same exact frequencies. Moreover, existing models use self-generated maps that are synthetically created to represent different types of environments such as urban, suburban, rural and other types of environments. The disclosed technology uses the same algorithms, but instead of self-generated maps uses 3D maps that represent a real environment to generate a prediction of LEO satellite multipath signals.

The disclosed Forecast Assured Navigation (FAN) technology features an obscuration forecast and a multipath forecast, that enable determining in advance where and when LEO signals can be used reliably for navigation, or the amount of bandwidth possible from a LEO NTN satellite. FAN is a cloud-based service which provides additional forecast information about the expected LEO visibility for specific regions around the world, as requested by the end user. This service differs from existing solutions as it also considers the terrain and the built-up environment instead of assuming open sky. SaaS supports receivers, positioning engines and navigation systems to provide better situational awareness of the LEO signals they are receiving. The additional information is computed by applicant using present satellite orbits, LEO simulators and high-definition 3D maps to look into the future and provide the intended solution with a much more precise expected satellite signal visibility than would be available otherwise. This technology supports features for autonomous ground-based vehicles for real-time planning and operation, including automated lane control with or without a known path, and for mission planning for future routes.

The disclosed FAN technology features an obscuration forecast and a multipath forecast, that enable determining in advance where and when LEO is reliable. FAN is a cloud-based service which provides additional forecast information about the expected LEO visibility for specific regions around the world, as requested by the end user. This service differs from existing solutions as it also considers the terrain and the built-up environment instead of assuming open sky. SaaS supports receivers, communication systems, positioning engines and navigation systems to provide better situational awareness of the LEO signals they are receiving. The additional information is computed by applicant using present satellite orbits, simulators and high-definition 3D maps to look into the future and provide the intended solution with a much more precise expected satellite signal visibility than would be available otherwise. This technology supports features for autonomous ground-based vehicles for real-time planning and operation, including automated lane control with or without a known path, and for mission planning for future routes.

A system architecture for providing dilution of precision (DOP) forecasts of LEO PNT or LEO NTN (as a signal of opportunity) for navigation for routing of vehicles, aircraft, alerting humans in vehicles, or wireless devices; or providing bandwidth of LEO NTN for communications, is described next.

System Architecture

FIG. 1 shows example system architecture 100 for providing dilution of precision (DOP) forecasts for LEO navigation for routing of vehicles, aircraft, alerting humans in vehicles, or wireless devices. The system architecture is also used for providing bandwidth forecasts for LEO communications. The architecture includes the design and interfaces for gathering satellite data, environmental data, maps and algorithms, and for storing data via data management, distributing on a cloud architecture and interfacing with users. Because FIG. 1 is an architectural diagram, certain details are intentionally omitted to improve clarity of the description. The discussion of FIG. 1 is organized as follows. First, the elements of the figure will be described, followed by their interconnections. Then, the use of the elements in the system will be described in greater detail.

System architecture 100 includes applicant's cloud 155 with LEO Forecast engine service (FES) 125, map engine and service 128, LEO CDN service 158, visualization block 152 and end user/customer positioning engine 195. LEO Forecast engine service (FES) 125 interfaces with the environmental data module and simulation/algorithm module and calculates predictions of LEO signals for geographically defined areas. The predictions from the LEO Forecast engine service (FES) 125 are stored and then published to the cloud architecture. Applicant's cloud 155 includes LEO Forecast engine service (FES) 125 that utilizes data from forecast models 102 in conjunction with satellite information 116 provided by correction service 106. Forecast models 102 include 3D RF models 112 and SimORBIT 122 for LEO satellite orbit calculation. LEO Forecast engine service (FES) 125 receives map info fusion/LEO 136 via map engine and service 128, and stores and retrieves LEO Forecasts in Spirent's cloud database 144 as part of data management 132, which also includes historical data 142. Data sync engine 146 provides LEO Forecasts to cloud database 168 in LEO CDN service 158, as part of data management 132. Map engine and service 128 also includes 3D maps 138 and base maps 148 among others maps. LEO CDN service 158 includes query handling 176 via API 177 to customer app 186 in end user/customer positioning engine 195, which also handles real time data 196 from customer positioning engine 195. LEO CDN service 158 also handles LEO Forecast subscriptions via subscription management 178 controlled by CMS/ERP 169. Additionally visualization block 152 interfaces with customer positioning engine 195 via web interface 182 via local visualization engine 164, cloud service visualization 166 and GIS layer 162. Local visualization engine 164 displays forecasts stored in applicant cloud database 144 by LEO Forecast engine service (FES) 125 in one implementation of the system.

SimORBIT 122 software is specifically designed to take orbital information, including two line element (TLE) data of current satellites in orbit or orbital data for satellites that have not yet been launched in order to predict actual satellite orbit paths. These calculations include: 1) the gravitational field based on the location of the satellite above the Earth (gravity is inconsistent due to the shape and density of the Earth being non-uniform); 2) the drag associated with the Earth's atmosphere. For LEO satellites, drag is the most significant cause of orbital variation. This is due to the thickness of the atmosphere at low orbit, the impact of solar weather, and the increased impact of solar weather due to the increased atmosphere at low orbit compared to MEO and GEO orbits where GNSS and traditional communications satellites are located; and 3) the speeds of LEO orbits result in a larger change in elevation and azimuth over the same time period when compared to MEO and GEO, and hence requires more frequent calculation.

The disclosed cloud architecture provides a globally distributed, low latency, high-availability system for clients to request LEO Forecasts. Clients can request the LEO predictions for several applications including, but not limited to LEO receivers, measurement engines, positioning engines, consumer devices, telecommunication equipment, navigation systems, avionics, and vehicles for planning, operation, or validation. The disclosed Forecast Engine Service (FES) inputs a map and satellite orbits, and outputs a forecast of LOS/NLOS plus PDOP for any LEO service and in addition the bandwidth for a LEO NTN service for each 1 m² point within the map, in one implementation.

Figure 2:
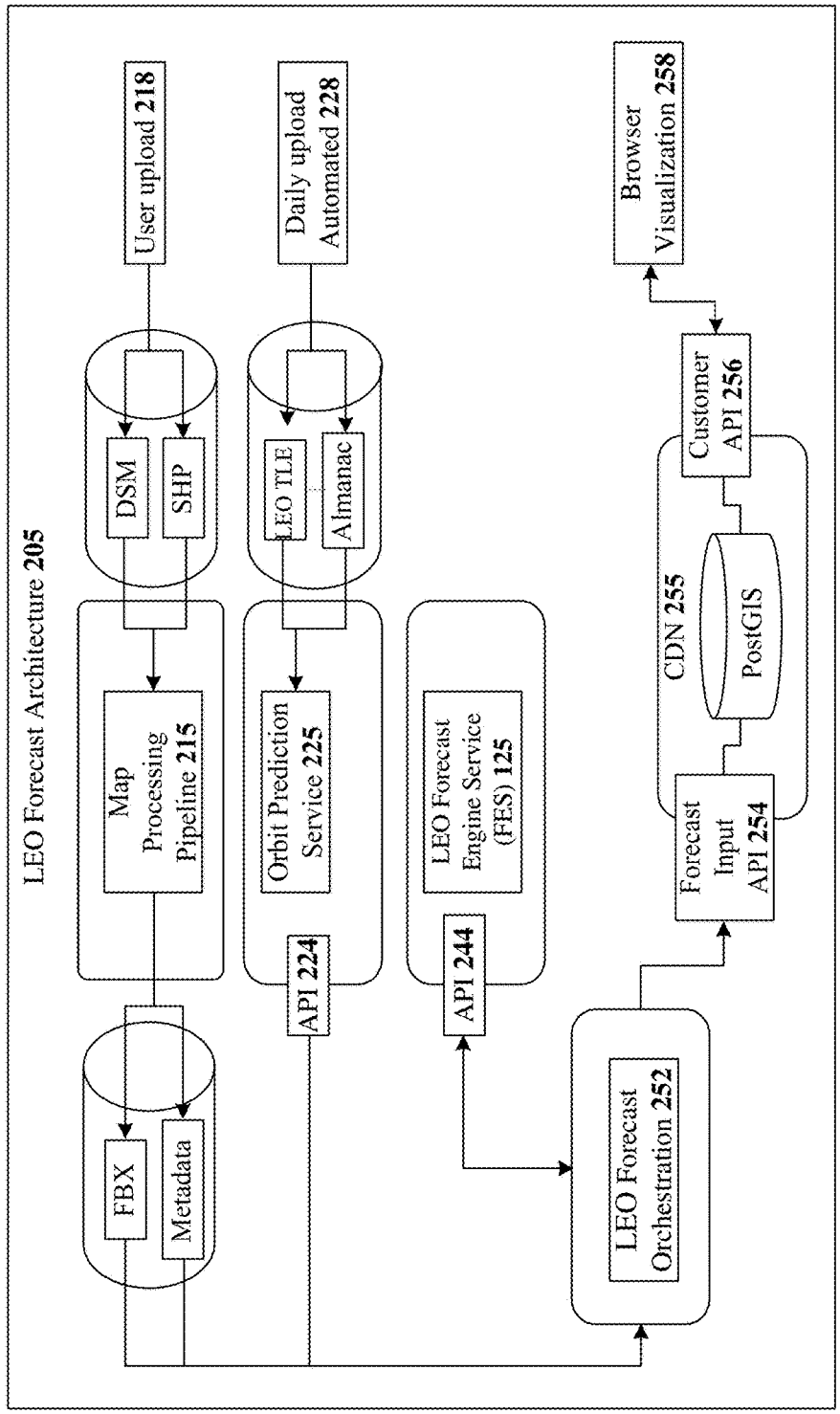
FIG. 2 shows the block diagram for an alternate system implementation in which LEO Forecasts are stored directly from the forecast engine to the CDN.

FIG. 2 shows the block diagram for a system implementation in which LEO Forecasts are stored directly from the forecast engine to the CDN, an alternative to redundant data management described relative to FIG. 1. The block diagram of LEO Forecast architecture 205 utilizes multiple modules. User upload 218 provides inputs to map processing pipeline 215 as digital surface model (DSM) of the earth's surface and objects on it, and shapefile (SHP) that represents shapes as geospatial vector data. Map processing pipeline 215 completes the initial map processing and outputs 3D map data in FBX 3D data interchange format (FilmBox), along with at least one metadata file that describes the map data. The FBX is a 3D model mesh suitable for loading into a GPU and the metadata file contains geographic information about the FBX such as where the FBX "tile" is located on the earth's surface and a list of valid observable points (VOPs). FBX tiles can be different sizes. Processing to 1 Km² utilizes VOPs in a grid of cuboids at 1 m intervals, in one implementation. When creating VOPs, the building footprints are typically masked to not include VOPs inside of buildings. An automated daily upload 228 provides the orbit prediction service 225 the LEO satellite orbital information. Automated daily upload 228 provides the raw satellite navigation system data in Two Line Element (TLE) format. Orbit prediction service 225 handles the initial orbit prediction and sends the orbit prediction data needed by LEO forecast orchestration 252, in the format specified via API 224.

Continuing the description of LEO Forecast architecture 205, LEO Forecast engine service (FES) 125 generates LEO Forecast data, via GPU ray casting (or ray tracing) on FBX data with metadata, and provides the forecast data to LEO Forecast orchestration 252 as specified via forecast API 244 via forecast service call back (FSCB). Management of LEO Forecasts from administrator and customer side can be done over Internet browser services. A mobile interface could be utilized in another implementation. LEO Forecast engine service (FES) 125 generates LEO Forecast data for defined cuboids. Each cuboid has unique ID (GUID). Cuboids get uploaded to LEO Forecast CDN 255 using forecast input API 254 via PostGIS software program that adds support for geographic objects to the PostgreSQL object-relational database, in one implementation. CDN 255 provides the 3D forecast visualization from LEO Forecast orchestration 252 for display with browser visualization 258, via customer API 256. Forecast API 244 enables LEO Forecast CDN 255 to communicate, to LEO Forecast engine service (FES) 125, on-demand requests or other requests for data that CDN 255 was not able to provide to the device, in some embodiments. In summary, LEO Forecast architecture 205 delivers LEO Forecasts via content delivery network 255 to a user/customer of the forecasts. When a user makes a request for data, if CDN 255 does not have a specific cuboid in the CDN database, it creates a new entity. If a cuboid with the defined ID is available, the system can add a new time forecast or update an existing one. Cuboids are provided from LEO Forecast engine service (FES) 125. In case of collision, the previous cuboid, in time, will be replaced. A cuboid can be sliced and modified by LEO Forecast data processor, if needed. The forecast data can be processed prior to sending to the customer in some implementations.

The disclosed LEO Forecast engine service (FES) 125 inputs a map and satellite orbits and outputs a forecast of line-of-sight, non-line-of-sight (LOS/NLOS) plus PDOP or Bandwidth for each 1 m2. FES provides the ability to determine probability, ranking, and scoring of LOS/NLOS, out-of-view LEO satellites in a LEO obscuration forecast, using satellite orbit and atmospheric models from SimORBIT 122 and treating each satellite as a transmission point in the sky. The disclosed technology uses a surveyed global 3D map with shape files and digital city maps (DCM) which show the dimensions of buildings, terrain, vegetation, and other obstacles to ray-trace between selected points on the map, to determine if each satellite is blocked/obscured by objects in the 3D map that is based on the real world. The disclosed technology uses surveyed maps.

Figure 3A:
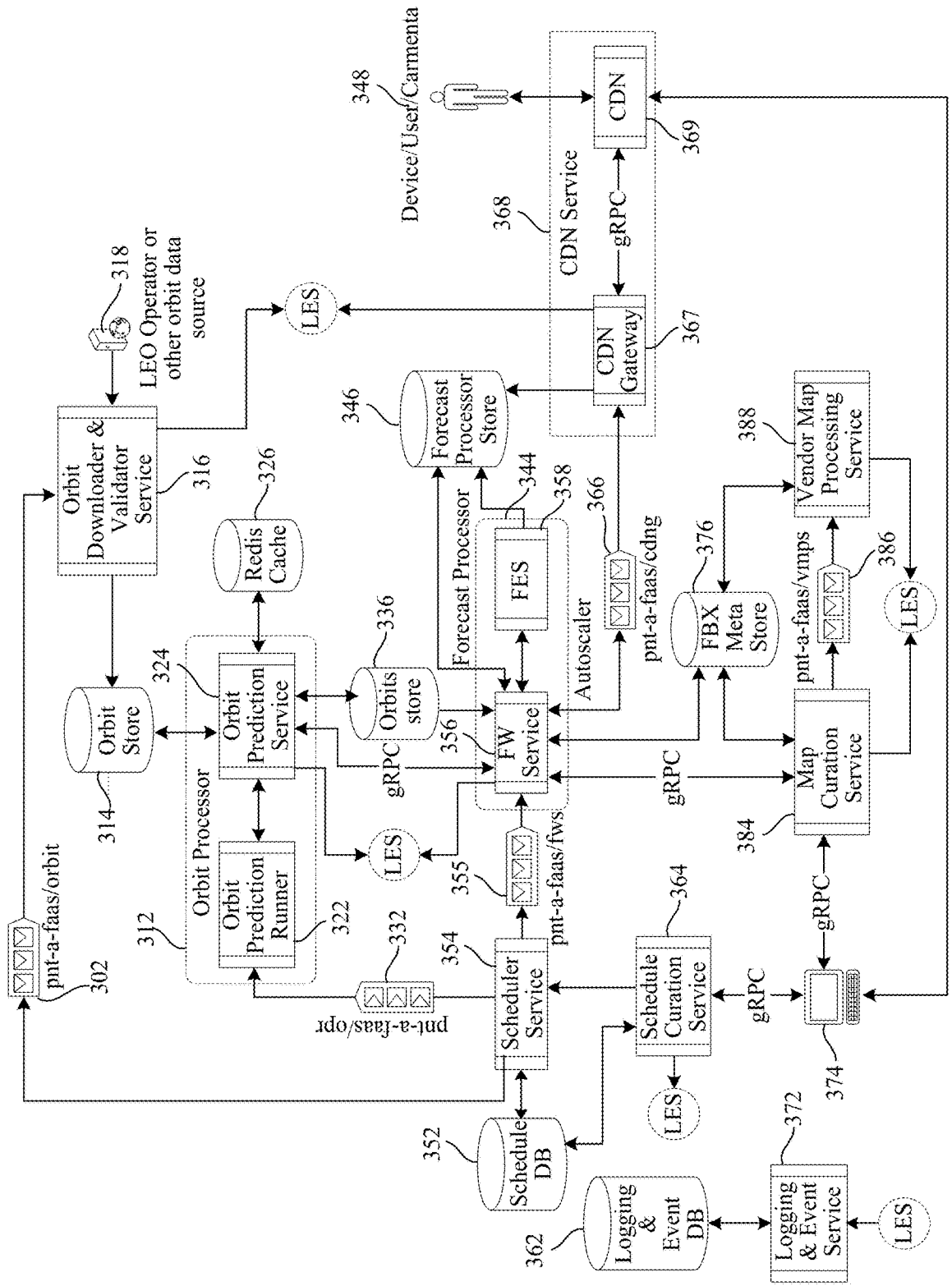
FIG. 3A shows a detailed block diagram of system architecture for providing DOP forecasts for LEO constellations providing Position Navigation and Time (PNT) services for navigation for routing of vehicles, aircraft, alerting humans in vehicles, or wireless devices.

FIG. 3A shows a detailed block diagram of system architecture 300 for providing DOP forecasts for LEO constellations providing Position Navigation and Time (PNT) services for navigation for routing of vehicles, aircraft, alerting humans in vehicles, or wireless devices. System architecture 300 can also provide NTN Communications services not intended for navigation in order for navigation to be possible using the LEO NTN signals as a signal of opportunity with high precision and integrity for navigation for routing of vehicles, aircraft, alerting humans in vehicles, or wireless devices. The system can be implemented in the cloud or using on-premises capabilities. A cloud implementation can utilize Google Cloud Platform (GCP), Amazon Web Services (AWS), or another platform that provides equivalent capabilities. FIG. 3A shows Google remote procedure calls (gRPC) in the example block diagram. In addition to the gRPC request-response model, services could use a message broker for their asynchronous exchanges. The hosted Amazon MQ for ActiveMQ service, which is compatible with Apache ActiveMQ, so can be deployed in on-premises infrastructure, is utilized in one implementation.

Map curation service (MCS) 384 sends requests for digital terrain model (DTM) and shape files to vendor map processing service (VMPS) 388 via PNT-A-FAAS/VMPS message queue 386. An example MCS 384 service call is listed next.

service MapCuration {
  rpc getFBXPath(TileID) returns (FilePath) { }

```
rpc getMetadataPath(TileID) returns (FilePath) { }
rpc getVOPBatchesPath(TileID) returns (FilePaths) { }
...
```

MCS 384 allows upload of new vendor maps and initiates VMPS 388 to convert them to FBX and associated metadata and store them in FBX meta store 376 for retrieval by forecast engine services (FES) 358. An example FES 358 for running a forecast is listed next.

```
syntax = "proto3";
package spirent.pnta;
import "ForecastBatch.proto";
import "google/protobuf/timestamp.proto";
/* FES service to run a forecast. */
service ForecastEngine {
    rpc Forecast(ForecastRequest)
        returns (ForecastResponse) { }
}
message ForecastRequest {
    uint64 job_id = 1;
    string orbit_path = 2;
    string mesh_path = 3;
    string metadata_path = 4;
    string vop_batch_path = 5;
    string output_path = 6;
}
message ForecastResponse {
    google.protobuf.Timestamp processing_time = 1;
}
```

MCS 384 can allow access to the maps that have been uploaded to it through gRPC interface, and allow for upload of vendor data pushed through VMPS 388. VMPS 388 accepts messages from VMPS message queue 386, a pipeline that can process incoming vendor map data and produce FBX tiles along with the tiles' corresponding metadata, including VOP data. An example PNT-A-FAAS/VMF'S message is listed next, as an ActiveMQ JSON message as published by the MCS 384 to the VMPS 388.

```
{
"job_id": 1,
"dataset_s": "Blacksburg_test",
"src_dtm": "Blacksburg_sample_1m_Z17N_0_dtm.tif",
"src_bld_shp":
"Blacksburg_sample_17N_0_3d_buildings_automated.shp",
"tile_x_m": 1000,
"tile_y_m": 1000,
"tile_buf_m": 200,
"dtm_trans_i": -9999,
"bld_vop_buf_m_f": 0.1,
"fbx_dec_ratio_f": 0.1,
"vop_level_list": "1,2,3,4,5,10,20,30",
"publish_all": False
}
```

An example PNT-A-FAAS/CDNG message is listed next, as an ActiveMQ JSON message as published by the FWS 356 to the CDNG 367. The FES 356 will write the forecast for each timestep to a binary protocol buffers file. These files will reside in the shared Forecast Processor Store 346.

```
{
"job_id": 1,
"path": "forecast_batch0.bin"
}
```

Continuing the description of the block diagram, scheduler curation service 364 can allow the user to curate which forecasts to run at which time. The curation can reside in schedule DB 352 which can be used by scheduler service 354 to push new forecast jobs upon forecast message queue PNT-A-FAAS/FWS 355.

An example PNT-A-FAAS/FWS message is listed next, as an ActiveMQ JSON message as published by the SS 354 to the FWS 356 for LEO-PNT.

```
{
"job_id": 1,
"tile_id": 1,
"start": 1272844800,
"end": 1272844820,
"time_resolution_s": 1,
"level": 1,
"elevation_cutoff_d": 0,
"forecasts": {
    "los": 1,
    "azel": 1,
    "pdop": [
"all",
"gps",
"gps+glonass"
],
}
}
```

An example PNT-A-FAAS/FWS message is listed next, as an ActiveMQ JSON message as published by the SS 354 to the FWS 356 for LEO-NTN.

```
{
"job_id": 1,
"tile id": 1,
"start": 1272844800,
"end": 1272844820,
"time resolution_s": 1,
"level": 1,
"elevation cutoff_d": 0,
"forecasts": {
"type": "ntn",
"azel": 1,
"bandwith": 1
}
}
```

Scheduler service 354 can also schedule the running of orbit prediction runner 322 to cache a new orbit in advance via PNT-A-FAAS/orbit 302. An example PNT-A-FAAS/ orbit message is listed next, as an ActiveMQ JSON message as published by the SS 354 to the RDVS 316.

```
{
"job_id": 1,
"start": 1272844800,
"end": 1272844820,
"igs_list": ["BREW", "BRUX"]
}
```

Orbit downloader and validator service 316 requests Two Line Element Sets (TLE) from a LEO Operators HTTPS server for LEO 318, or other TLE providers. The downloaded TLE data is the full constellation published data for LEO satellites. Downloaded orbit files can be stored in Orbit Store 314 so that they are accessible by orbit prediction service (OPS) 324. A verification process can be required after download.

Logging and event service (LES) 372 is a repository that can record the state and history of the forecast system. LES can accept, record and report on both service logging data and real time events. Each service can be automatically collected and pushed into Logstash, with a timestamp, which requires that each service be synchronized through NTP. An ELK stack can be utilized for LES, in one implementation.

Orbit processor 312 includes orbit prediction service (OPS) 324 which predicts forward locations of satellites and caches data in Redis cache 326 and orbit prediction runner (OPR) 322 for caching a new orbit in advance. Orbit Prediction Service 324 predicts the orbits for all the satellites within each constellation that has been enabled within the scenario run by SimORBIT. The supported constellations are outlined in the 'Constellation' Enum within the ForecastBatch.proto. Scheduler service 354 can request orbit predictions via PNT-A-FAAS/OPR 332. An example PNT-A-FAAS/OPR message 332 is listed next, as an ActiveMQ JSON message as published by the SS 354 to the OPR 322.

```
{
"job_id": 1,
"start": 1272844800,
"end": 1272844820,
"time_resolution_s": 1
}
```

The orbit predictions are serialized to orbits store 336, a shared file store, and the path of the orbit prediction file is returned as part of the gRPC message. The cache only stores the file path and hence is not large. OPR 322 is a small ActiveMQ subscriber that listens for new jobs and then calls the gRPC interface to initiate an orbit prediction, in one implementation of the disclosed technology. OPS 324 gRPC/Protobuf format is listed below.

Further continuing the description of the block diagram shown in FIG. 3A, Forecast Worker Service (FWS) 356 accepts a message from FWS message queue 355 and initiates a forecast and then waits for the success or error response from forecast engine service (FES) 358. Listed next is a high level example implementation of FWS 356 to run a forecast, interacting with the FES 358, OPS 324 and MCS 384.

```
syntax = "proto3";
package spirent.pnta;
import "ForecastBatch.proto";
service ForecastWorker {
  rpc Forecast(ForecastWorkerRequest) returns (stream
     ForecastWorkerResult) { }
}
message ForecastWorkerRequest {
  uint64 job_id = 1;
  uint64 tile_id = 2;
  GPSTime start = 3;
  GPSTime end = 4;
  uint32 time_resolution_s = 5;
}
message ForecastWorkerResult {
  string forecast_path = 1;
}
```

Once the FES forecast is complete, FWS 356 can check FWS message queue 355 and if messages are queued, FWS 356 can initiate another forecast with the new message data. FWS 356 has a one-to-one mapping to FES 358, gathering the data required by FES 358 and interacting with the system, allowing FES 358 to be run locally the same way as it would run within a cloud environment. Computing all satellites within a constellation for every second over a forecast period only needs to be completed once as the resulting earth-centered, earth-fixed (ECEF) positions can be cached and served to any service requesting the data, with normal CDN latency and delivery time. FES 358 can allow for a simple elevation cut-off since many of the satellites will be NLOS due to the earth but will now be available to FES 358.

LEO Forecast engine service (FES) 358 is operable in multiple modes. In on-demand mode, the data requested by the user has not been forecasted within the Spirent Cloud and therefore is not in the CDN 369. This mode is referred to as a CDN cache miss. The request prompts creation of a real-time forecast and the data gets sent from LEO Forecast engine service (FES) 358 to the CDN 369, and the CDN 369 routes the data directly to the user. This type of request has no upfront storage requirement in the CDN, and has a higher latency than other modes described herein. The data generated by an on-demand request gets stored in the CDN 369 and in the applicant's cloud for future requests and is available until the data's useful life expires. Additionally, a hybrid mode may be used whereby some data may be stored in the CDN and some data may be computed on-demand upon request.

One way to achieve on-demand forecasting is to add a gRPC call to the CDNG 367, that would be called from the CDN 369 with the on-demand customer request. The CDN 369 can first check that the area requested is not currently covered by the stored data and if not covered, then push the request to CDNG 367. On receipt of the request the CDNG 367 could query the MCS 384 for the tiles that the request covers. If the area does not yet have coverage, then a "no-coverage" response is returned to the CDN 369. If there is coverage for the requested area then an "OK" is returned to the CDN 369 and the tiles, from, to date times are placed on a second "On-Demand" Forecast Message Queue. In turn a Forecast Processor 344 can be spun up or be waiting in a "stand-by" mode to process the request. Once processed, the data can be transferred to the CDN 369 via the CDNG 367 either through the method described above or via a separate priority gRPC CDN call.

In hybrid mode, the data requested by the user has been forecasted already in the Spirent cloud and is available in the Spirent cloud database, but the forecast data is not available in the CDN 369. This mode is referred to as CDN cache miss and applicant cloud cache hit. In hybrid mode, the data will be sent from the Spirent cloud to the CDN 369 and the CDN 369 routes the data directly to the user 348. This type of request has no upfront storage requirement in the CDN 369, does have a storage requirement in the applicant's cloud, and will have moderate latency relative to other modes described herein. The data generated by this request gets stored in the CDN 369, and is available until the data's useful life expires.

In cached mode, the data requested by the user is available in the CDN 369 and is immediately sent to the user; this mode is referred to as a CDN cache hit. This cached mode has the highest storage requirement and the lowest latency relative to the modes described herein. In cached mode, the data gets pushed from the Spirent cloud to the CDN 369. The service area and valid time periods are selected by applicant in advance, based on user demand, SLAs, and cost models. The data is stored on the CDN 369 and is available until the data's useful life expires.

Frequency of data requests, complexity of the requests, forecast time, and latency of the requests are considered for determining what data to cache and which data to provide on demand. Use cases that demand low latency are forecasted on demand. Customer density and time of day of requests affect the frequency of requests. Requested forecast resolution and level of complexity of areas affect the complexity of requests.

CDN service 368 includes CDN gateway (CDNG) 367 and an interface for communication with devices, users and visualization systems 348. CDNG 367 receives messages from the CDNG message queue 366. Each message represents a file to upload to CDN 369. CDNG 367 can read the protocol buffer file from forecast processor service (FPS) 344 and then call the CDN gRPC function to accept the file stream.

Continuing the description of the block diagram shown in FIG. 3A, console window 372 provides a window into the forecasting system. The operator's view of the system can be through a browser-based UI that is driven by the data retrieved from the Scheduler Curation Service 364, Map Curation Service (MCS) 384 and Logging and Event Service (LES) 372. Descriptions of operator console use case examples follow. (1) Upload of vendor map data to MCS 384 to be converted to FBX/VOPs, with notification when conversion is complete. (2) View the full set of 1 Km$^2$ tiles that have been converted, via a query to MCS 384 and then visualize the tiles as overlays on Open Street Maps, or an equivalent rendering interface. This allows for differentiating between the tiles that are already part of the forecast schedule and those that are not, and allows the user to select the tiles they wish to add into the forecast scheduler. (3) Change the forecast schedule kick off time, orbit data download time or orbit prediction time, and view the times relative to each other. (4) Watch the system as it dynamically schedules a forecast. When the system dynamically schedules a forecast, the scheduler queues a 1 Km 2 message on the forecast queue which auto-scales out the forecast processors to pop a message off the queue and to run the forecast for the specified tile. As the forecast runs, metrics are flowed back via LES 372. Each time step of forecast is held within forecast processor store (FPS) 346, to then be retrieved by the CDNG 367 to be uploaded to CDN 369. Knowing how full FPS 346 is and, what, and how much data has been transferred to CDN 369 can help administrators keep a cap on costs, and ensure the system is functioning as expected. (5) Notifications of stalled or errored processes, such as logging/event and notification tracing by tile ID. For example, a customer reports a problem with an area which the user of the system can look up and trace back to a particular tile and then search the logs for that tile ID and time etc. for diagnostics. (6) Processing of statistics of time, memory, space that each service is taking up, to allow for better utilization and optimization.

Upon receipt of a query, CDN 369 determines what tiles are needed for the area, and creates a manifest list with the representation file IDs from the included tiles, and sends the manifest list to client, which determines what resolution is needed, and makes file requests for data to CDN file storage. In one example, for 1 km$^2$ area with tile size of 50×50×1 meters, 400 tiles represent the specified query response. The manifest list response is a single JSON (or similar file format) with 400 tiles of metadata and file IDs. In the low spatial/low data selection, the file request and file response is 400 files, with 40,000 points. For high spatial/low data selection the file request and response is for 1600 files, with 1 M points. For the high spatial/high data option, the request and response are for 1600 files, with 1 M points. In a second example, for a 1 km route with 50 m width, with tile size of 50×50×1 meters, 20 tiles represent the specified query response. The manifest list response is a single JSON (or similar file format) with 20 tiles of metadata and file IDs. In the low spatial/low data selection, the file request and file response is 20 files, with 1,000 points. For high spatial/low data selection the file request and response is for 80 files, with 50 k points. For the high spatial/high data option, the request and response are for 80 files, with 50 k points. In conclusion, GIS DB and CDN file storage architecture yields fast DB search and initial API response to client, and keeps DB small and if tiles are not changing can be indexed once. The client determines what resolutions to request, and may not need to ask twice when going from area to path search. New representations can be added in another embodiment, without changing the DB. Also client can stream files. Data files can be created and stored directly from FES 358 in the GPU, for some implementations. Computation/aliasing of different resolutions get computed efficiently in the GPU.

Forecast engine service (FES) 358 can compute line of sight (LOS), azimuth and elevation, and position dilution of precision (PDOP) for any LEO satellite. Forecast engine service (FES) 358 can compute bandwidth for LEO NTN satellites. LOS will be recorded for each satellite at each VOP. PDOP and/or bandwidth can be recorded for every VOP when there is a change in LOS or each six seconds. Azimuth and elevation can be recorded on a forecast basis for every satellite when their values change. The term "temporal compression" describes this approach. To make it easier for a client to request data, the height element in their request is assumed to be zero for local ground level and then meters above that. The height used by FES 358 is with reference to the WGS84 ellipsoid. Since local ground can vary from meter to meter a concept of "level" is required for grouping. The zero level is considered as ground and hence FES 358 is required to indicate the level for which the current dataset is being generated.

Dataflow for forecast engine service 358 can be described in six steps. In step one, vendor map is uploaded to Map Curation Service 384, and conversion to FBX metadata starts. At step two, map administrator selects 1 Km$^2$ tiles to add to the forecast scheduler database. At step three, forecast schedule, orbit data download and orbit prediction times are schedule to execute. At step four, forecast service auto-scales processor engines to perform the forecast. At step five, computed forecast data is moved from cache to CDN, ready for availability to customers. At step six, system analytics and processing events are monitored to trace customer feedback and optimize the forecast engine services platform.

Figure 3B:
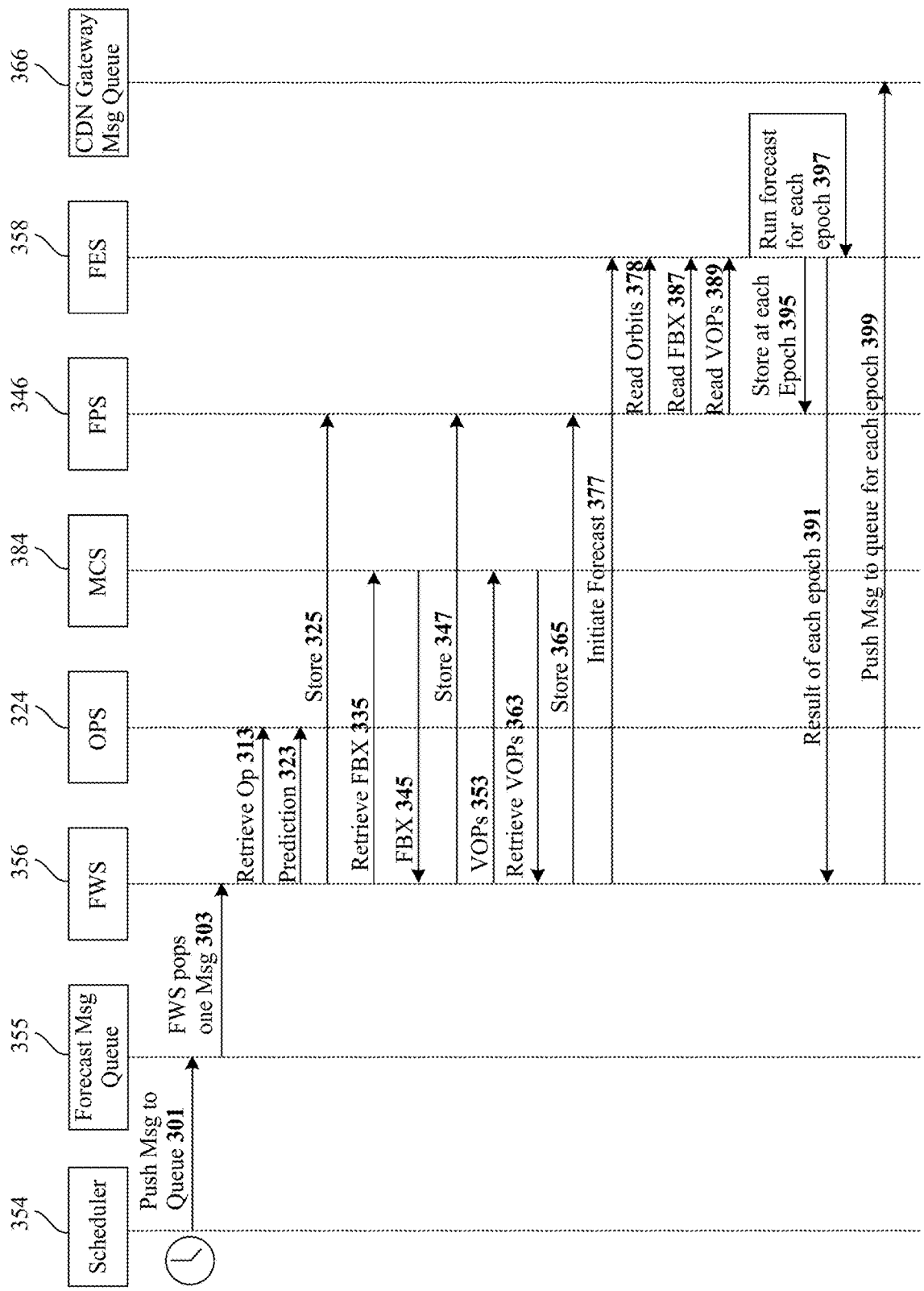
FIG. 3B shows a message flow for interactions of forecast worker service (FWS) with other services.

FIG. 3B shows a message flow for interactions of forecast worker service (FWS) 356 with other services. To initiates a forecast, scheduler 354 pushes messages 301 to forecast message queue 355. FWS 356 pops one message 303 and retrieves orbit prediction 313 from OPS 324 as prediction 323, and stores the orbit prediction in FPS 346. Then FWS 356 retrieves FBX 335 from MCS 384 as FBX 345, and stores the FBX 347 in FPS 346. Then FWS 356 retrieves VOPs 353 from MCS 384 as VOPs 363, and stores them in FPS 346. Then FWS 356 initiates forecast 377 from FES 358. FPS 346 reads orbits 378, FBX 387 and VOPs 389 into FES 358. Then FES 358 runs a forecast for each epoch 397 and stores the forecast at each epoch 395 in FPS 346. FES 358 also returns the result of each epoch 391 to FWS 356 that pushes the results via CDNG message queue for each epoch 399. Once the FES forecast is complete, FWS 356 can check FWS message queue 355 and if messages are queued, FWS 356 can initiate another forecast with the new message data.

Since all satellites are passed to FES 358 for processing, FES 358 can cull satellites below a given elevation cut off point. A default of zero degrees is utilized in one implementation. Orbit Prediction Service (OPS) 324 predicts the orbits for all the satellites within each constellation. The supported constellations are outlined in the 'Constellation' Enum within the ForecastBatch.proto, which is described in the Forecast Assured Navigation (FAN) APIs section below. Times are in GPS time i.e. seconds since 1980-01-6T00:00:00+00:00. OPS 324 gRPC/Protobuf format is listed next.

```
syntax = "proto3";
package spirent.pnta;
import "ForecastBatch.proto";
service OrbitPredictionService {
  rpc Predict(OrbitPredictionRequest)
    returns (OrbitPredictionResult) { }
}
message OrbitPredictionRequest {
  uint64 job_id = 1; // Job ID trace
  GPSTime start = 2;
  GPSTime end = 3;
  uint32 resolution_s = 4; // If not defined then assumed to
  be 1 second
}
message OrbitPredictionResult {
  uint64 job_id = 1; // Job ID trace
  string path = 2; // Path to prediction file, relative to mount
}
message OrbitPrediction {
  GPSTime valid_from = 1;
  GPSTime valid_to = 2;
  uint32 time_resolution_s = 3;
  repeated TimedSatellitePosition series = 4;
}
message TimedSatellitePosition {
  GPSTime timestamp = 1; // Time of applicability of position
  repeated SatellitePosition satellite = 2;
}
message ECEFPosition {
  double x = 1; // Metres
  double y = 2; // Metres
  double z = 3; // Metres
}
message SatellitePosition {
  Satellite = 1; // Constellation and SVID
  ECEFPosition position = 2;
}
```

Scheduler Curation Service 364 allows a user to set up jobs to run periodically and allows those jobs to accept templated message parameters, so that the services are called with the correct arguments. Forecasts are tile based and are required to run for a given prediction duration from a start date-time. The Scheduler Curation Service 364 runs on the schedule specified. OPR 322 subscriber listens for new jobs and then calls the gRPC interface to initiate an orbit prediction. Orbit prediction service (OPS) 324 accesses downloaded orbit data stored in Orbit Store 314. If the requested forecast is not in the orbit cache, then OPS 324 retrieves the closest orbit data files for the given date, and predicts orbits, and send the orbit prediction to OPR 322. OPS 324 also sends the prediction to orbit cache for retrieval by other services, in one implementation.

APIs for Forecast Assured Navigation (FAN)

APIs for requesting and retrieving forecast points and forecast areas are disclosed for retrieving a forecast for a set of points at ground level, for 2D, and at any height relative to the ground for 3D, via the WGS84 standard U.S. DoD global reference system for geospatial information. The Forecast data can include DOP for MEO-GNSS and LEO-GNSS satellites, and bandwidth for LEO-NTN satellites.

Forecast ingress API defines the interface protocol between CDNG 367 and CDN 369. The ForecastBatch.proto defines the data format of the ForecastBatch datafiles which are uploaded from FES 358 to CDN 369 via CDNG 367. The proto protocol buffer utilizes a language-neutral, platform-neutral, extensible mechanism for serializing the structured data. The customer facing API endpoints will be served by CDN 369. Communication between CDN 369 and CDNG 367 is based on the gRPC framework, in one implementation with CDN providing a gRPC response to the user/device 348. A user/device 348 may opt to formulate data requests to CDN 369 using HTTP requests, in a different embodiment. A ForecastBatch.proto datafile is a single block of output by FES 358. In one example, this represents an area of 100×100 m2. Map tiles correspond to a 1.2×1.2 km2 area, in one implementation. The size dimensions can be different in different implementations. ForecastBatch.proto parameters are described next.

| <containing message>.<qualified parameter name> | Datatype (Message or other) | Units | Notes |
|---|---|---|---|
| ForecastBatch | (Overarching message) | — | The ForecastBatch message is the highest-level message that encapsulates all the subsequent messages. |
| ForecastBatch.forecastbatch_metadata | Metadata | — | The Metadata message contains other messages explained in this section and applies to the specific forecast batch. |
| ForecastBatch.per_point | ForecastPerPoint | — | This is the container message for the forecast parameters (DOP and LOS only) applying to each observation point. |
| ForecastBatch.per_batch | ForecastPerBatch | — | This is the container message for the azimuth/elevation forecast parameters applying to the whole ForecastBatch corresponding area (100 m × 100 m in one use case). |
| Metadata.forecast_validity_period | GPSTimeRange | — | Start and End of validity period of forecast batch in GPS time. |
| Metadata.area | Quad2D | — | This area comprises four points that define the |

-continued

| <containing message>.<qualified parameter name> | Datatype (Message or other) | Units | Notes |
|---|---|---|---|
| | | | horizontal (Lat/Lon) coordinates of the lower and upper faces of the bounding box. |
| Metadata.height_agl | double | meters | The AGL height of the forecast batch is the height above ground level. Note that ground level is always AGL = 0 m. AGL can be a positive or negative number. |
| Metadata.height_agl_range | HeightAGLRange | — | See explanation for HeightAGLRange message. |
| Metadata.height_wgs84_range | HeightWGS84Range | — | See explanation for HeightWGS84Range message. |
| Metadata.point_grid_resolution | double | meters | The grid resolution is a positive number, stating the distance between adjacent prediction points. Default value is 1 m. |
| Metadata.forecast_type | ForecastType | — | See explanation for ForecastType message. |
| ForecastPerPoint.point_forecast | PointForecast | — | See explanation for PointForecast message. |
| ForecastPerBatch.satellite_az_el_forecast | SatelliteAzElForecast | — | See explanation for SatelliteAzElForecast message. |
| PointForecast.point | Point3DWGS84 | — | The 3D coordinates of the observation point in WGS84. |
| PointForecast.los | SatelliteLOSForecast | — | The container for LOS forecast information for this observation point, see explanation of SatelliteLOSForecast message for more details. |
| PointForecast.dop | DOPForecast | — | The container for PDOP forecast information for this observation point, see explanation of DOPForecast enumeration list for more details. Only PDOP using all available satellites and constellations is provided currently, future releases may include other DOP types, e.g. GDOP, or different constellation combinations e.g. GPS + GLONASS only. |
| SatelliteAzElForecast.satellite | Satellite | — | This parameter contains all the essential information to identify a satellite in the forecast (i.e., SVID, see svid explanation below) and constellation). |
| SatelliteAzElForecast.coordinates | SatelliteAzEl | — | This contains the azimuth/elevation (rounded to the nearest degree) for each satellite in the forecast batch, noting that the Az/El do not change between observation points within the forecast batch, as the size of the corresponding area (100 m × 100 m) has a negligible effect on the satellite azimuth and elevation observed by individual forecast points. |
| GPSTimeRange.from | GPSTime | — | GPSTimeRange provides a range of time values in GPS time. It can be used to define data validity periods, or the applicable period of a user's request and the corresponding manifest file response by the CDN. It should be noted that GPS |
| GPSTimeRange.to | GPSTime | — | |

-continued

| <containing message>.<qualified parameter name> | Datatype (Message or other) | Units | Notes |
|---|---|---|---|
| | | | Time is different to UTC time by the number of leap seconds since the start of GPS Time (midnight of Jan. 6$^{th}$, 1980). At the time of writing, UTC Time lags 18 seconds relative to GPS Time. |
| Quad2D.nw_corner | Point2D | — | These four points define the |
| Quad2D.ne_corner | Point2D | — | horizontal coordinates of the of |
| Quad2D.sw_corner | Point2D | — | the lower and upper surfaces of |
| Quad2D.sw_corner | Point2D | — | the cuboid. |
| HeightAGLRange.min_height_agl | double | meters | This is the minimum AGL height of the bounding box. |
| HeightAGLRange.max_height_agl | double | meters | This is the maximum AGL height of the bounding box. |
| HeightWGS84Range.min_height_wgs84 | double | meters | This is the minimum WGS84 height of the bounding box. |
| HeightWGS84Range.max_height_wgs84 | double | meters | This is the maximum WGS84 height of the bounding box. |
| ForecastType | enum | unitless | Enumeration of values: "DOP", "LOS", "AZ_EL". This element is also provided to future-proof the ForecastBatch proto file. This is the type of the Forecast data provided in each ForecastBatch "DOP" provides information for "LOS" and "AZ_EL" too, in some implementations.. |
| Point3DWGS84.position | Point2D | — | Point3DWGS84 provides the |
| Point3DWGS84.height_wgs84 | double | meters | 3D coordinates of a single Forecast observation point in WGS84. |
| SatelliteLOSForecast.satellite | Satellite | — | The |
| SatelliteLOSForecast.measurement | LOSForecast | — | SatelliteLOSForecast message provides information about when a satellite is LOS as a series of repeated periods (whose start and end are in GPS time). It follows that a given satellite is NLOS in-between those periods. |
| DOPForecast.valid_from | GPSTime | — | This is the GPS time that the PDOP forecast is valid from. Note that the PDOP has no expiry time, but it is revoked instead by a new PDOP forecast. |
| DOPForecast.dop_result | DOPResult | — | See explanation for DOPResult message. |
| Satellite.constellation | Constellation | — | See explanation for Constellation enumeration list. |
| Satellite.svid | uint32 | unitless | PRN for all constellations except for GLONASS where it represents the satellite's slot number. |
| SatelliteAzEl.valid_from | GPSTime | — | The start of validity of the satellite azimuth/elevation of the forecast batch in GPS time. |
| SatelliteAzEl.coordinate | AzimuthElevation | — | The satellite azimuth/elevation of the forecast batch in GPS time. |
| LOSForecast.los_forecast_validity | GPSTimeRange | — | This is a single GPS time range that shows when a satellite is visible. |
| GPSTime.seconds | uint64 | seconds | GPS Time is the number of seconds since the start of GPS Time (Jan. 6$^{th}$, 1980). Example: a value of 1,857,945,600 corresponds to midnight of Sunday, 21 Nov. 2038. |
| Point2D.latitude | double | degrees | Latitude in decimal degrees relative to WGS84. |

-continued

| <containing message>.<qualified parameter name> | Datatype (Message or other) | Units | Notes |
| --- | --- | --- | --- |
| Point2D.longitude | double | degrees | Longitude in decimal degrees relative to WGS84. |
| Constellation | enum | — | Enumeration of GNSS/SBAS constellations: "GPS"; "GALILEO"; "GLONASS"; "BEIDOU"; "WAAS"; "EGNOS"; "MSAS"; "QZSS"; "GAGAN"; and "SDCM". |
| DOPResult | enum | — | Enumeration of PDOP value classes: "IDEAL" [0-1); "EXCELLENT" [1-2); "GOOD" [2-5); "MODERATE" [5-10); "FAIR" [10-20); "POOR" [20+); "NO_DOP", e.g., "IDEAL" corresponds to a PDOP from 0 to 1 (not inclusive). A "NO_DOP" value means that less than four satellites were available at the time of PDOP calculation. Note that at the time of writing, PDOP is calculated when there is a change in the set of LOS satellites, due satellite(s) rising/setting, or two minutes after the last PDOP calculation, even if there have been no changes in the LOS set of satellites since the last PDOP calculation. |
| AzimuthElevation.azimuth | float | degrees | Azimuth of a satellite w.r.t. ForecastBatch centroid local horizon (North at 0° and positive anti-clockwise). Range from 0° (inclusive) to 360° (exclusive), rounded to the nearest 1°. |
| AzimuthElevation.elevation | float | degrees | Elevation of a satellite w.r.t. ForecastBatch centroid local horizon. Range from −90° (inclusive) to +90° (inclusive), rounded to the nearest 1°, noting that at the time of writing the FES will exclude from the calculations any satellites with negative elevation. |

Device API defines the interface protocol between a user/device visualization app and CDN 369. The device API is realized by the device API file which defines the serialized binary format of the user/device requests to CDN 369, and the subsequent CDN gRPC response. The DeviceAPI.proto file definitions are wrapped into a navmatix.leo_forecast.device_api package. Device API is listed next.

```
service Device {
  rpc GetManifestBy3DAGLPolygon(GetManifestBy3DAGLPolygonRequest) returns (Manifest) { }
  rpc GetManifestBy3DWGS84Polygon(GetManifestBy3DWGS84PolygonRequest) returns (Manifest) { }
  rpc GetManifestBy3DAGLPath(GetManifestBy3DAGLPathRequest) returns (Manifest) { }
  rpc GetManifestBy3DWGS84Path(GetManifestBy3DWGS84PathRequest) returns (Manifest) { }
}
service Auth {
  rpc Auth(AuthRequest) returns (AuthResponse) { }
}
message GetManifestBy3DAGLPolygonRequest {
  spirent.pnta.GPSTimeRange request_time_range = 1; // Start and End time of request in GPS time
    double min_height_agl = 2;
    double max_height_agl = 3;
    repeated Point2D points = 4;
    repeated spirent.pnta.ForecastType types = 5; // Types of forecast requested
```

```
}
message GetManifestBy3DWGS84PolygonRequest {
   spirent.pnta.GPSTimeRange request_time_range = 1; // Start and End time of request in
GPS time
   double min_height_wgs84 = 2;
   double max_height_wgs84 = 3;
   repeated Point2D points = 4;
   repeated spirent.pnta.ForecastType types = 5; // Types of forecast requested
}
message GetManifestBy3DAGLPathRequest {
   spirent.pnta.GPSTimeRange request_time_range = 1; // Start and End time of request in
GPS time
   repeated Point3DAGL points = 2;
   repeated spirent.pnta.ForecastType types = 3; // Types of forecast requested
}
message GetManifestBy3DWGS84PathRequest {
   spirent.pnta.GPSTimeRange request_time_range = 1; // Start and End time of request in
GPS time
   repeated spirent.pnta.Point3DWGS84 points = 2;
   repeated spirent.pnta.ForecastType types = 3; // Types of forecast requested
}
message Manifest {
   repeated ManifestItem items = 1;
}
message ManifestItem {
   string url = 1;
   spirent.pnta.ForecastMetadata manifest_item_metadata = 2;
   Compression compression = 3;
   int64 file_size = 4; // In bytes
   string file_hash = 5; // SHA-256 as hex
}
message Point2D {
   double latitude = 1;
   double longitude = 2;
}
message Point3DAGL {
   Point2D position = 1;
   double height_agl = 2;
}
message AuthRequest {
   string api_key = 1;
}
message AuthResponse {
   string auth_token = 1;
}
enum Compression {
   NONE = 0; // No compression
}
```

DeviceAPI.proto imports the message definitions from the ForecastBatch.proto to avoid duplicate messages/datatypes declarations and to facilitate consistency and maintenance of these files, so a customer needs to be provided both DeviceAPI.proto and ForecastBatch.proto files. DeviceAPI.proto file parameters are described next.

| <containing message>.<qualified parameter name> | Datatype (Message or other) | Units | Notes |
|---|---|---|---|
| Device | (service) | — | The service encapsulates a number of RPC methods to accommodate customer path/polygon and WGS84/AGL height requests as explained in this table. |
| GetManifestBy3DAGLPolygon | (method) | — | Input argument: GetManifestBy3DAGLPolygonRequest Response: Manifest |
| GetManifestBy3DWGS84Polygon | (method) | — | Input argument: GetManifestBy3DWGS84PolygonRequestet Response: Manifest |
| GetManifestBy3DAGLPath | (method) | — | Input argument: GetManifestBy3DAGLPathRequest Response: Manifest |
| GetManifestBy3DWGS84Path | (method) | — | Input argument: GetManifestBy3DWGS84PathRequest Response: Manifest |

| <containing message>.<qualified parameter name> | Datatype (Message or other) | Units | Notes |
|---|---|---|---|
| Auth | (service) | — | Input argument: AuthRequest<br>Response: AuthResponse<br>This is the authorisation process request - a user sends an API key (provided by Spirent) to the CDN, and if successful, the CDN returns an authorisation token with expiry date. |
| GetManifestBy3DAGLPolygonRequest.request_time_range | spirent.pnta.GPSTimeRange | — | Start and end time of user request (quadrilateral polygon with AGL height) in GPS time. |
| GetManifestBy3DAGLPolygonRequest.min_height_agl | | meters | Minimum AGL height of user-requested quadrilateral polygon. |
| GetManifestBy3DAGLPolygonRequest.max_height_agl | | meters | Maximum AGL height of user-requested quadrilateral polygon. |
| GetManifestBy3DAGLPolygonRequest.points | Point2D | — | A set of at least four 2D points (Lat/Lon) of user-requested polygon in WGS84. A closed polygon is expected (i.e., by repeating the first entered point). |
| GetManifestBy3DWGS84PolygonRequest.request_time_range | spirent.pnta.GPSTimeRange | — | Start and end time of user request (quadrilateral polygon with WGS84 height) in GPS time. |
| GetManifestBy3DWGS84PolygonRequest.min_height_agl | | meters | Minimum WGS84 height of user-requested quadrilateral polygon. |
| GetManifestBy3DWGS84PolygonRequest.max_height_agl | | meters | Maximum WGS84 height of user-requested quadrilateral polygon. |
| GetManifestBy3DWGS84PolygonRequest.points | Point2D | — | A set of at least four 2D points (Lat/Lon) of user-requested polygon in WGS84. A closed polygon is expected (i.e., by repeating the first entered point). |
| GetManifestBy3DAGLPathRequest.request_time_range | spirent.pnta.GPSTimeRange | — | Start and end time of user request (path with AGL height) in GPS time. |
| GetManifestBy3DAGLPathRequest.points | Point3DAGL | — | Set of repeated 3D points (Lat/Lon in WGS84, height in AGL) of user-requested path. At least one point is expected in the user request. |
| GetManifestBy3DWGS84PathRequest.request_time_range | spirent.pnta.GPSTimeRange | — | Start and end time of user request (path with WGS84 height) in GPS time. |
| GetManifestBy3DWGS84PathRequest.points | spirent.pnta.Point3DWGS84 | — | Set of repeated 2D points (Lat/Lon) of user-requested path in WGS84. At least one points is expected in the user request. |
| Manifest.items | ManifestItem | — | See explanation for ManifestItem datatype. |
| ManifestItem.url | string | — | The URL link containing the manifest item (Forecast Batch) underlying data stored in the CDN. |
| ManifestItem.manifest_item_metadata | spirent.pnta.Metadata | — | |
| ManifestItem.compression | Compression | | See explanation for Compression enumeration list. |
| ManifestItem.file_size | int64 | bytes | Manifest item file size (accessed via provided ManifestItem.url link) |
| ManifestItem.file_hash | string | — | The ForecastBatch datafile hash, SHA-256 as hex. |
| Point2D.latitude | double | degrees | Latitude in decimal degrees relative to WGS84. |
| Point2D.longitude | double | degrees | Longitude in decimal degrees relative to WGS84. |
| Point3DAGL.position | Point2D | | Position in Lat/Lon in WGS84 of a user-requested path. See explanations for Point2D and GetManifestBy3DAGLPathRequest messages. |
| Point3DAGL.height_agl | double | meters | AGL height of a user-requested path. See explanation for GetManifestBy3DAGLPathRequest message. |
| AuthRequest.api_key | string | | The authorisation user request API key, provided to the user by Spirent, or generated automatically by the user for a set of devices. |
| AuthResponse.auth_token | string | | The returned authorisation token to the user by the CDN to enable (time-limited) access. |
| Compression | enum | | ontains compression formats for the underlying manifest items, so the user knows which decompression method to select. |

FIG. 3C shows an example bounding box. To facilitate the selection of Forecast Batch data that correspond to a particular user point/trajectory/area, each ForecastBatch.proto contains metadata information about the coordinates of the bounding box corner points. Each bounding box encapsulates the forecast observation points along with their respective validity volumes, and can be used to design spatial 3D queries to identify which ForecastBatch.proto data need to be returned to a user/device 348. The parameters in the ForecastBatch.proto for the definition of the eight corner points of a bounding box are the following: (a) Quad2D, (b) HeightAGLRange, for height representation in AGL, comprising a minimum and maximum AGL height in meters; and (c) HeightWGS84Range, for height representation in WGS84, comprising a minimum and maximum WGS84 height in meters. The top face 333 and the bottom face 343 of the bounding box have the same horizontal latitude and longitude coordinates, defined by Quad2D, and different AGL or WGS84 heights. The bounding box corner points' heights are provided in both AGL and WGS84, as different users may wish to request forecast data by entering heights relative to AGL or WGS84, depending on their specific application requirements. The bounding box corner points coordinates (both in AGL height or WGS84 height), using ForecastBatch.proto file parameters, are listed below.

| Point | (Latitude, Longitude) | AGL height | WGS84 height |
|---|---|---|---|
| A | Quad2D.sw_corner | HeightAGLRange.min_height_agl | HeightWGS84Range.min_height_wgs84 |
| B | Quad2D.se_corner | HeightAGLRange.min_height_agl | HeightWGS84Range.min_height_wgs84 |
| C | Quad2D.ne_corner | HeightAGLRange.min_height_agl | HeightWGS84Range.min_height_wgs84 |
| D | Quad2D.nw_corner | HeightAGLRange.min_height_agl | HeightWGS84Range.min_height_wgs84 |
| $A_1$ | Quad2D.sw_corner | HeightAGLRange.max_height_agl | HeightWGS84Range.max_height_wgs84 |
| $B_1$ | Quad2D.se_corner | HeightAGLRange.max_height_agl | HeightWGS84Range.max_height_wgs84 |
| $C_1$ | Quad2D.ne_corner | HeightAGLRange.max_height_agl | HeightWGS84Range.max_height_wgs84 |
| $D_1$ | Quad2D.nw_corner | HeightAGLRange.max_height_agl | HeightWGS84Range.max_height_wgs84 |

A customer can request a forecast with a single point or a path, in one use case. User/device 348 can request forecast data for a single point or path over a given time period in GPS time, via GetManifestBy3DAGLPathRequest and GetManifestBy3DWGS84PathRequest gRPC calls. The customer can request the forecast data by inputting the path 3D coordinates using WGS84 latitude and longitude, with the height relative to WGS84 or AGL. DeviceAPI.proto includes two path request methods to accommodate both height specification options.

A customer can request a polygon, in another use case. User/device 348 can request forecast data within the volume of a parallelepiped for a given time-period, in GPS time via GetManifestBy3DAGLPolygonRequest and GetManifestBy3DWGS84PolygonRequest gRPC calls. DeviceAPI.proto includes two path request methods to accommodate both WGS84 and AGL height specification options for requesting a polygon. The user enters the horizontal latitude and longitude coordinates in WGS84 to define a polygon, and the min/max height, either in AGL or WGS84, for the requested forecast data. The API expects a closed polygon, so the user/device repeats the first entered point in the request. A user enters the horizontal coordinates of four points along with min/max heights, then the system combines this information to define the volume of an eight-point parallelepiped and return the forecast data within this volume. The upper corner points ($A_1$, $B_1$, $C_1$, $D_1$) represent the user polygon at the user-entered maximum height, and the lower corner points (A, B, C, D) represent the user polygon at the user-entered minimum height.

Due to the large data sizes for LEO forecasts, multiple resolutions are utilized. Three dimensions of data resolution are spatial for cuboid size, temporal for forecast period, and data detail/depth for DOP, SV LOS/NLOS, SV geometry, LEO bandwidth, and number of constellations. In the disclosed GIS database, each DB entry contains metadata about the file, including coordinates, valid period and representation file IDs. Each representation file contains N number of forecasted cuboids/points with the data at high or low resolution. Representation files are stored directly from the GPU to CDN. In one example, for tile size of 50×50×1 meters, representation files include the following representations. (1). For informational representation, each file contains 50×50×1 meter. Cuboid is 50×50×1 with some info about the variability in the tile. (2) For low spatial resolution & low data resolution, each file contains 50×50×1 meter. Cuboid size 5×5×1 (aliased by GPU). DOP/SV info only. (3) For high spatial & low data resolution, each file contains 25×25×1 meter. Cuboid size 1×1×1. DOP/SV info only. (4) For high spatial & high data resolution, each file contains 25×25×1 meter. Cuboid size 1×1×1. DOP/SV/Bandwidth/Geometry info.

The CDN stores collections of cuboids within tiles. The metadata of the tile can be stored in the DB while the data can be stored in one or more representation files containing multiple versions of the data for that area and time. Upon a user/device request for an area and time the CDN can search for the appropriate tiles in the database. A manifest file can be created and sent containing metadata for the area and time and the representation file(s) location(s)s for all of the appropriate tile(s). The device/user can then read the manifest file and download some or all representation data files from the CDN cache. Files may be compressed and may be decompressed for processing by the CDN or device/user.

Visualizations of GNSS/LEO-NTN Forecasts can be represented in tiles, with different shadings representing areas with clear sailing, partially impacted areas, and areas with blockages, respectively, in one example implementation. Tiles can be stacked in multiple layers to include height and time. Users can query an area, and receive manifest files that include tile pointers with information about the variability in the tile.

FIG. 3D shows a sketch of a stack of shaded tiles, and shows an example 1 $Km^2$ output buffer of FES 358, with the Azimuth/Elevation 357, LOS 377 and PDOP & Bandwidth 379 data for each 100×100 m area. Each FES output file can contain a tiles worth of data. The size of forecast data files motivates the need for compression.

Compression of LEO Forecast data can be segmented into three types of compression: spatial, temporal and mathematic compression. Disclosed compression-related parameters are described for the DeviceAPI.proto files above.

Spatial compression analyzes each cuboid or point in the point cloud based on location. Spatial compression analyzes the similarities and differences of the data of one cuboid to the cuboids around it, in a way that is similar to the way a video pixel is compressed based on the pixels around it (left, right, above, below, etc.). If the data in the adjacent or nearby cuboids is the same or similar, compression can be applied. A lossless compression searches for identical cuboids, encodes one fully with all the data, and then cuboids with the same data point to the reference cuboid with the full information. A lossy compression method applies a threshold to look for cuboids that have small differences relative to the reference cuboid, determines that the difference is not inconsequential to the user and points those cuboids to the reference cuboid. Another compression method changes the size of the cuboid to cover a larger area instead of using pointers. As an example, if a 1 meter cubed cuboid (1 m×1 m×1 m) has the same or similar data as three adjacent cuboids, the system can change the size of the cuboid to cover the total area with one data set. That is, the size of the cuboid would be changed to 3 m×1 m×1 m).

Temporal compression analyzes each cuboid or point in the point cloud based on location and time. Temporal compression analyzes the similarities and differences of the data of one (or more) cuboid(s) over time. If the data of one or more cuboids are the same or similar over multiple time periods, compression can be applied. Either lossless or lossy compression can be used. A lossless compression, for instance based on run length encoding, looks for cuboids that do not change over multiple time periods, encodes one fully with all the data and then cuboids with the same data point to the reference cuboid with the full information. A lossy compression method, with banding or quantization, applies a threshold to look for cuboids that have small differences to the reference cuboid, determines that the difference is not inconsequential to the user and point those cuboids to the reference cuboid's time period and data. Another compression method changes the valid time period of a cuboid to cover a longer time instead of using pointers. As an example, if a 1 meter cubed cuboid (1 m×1 m×1 m) valid for one second has the same or similar data to the same cuboids over the next 29 seconds, a single cuboid and data can be stored with a 29 second valid period instead of 1 second valid period.

Spatial and temporal compressions can be combined to compress based on the similarities and differences of cuboids over the forecasted area and time. For example, a cuboid in one location and time can be the same as another cuboid in a different location and time. These cuboids can be compressed as a reference to an original cuboid and how it moves over time, in a way similar to methods used in video compression.

Mathematic compression looks at patterns in the data with or without reference to temporal or spatial information. Similar patterns are mathematically compressed. Hashes compress similar data mathematically. For instance if there is a common combination of data such as satellite positions, visibility, DOP values, etc., these get hashed and compressed.

The resulting data from the forecast LEO LOS, PDOP, and Bandwidth is highly complex and variable when compared with GNSS forecasts. Additional compression can be achieved by using supervised or unsupervised machine learning techniques to identify methods to encode the LOS, PDOP, and Bandwidth results with respect to the VOP, GPS time, and or each LEO satellite.

Optionally the elevation and azimuth data from forecast 357, shown in FIG. 3D, will not be stored in the CDN in order to reduce the amount of data for LEO forecasts. The elevation and azimuth will then be computed for each LEO satellite on demand when an API request is made for each tile and inserted into the response from the CDN as described below relative to FIG. 5 message requests and responses.

Forecast data flows from a cloud-based engine to CDN to a wireless carrier in one scenario. The data flows from CDN to USS/AV service in another scenario. In one example for data size analysis, Forecast engine service (FES) 358 generates approximately 4.1 PB raw data and transfers via Serial AT Attachment (SATA) at 400 Gbps to forecast storage approximately 1 PB primary data, transferrable to CDN 369, resulting in approximately 100 TB compressed data in a week. For a day's worth of data, at 400 Gbps that is 44.4 minutes. At 10 Gbps that is 29.6 hours. CDN 369 transfers data to wireless carrier at approximately 1 MB per KM, with bursts along the route. Similarly, CDN 369 transfers data to USS/AV service at approximately 10 MB compressed data per request. At one Gbps, transmission time per request is approximately one second.

API Use Cases

For various use cases, forecast engine service APIs cover multiple scenarios described next. In one scenario, a user does not know their route and they are not moving. In this situation, a large area gets searched. For aviation, the area may be 1 KM to 10 KM, at one or more altitudes, in one example. For vehicles, the area may be 5 KM to 30 KM, at a single altitude, and can be larger. A timeframe gets considered, such as 0 h-48 h into the future, a single start time, or a 2-hour time period. Forecast predictions can include GNSS DOP, LEO PDOP or LEO Bandwidth and #sat (LOS, NLOS, NA) for determining the "good" areas. In some designs, the ability to zoom in and out is included as a service via the user interface. The goal is to determine an improved route based on navigation performance, leading to its use in a second scenario.

In a second scenario, the user knows their route and wants to know with high-fidelity, whether the route is assured, for route planning. For aviation, the user additionally needs to learn the positioning error of a UAS flight path/volume for planning or surveillance. Once the route is identified, the customer can download the complete route or can stream the route, for the identified time period. DOP and #sat (LOS, NLOS, NA) can be utilized to determine whether the route is good, for a navigation system, planning, and for USS. If the route is deemed to be not "good enough", the forecast engine can return to the approach described earlier for scenario one.

In a third scenario, the user does not know their route and they are moving. In this scenario, Forecast Engine Service 358 searches a small area ahead, in which the customer may navigate. In one example, less than 500 m, high fidelity, with no zoom in or out. The distance ahead to be considered describes the refresh rate, as does the frequency of the API request. For vehicles, the current road ahead and any roads that could be selected are also taken into account, in one example. For aviation, the user additionally needs a bubble around the UAS, and the use of DOP and #sat (LOS, NLOS, NA) to determine where the user can go and maintain their ODD, no-go areas, and fail-safe.

Figure 3E:
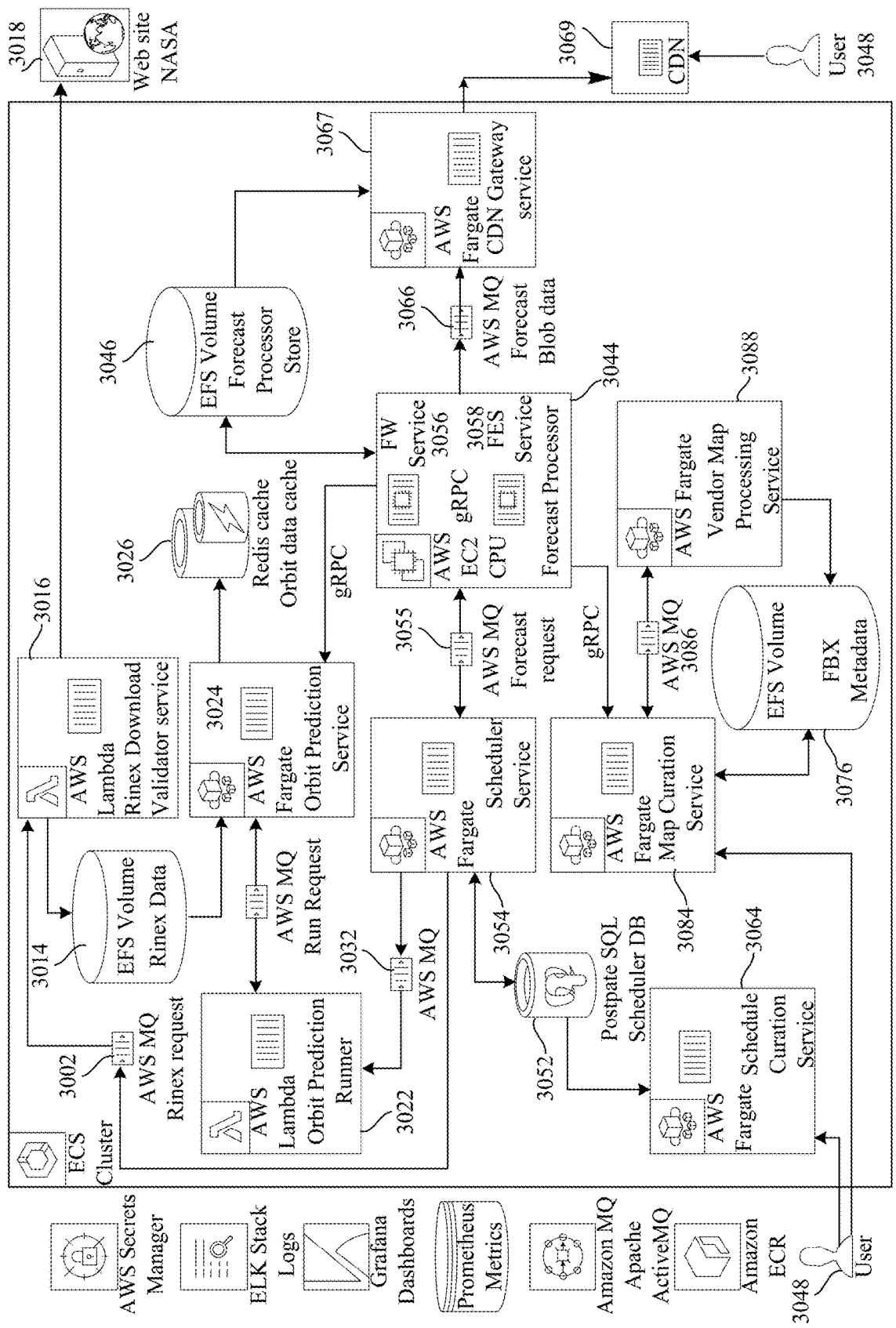
FIG. 3E illustrates an Amazon Web Services (AWS) Cloud implementation of the disclosed architecture, showing a detailed block diagram of the components and protocols of system architecture.

FIG. 3E illustrates an Amazon Web Services (AWS) Cloud implementation of the architecture, with hosted message broker service Amazon (AWS) MQ for ActiveMQ service deployed. FIG. 3E shows a detailed block diagram of the components and protocols of system architecture 300, chosen for the AWS cloud to reflect the architecture choices described relative to FIG. 3A. By default, the services are deployed in Fargate mode (AWS serverless compute engine), except for services dependent on GPU resources deployed on instance containers of type EC2/GPU.

The service APIs are described in the interface design language (IDL) Protocol Buffer Definition Language, and therefore communication is performed by the RPC gRPC protocol using the HTPP/2 transport. In addition to gRPC's request-response model, services will use a message broker for their asynchronous exchanges. The solution chosen is the hosted Amazon MQ for ActiveMQ service, which is compatible with Apache ActiveMQ, which can be deployed in on-premises infrastructure. Incoming requests in HTTP/2 are translated to HTTP/1.1 and therefore cannot reach gRPC endpoints, because support for gRPC is limited in AWS services. In one example, AWS Application Load Balancers do not fully support HTTP/2, but this limitation does not exist for inter-service calls inside the virtual private cloud (VPC). Cluster level and load balancer level gRPC health checks are supported.

Map curation service (MCS) 3084 sends requests for digital terrain model (DTM) and shape files to vendor map processing service (VMPS) 3088 via AWS MQ 3086. MCS 3084 allows upload of new vendor maps and initiates VMPS 3088 to convert them to FBX and associated metadata and store them in FBX meta store 3076 for retrieval by forecast engine services (FES) 3058. MCS 3084 can allow access to the maps that have been uploaded to it through gRPC interface, and allow for upload of vendor data pushed through VMPS 3088. VMPS 3088 accepts messages from VMPS message queue 3086, a pipeline that can process incoming vendor map data and produce FBX tiles along with the tiles' corresponding metadata, including VOP data.

Continuing the description of the block diagram, scheduler curation service 3064 can allow the user to curate which forecasts to run at which time. The curation can reside in PostgreSQL scheduler DB 3052 which can be used by scheduler service (SS) 3054 to push new forecast jobs via AWS MQ forecast request 3055.

An example ActiveMQ JSON message as published by scheduler service 3054 to FWS 3056 is listed next for LEO-PNT.

```
{
  "job_id": 1,
  "tile_id": 1,
  "start": 1272844800,
  "end": 1272844820,
  "time_resolution_s": 1,
  "level": 1,
  "elevation_cutoff_d": 0,
  "forecasts": {
    "type": "pnt",
    "los": 1,
    "azel": 1,
    "dop": [
      "all",
      "gps",
      "leo",
    ],
  }
}
```

An example ActiveMQ JSON message as published by the SS 3054 to FWS 3056 is listed next for LEO-NTN.

```
{
  "job_id": 1,
  "tile id": 1,
  "start": 1272844800,
  "end": 1272844820,
  "time_resolution_s": 1,
  "level": 1,
  "elevation cutoff_d": 0,
  "forecasts": {
    "type": "ntn",
    "azel": 1,
    "bandwith": 1
  }
}
```

Orbit downloader and validator service 316 requests RINEX from a NASA HTTPS server 3018, and TLE from the spacetrack.org HTTPS server or other TLE providers. The downloaded RINEX data is the full constellation published data for the GPS, GLONASS, Galileo and BeiDou constellations. The downloaded TLE data is the full constellation published data for LEO satellites or as provided from a LEO operator for their planned orbits. Downloaded orbit files can be stored in Orbit Store 314 so that they are accessible by orbit prediction service (OPS) 324. A verification process can be required after download. For RINEX, if the file fails to be verified, another IGS station's RINEX data could be download and verified in its place; however, if none of the IGS files validate then the previous good RINEX file can be used in its place, and this can be noted through logging and event service (LES). Note that IGS stations provide continuous tracking using high accuracy receivers and have data transmission facilities allowing for rapid data transmission to the data centers. OPS 3024 and CDNG service 3067 utilize in-memory caches. The AWS Cloud implementation can use either Memcached or Redis, which are both available as managed services in AWS.

Orbit prediction service (OPS) 3024 predicts forward locations of satellites and caches data in Redis orbit data cache 3026 and orbit prediction runner (OPR) 3022 caches a new orbit in advance. SS 3054 can request orbit predictions via AWS MQ 3032. An example OPR message 3032 is listed next, as an ActiveMQ JSON message as published by SS 3054 to OPR 3022.

```
{
  "job_id": 1,
  "start": 1272844800,
  "end": 1272844820,
  "time_resolution_s": 1
}
```

OPR 3022 is a small ActiveMQ subscriber that listens for new jobs and then calls the gRPC interface to initiate an orbit prediction, in one implementation of the disclosed technology. OPS 3024 gRPC/protobufs format is listed below.

Further continuing the description of the AWS cloud implementation shown in FIG. 3E, forecast worker service (FWS) 3056 accepts a message from AWS MQ forecast request message queue 3055, initiates a forecast and then waits for the success or error response from forecast engine service (FES) 3058. Once the FES forecast is complete, FWS 3056 can check FWS message queue 3055 and if messages are queued, FWS 3056 can initiate another forecast with the new message data. FWS 3056 has a one-to-one mapping to FES 3058, gathering the data required by FES 3058 and interacting with the system.

Apache ActiveMQ supports large messages with type Blob, which contains metadata, including the message's location; large messages will be accessible via the EFS file system. CDN gateway (CDNG) 3067 receives messages via AWS MQ forecast blob data from forecast processor 3044. Each message represents a file to upload to CDN 369. CDNG 3067 can read the protocol buffer file from forecast processor service (FPS) 3044 and then call the CDN gRPC function to accept the file stream. AWS CloudWatch provides numerous metrics via Amazon MQ which is well integrated. The implementation of FES 3058 and FWS 3056 autoscaling groups is based on those metrics, such as a queue or topic size.

Forecast engine service (FES) 3058 can compute line of sight (LOS), azimuth and elevation and position dilution of precision (PDOP). LOS will be recorded for every satellite at every VOP. PDOP can be recorded for every VOP when the there is a change in LOS or every two minutes. Azimuth and elevation can be recorded on a forecast basis for every satellite when their values change. The term "temporal compression" describes this approach. To make it easier for a client to request data, the height element in their request is assumed to be zero for local ground level and then meters above that. The height used by FES 3058 is with reference to the WGS84 ellipsoid. Since local ground can vary from meter to meter a concept of "level" is required for grouping. The zero level is considered as ground and hence FES 3058 is required to indicate the level for which the current dataset is being generated.

AWS EFS storage service provides the storage volumes used by FES 3058, MCS 3084, Forecast Processor 3044, CDN Gateway service 3067 and the RINEX Download service 3016. AW EFS storage service allows file systems to be mounted in multiple regions, accessible to multiple instances at a time, with high IOPS and low latency. This approach to storage provides a common mechanism for the AWS cloud and on-premises infrastructures.

To monitor PNT-A services, the infrastructure will use the ELK stack, which refers to three open-source projects: Elasticsearch, Logstash, and Kibana. Often referred to as Elasticsearch, the ELK stack aggregates service logs, investigates logs, and creates dashboards and alerts for service and infrastructure monitoring. The AWS platform provides ELK stack through the AWS Elasticsearch Managed Service.

For metrics and custom service metrics aggregation and monitoring, the infrastructure uses the open-source Prometheus project. AWS provides Prometheus Metrics as a managed service. Prometheus collects the service containers' metrics in its time-series database and makes them available to the Grafana visualization application, with Prometheus and Grafana currently in use for Jenkins CI reporting.

FIG. 3F, along with the listing below, describe an example forecast file for a given area (tile) over a time expressed in GPS time i.e. seconds since 1980-01-06T00:00:00+00:00 for a particular type, with ForecastBatch 305 describing metadata, ForecastMetadata 321 specifying the forecast parameters, message ForecastAzEl 351 describing azimuth and elevation, ForecastLOS setting line of site details, ForecastDOP 371 for dilution of precision, PointForecastLOS 375 for the point forecast line of sight, PointForecastDOP 385 for the point forecast line of sight, and ForecastBandwidth 308 for the LEO-NTN bandwidth. The forecast file further describes SatelliteAzElForecast 365 and SatelliteLOSForecast 386. DOPResult and BandwidthResult details are listed below.

```
enum DOPResult
  IDEAL = 0;       // DOP value in range 0-1
  EXCELLENT = 1    // DOP value in range 1-2
  GOOD = 2;        // DOP value in range 2-5
  MODERATE =3;    // DOP value in range 5-10
  FAIR = 4;        // DOP value in range 10-20
  POOR = 5;        // DOP value in range 20+
  NO_DOP 6;        // No DOP value fewer than four satellites visible
}
enum BandwidthResult {
  IDEAL = 0;       // up to 1Gbps
  EXCELLENT = 1    // up to 500Mbps
  GOOD = 2;        // up to 200Mbps
  MODERATE =3;    // up to 50Mbps
  FAIR = 4;        // up to 10Mbps
  POOR = 5;        // only low bandwidth communications
  NO_BW 6;         // Potentially unusable communications
}
```

The listing below further describes the example forecast file for a given area (tile) over a time expressed in GPS time i.e. seconds since 1980-01-06T00:00:00+00:00 for a particular type.

```
message DOPForecast {
  GPSTime valid_from = 1;
  DOPResult dop = 2;
}
enum ForecastType {
  LOS = 0;
  AZ_EL = 1;
  PDOP_ALL = 2;
  BANDWIDTH = 3;
}
enum Constellation {
  GPS = 0;
  GALILEO = 1;
  GLONASS = 2;
  BEIDOU = 3;
  WAAS = 4;
  EGNOS = 5;
  MSAS = 6;
  QZSS = 7;
  GAGAN = 8;
  SDCM = 9;
  <LEO_PNT_1>= 10;
  <LEO_PNT_2>= 11;
  <LEO_NTN_1>= 12;
  <LEO_NTN_2>= 13;
}
message Satellite {
  Constellation = 1;
  uint32 svid = 2; // Mostly PRN but slot ID for GLONASS
}
message AzimuthElevation {
  float azimuth_deg = 1;
  float elevation_deg = 2;
}
message Point3DWGS84 {
  Point2D position = 1;
  double height_m = 2;
}
message Point2D {
  double latitude_deg = 1;
  double longitude_deg = 2;
}
message Quad2D {
  Point2D nw_corner = 1;
  Point2D ne_corner = 2;
  Point2D se_corner = 3;
  Point2D sw_corner = 4;
}
message HeightRange {
  double min_m = 1;
  double max_m = 2;
}
message SatelliteAzEl {
  GPSTime valid_from = 1;
  AzimuthElevation coordinate = 2;
}
message LOSForecast {
  GPSTimeRange los_period = 1; // From/To time when signal is LOS
}
message GPSTimeRange {
  GPSTime from = 1;
  GPSTime to = 2;
}
message GPSTime {
  uint64 seconds = 1;
}
```

FIG. 4A illustrates a 2D map orbit with LEO satellites, and an example error calculation for a 2D point. In a typical situation in an urban area, the reception of each satellite signal depends on the position of the receiver and the satellite with respect to each other. Satellites S2 444 and S3 446 are in line of sight (LOS) with 2D point 465. Satellite S4 458 is blocked and satellite S1 452 has non-line-of-sight (NLOS); that is, S1 452 utilizes multipath signals that reach the receiving antenna by two or more paths. Causes of multipath include atmospheric ducting, ionospheric reflection and refraction, and reflection from water bodies and terrestrial objects such as mountains and buildings. Positioning and navigation can be degraded in urban environments by multipath, and the error can increase considerably if not properly compensated. In situations where the line-of-sight (LOS) is obscured by surrounding buildings, the receiver may still be able to navigate by using the non-line-of-sight (NLOS) signal, which originates from single or multiple reflections/diffractions of the LEO signal. The use of 3D models has been one of the preferred solutions to recreate the multipath environment as seen by a LEO device. This solution brings the capability to generate a multipath signature that is representative of the position of the antenna in a specific time and space. For the given 2D point 365, a +/−3-meter error in the map data yields an error of 0.086 seconds in the determination of a LEO satellite being line-of-sight or not line of sight. Over a forecast period of 50 minutes this would provide a confidence interval of 99.997%.

Figure 4B:
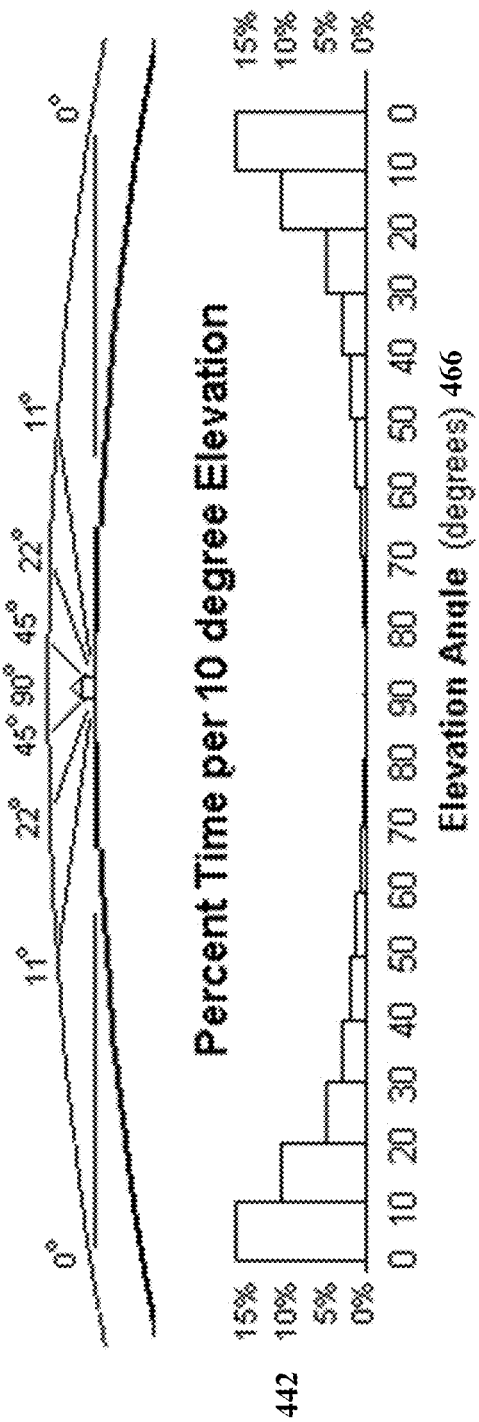
FIG. 4B shows a graph of the percent of time per ten degree elevation that a LEO satellite is visible as a function of elevation angle.

FIG. 4B shows a graph of the percent of time per ten degree elevation that a LEO satellite is visible as a function of elevation angle ("LEO Azimuth Tracking!", APRS.org, 14 May 2019, [downloaded 14 Sep. 2023 from http://aprs.org/LEO-tracking.html]) and (D. Giggenbach et al, "System Aspects of Optical Leo-To-Ground Links", International Conference on Space Optics (ICSO), 19-16 Oct. 2016). The graph of percentage of time that a LEO satellite is visible 442 as a function of elevation angle 466 demonstrates that for a majority of the time a LEO satellite is at an angle below twenty-two degrees. In suburban and urban environments this is a problem since buildings and terrain are likely to obscure the signals at low elevation angles. The obscuration of the signals can block the signal entirely, create multipath, and degrade the signal. In addition to degrading the LEO-PNT or LEO-NTN service, this obscuration also makes tracking of satellites by the receiver more difficult. It may also mean that a LEO provider launches more satellites in order to have at least one or more at high elevation angles visible for any point on the ground.

Figure 5:
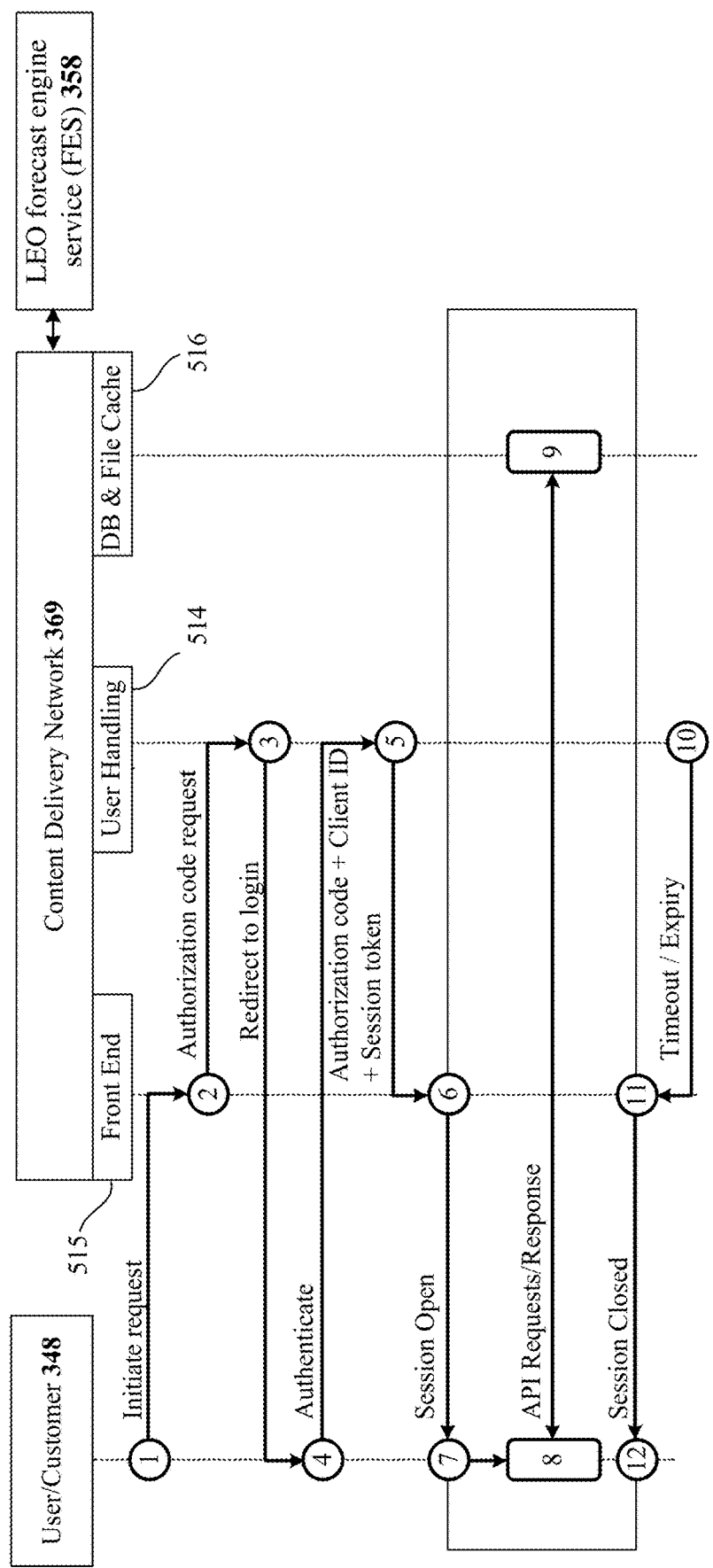
FIG. 5 shows message flow for session authentication between the user/customer, content delivery network (CDN) and LEO Forecast engine service (FES) that provides forecasts to the CDN.

FIG. 5 shows message flow for session authentication between the user/customer 348, content delivery network (CDN) 369 and LEO Forecast engine service (FES) 358 that provides forecasts to CDN 369. Devices use an auth API key for authentication and a set of API methods (device API) to download GNSS Forecast data for a particular space and time. Device API is utilized to process the request, selecting a set of cuboids from Spatial DB and providing links where these cuboids could be downloaded from CDN 369. Front end 512 delivers the user experience UX. User handling 514 handles requests for authorization for users. Once a session is open between customer 348 and CDN 369, DB and file cache 516 responds to API requests.

Forecast CDN 369 processes uploaded data in a queue in Forecast data processor 3044, updates the metadata spatial database and replicates Forecast data based on cuboid position to appropriate CDN origin. After this occurs, the forecast data is available to devices for download. If a certain cuboid will be required, this will be delivered through the CDN Edge and cached there for later re-use.

Autonomous Ground-Based Vehicles

The disclosed technology for Forecast Assured Navigation (FAN) generate LEO Forecasts for navigation. LEO Forecasts provide a predicted GNSS availability and performance for an area and time, which is usable in advance or in real-time for any vehicle or system using LEO. As set up, the positioning requirement for the drive can be selected. Before a planned journey and/or in real time, a vehicle sends its location and intended routing request to the cloud service. The service provides a LEO heat map of PDOP and number of LEO LOS signals from the LEO PNT or NTN constellations being used by the vehicle, also referred to as a Point Cloud, which is then used to determine the quality of LEO coverage along the route and nearby areas. For example, a vehicle may need a specific level of LEO navigation performance to have safe automated lane control. The vehicle may use a LEO Forecast to determine if the vehicle will have adequate LEO signals on the road ahead. If so, the vehicle will be able to continue operation and lane level control. Alternatively, if LEO is forecasted to not be adequate, the vehicle may change its automation mode, rely on other sensors, use GNSS and LEO together to overcome gaps in each service coverage, return control to the driver or trigger return of control to the human.

Level 2 to Level 5 Autonomous Vehicle Operation and V2X requires knowledge of the vehicle's Precise Position. In Lane Level Accurate Positioning, the accuracy requirement is commonly defined as 0.3 Meters Horizontal Position and having 99.99% certainty in that Position. It is Mission Critical that the vehicle's Positioning Engine retains that level of accuracy throughout its journey. In one example, if a DOP is 2.0 is required for lane level accuracy of 0.5 m, FAN can predict where and when the required DOP will be available to safely utilize the desired autonomous driving (AD) features.

In one example use case, an autonomous ground-based vehicle is traveling and wants to know the expected LEO signals on its route of travel to be used for navigation or communications. The vehicle connects to a cloud service to request the LEO signal predictions along its route. The cloud service processes the request from its distributed architecture to get the appropriate forecast information for the vehicle and transmits it to the vehicle. The cloud architecture interfaces with a LEO Forecast engine service that gathers satellite data, environmental data, and maps to process with various algorithms to provide a prediction and then publishes the prediction on a cloud architecture.

The disclosed LEO Forecast can also be used to improve fleet management. Fleet management commonly uses GNSS as the primary sensor for location tracking today and are integrating LEO services to compliment GNSS for navigation and communication. In an urban environment, real-time metrics, and guidance such as estimated arrival time and taking the most fuel-efficient route are adversely affected if the vehicle is placed in the incorrect lane or side of the intersection. LEO Forecasts can allow the tracking algorithm to prioritize high confidence LEO locations and reject low confidence results to improve overall vehicle tracking accuracy, and can also use this information to alert the driver to double check their guidance and follow local road signs if a low confidence area is ahead. Similarly, asset tracking for shipping containers, construction equipment, rail cars, and other expensive assets that are large enough to justify LEO tracking rather than just RFID or GNSS. Reliability of the signals through use of the disclosed LEO Forecasts can enable the identification of areas of concern, due to poor LEO performance, such as knowing where cargo containers need to be placed in a cargo port.

Path Planning

The disclosed technology for LEO Forecasts can be applied to path planning for ground-based vehicles, in another use case. Autonomous and automated vehicles use a variety of sensors to determine the relative position of the vehicle to its surroundings, sometimes called localization. GNSS is typically the primary method of determining absolute position and time with respect to the surface of the earth, or geodesic reference, and time (Universal Coordinated Time (UTC)). The reliance of the vehicle on GNSS makes it very important or critical to the operation of the vehicle. GNSS Receiver performance can be enhanced using RTK (RTK, PPP, & RTK+PPP), WAAS, SBAS, GBAS, RAIM, and geospatial awareness technologies and services. While these techniques improve the performance of GNSS, they do not address the susceptibility of GNSS to jamming and spoofing. LEO satellites are more resilient to jamming and spoofing and can potentially provide greater accuracy than GNSS. However, LEO services still suffer from obscuration and lack of predicted performance. Geospatial awareness information about the localized environmental impacts on the LEO signals from buildings, vegetation, terrain, and other sources of obstructions and multipath can ensure that using LEO as an alternative or additive solution for navigation can be done accurately and with integrity.

Using a LEO Forecast, a vehicle can plan its path/route to ensure that it has the best LEO signals available and know where and when its performance will be impacted. The system can make trade-offs between LEO performance, GNSS performance, and other sensors and system that can augment or navigation and positioning. The system can make trade-offs between driving modes; for example, the system can use a LEO Forecast to determine a path that has the highest utilization of autonomous or automated vehicle operation versus fastest route, shortest route, or economic route. This is not limited to on-road vehicles like cars and trucks. This can be used in mining to determine where best to operate machinery based on LEO Forecast and the time of day. In one example, mining on one part of the mine where signals are good at 9 am versus another part of the mine at 10 µm. The LEO Forecast can also be used to determine the impact of the change in the environment due to blasting/mining.

LEO environments for any vehicle at ground level or low altitudes are highly dynamic. Traversing complex LEO environments only minutes or even seconds ahead or behind the planned time of travel can have a major impact on the LEO performance. A vehicle traversing through an intersection in a dense urban environment ten minutes earlier can result in 'okay' or safe LEO signals rather than poor signals.

Aviation Use Cases

In one aviation use case, a drone flying needs to know the expected LEO signals on its route of travel, or area of operation, for safe navigation. This is especially important for Beyond Line of Sight of the pilot (BLOS), including package delivery or inspection. In order to determine if safe navigation using LEO is possible, a prediction of the signal strength can be used to determine the best flight path (including altitudes), take-off and landing areas, areas to hover or loiter, risk-ratio of the flight, if areas of poor LEO navigation can be traversed using mitigation techniques and for how long. In some cases a drone may use certified avionics, like those certified using Federal Aviation Administration (FAA) Technical Standard Order (TSO)-C199 for Traffic Awareness Beacon System (TABS). The certification requires the system to achieve specific levels of positioning performance, like section A1.2.6.3 requires 30 meters horizontal position error with a HDOP of 2.5 or less. The disclosed LEO Forecast solution can be used to determine if the flight path or area in which a drone is going to be flown in the future will have the required DOP using LEO as an alternative to GNSS, but meeting the same regulatory requirement, resulting position accuracy, and compliance in operation. Similar positioning requirements exist within FAA remote identification rules.

In order to access a LEO prediction or forecast, the drone, flight planning software, ground control software, Unmanned Service Supplier (USS), or Unmanned Traffic Management (UTM) system connects to a cloud service to request the LEO signal predictions along the intended route, area or operation, or an area where a route needs to be determined. The cloud service processes the request from its distributed architecture to get the appropriate forecast information for the drone and supporting systems, and transmits it to the drone and supporting systems. The cloud architecture interfaces with a LEO Forecast Engine that gathers satellite data, environmental data, and maps to process with various algorithms to provide a prediction and then publishes the prediction on a cloud architecture. The drone is then able to determine the LEO signal quality along its route and determine if the route can be flown safely.

In another aviation use case, LEO Forecasts can be applied to flight planning and operation. GNSS is typically the primary way for aircraft to determine their global position, however, LEO may provide an alternate source of navigation. In order for the aircraft to navigate it is possible that in the future, regulations may use LEO to comply to performance-based navigation requirements, report its position using Remote ID or ADS-B, communicate position as a part of air traffic control or unmanned traffic management, detect and avoid other aircraft, avoid obstacles, take-off, land, and even have stable flight. Therefore, it is critical for aircraft to predict the performance of LEO when planning for a flight and use the same information in flight when making real-time decisions.

Unmanned Traffic Management (UTM), including the Unmanned Service Supplier, can use the disclosed LEO Forecast as a part of determining a route, the drone's total system error, performance monitoring of flights, how it allocates airspace, route authentication and route surveillance. UTM can also use the forecast in real-time to monitor the performance of its navigation system and use the forecast for any real-time changes in flight paths. For example, if a change of flight path is made, the UTM could ensure it does not fly into an area that would degrade its ability to fly.

The disclosed LEO Forecast can also be provided as a Supplemental Data Service Provider (SDSP) as a part of an UTM.

The disclosed LEO Forecast can also be used to determine the navigation capabilities and requirements of the airspace. For example, a LEO Forecast can be used to dynamically create geofenced areas and ensure their enforceability. A LEO Forecast can be determined to determine what type of RNAV/RNP requirements are applicable for a flight. A LEO Forecast can be used to create static or dynamic flight corridors.

The disclosed LEO Forecast can be used to select locations for, flight paths to/from, and certify vertiports for electric vertical takeoff and landing (eVTOL) and Advanced Air Mobility aircraft/services.

The disclosed LEO Forecast can be used to determine areas of consistently high or low risk over long time periods. For example, a LEO Forecast could be done over a month-long period to determine areas where LEO signals are available 99.9999% of the time. These areas could be classified as low risk for flights. Whereas areas that do not meet those criteria could be classified as dynamic, high risk, and therefore either flights are not allowed in those areas, or a discreet forecast is needed for the exact time and location of the flight to determine LEO performance.

Broadband Service Coverage Over Time

For visualizing broadband service coverage over time, one implementation of a disclosed method includes providing for display an interface that accepts input, and receiving the input specifying a point location for a broadband service antenna and visualization parameters, including a time range to depict. The method also includes accessing a 3D map of an area in an urban environment surrounding the location, including structure solids that obscure lines of sight from the location, and computing requested visualization over time, including ray casting or tracing between point location and satellites over the time range. Also included is initializing a 3D map visualization, overlaying the point location on the 3D map for a selected time and overlaying first and second rays from the point location towards at least some satellites overhead at the selected time, visually encoding the first rays with a first code to indicate a clear line of sight and overlay the encoded first rays on the 3D map, and visually encoding the second rays with a second code to indicate a blocked line of sight, showing at least a segment from the point location to a face of a blocking solid that blocks a line of sight. The disclosed method further includes combining the 3D map visualization with a playback animation control for the time range, including a current time represented by the overlaid first and second rays and third segments, overlaying the playback animation control with an indication of line of sight visibility at the point location over the time range, and providing for display the 3D map visualization combined with the playback animation control, including the overlaid first and second rays and third segments and the overlaid indication of line of sight visibility. The received input specifies satellite constellation(s) to depict. The method includes ray casting or tracing between additional locations, along a surface of a structure on which the broadband service antenna is mounted, and overlaying third segments along the surface of the structure and visually encoding the third segments with a third code to indicate lines of sight availability along the additional locations on the third segments. The method can include showing the segment extending a second ray skyward from a far side of the blocking solid. In some cases, the method also includes ray casting or tracing between additional locations, on at least part of a face of a structure on which the broadband service antenna is mounted, and overlaying visual encoding of the face of the structure with a third code to indicate lines of sight availability along the additional locations on the face.

Visualizations that illustrate route planning and evaluation examples that utilize DOP forecasts for GNSS navigation are described next.

Visualizations

As an alternative to distributing forecast data to and via the content delivery network (CDN) service 158, the data can be used to render disclosed visualizations of the forecast. LEO signals change in urban environments, as is viewable via a map, by altitude and over time. Users can search for a route with "good" LEO coverage, using the disclosed GNSS Forecasts described herein. Users can visualize LEO performance around a known route and adjust if needed.

LEO Forecasts can be utilized to predict where and when satellite navigation or communication meets the technical requirements for a specific use case. In one example, real-time integrity improvement of a navigation sub-system is achieved via real-time use of the LEO Forecast to look approximately 1 KM ahead of the vehicle to determine what LEO is available, what precision is possible, if mitigation is sufficient, and what level of autonomy can be maintained. Then, if needed, the system can change autonomous mode or provide additional time for disengagement to the driver.

The disclosed Forecast Assured Navigation (FAN) Forecasts can also be applied to improve vehicle-to-vehicle communication (V2X). Critical roadway infrastructure such as smart intersections are often tasked with advanced traffic flow management to optimize timing of traffic lights and decrease congestion. Lane level accurate vehicle position is therefore provided by the vehicle to the traffic management system infrastructure (V2X). The FAN Forecast can improve the integrity of the vehicle's position, such as in a turn lane, and therefore improve the system's performance.

LEO forecasts can also be applied for city infrastructure planning. The ability of LEO Forecast to predict LEO signals' integrity could be used to plan city infrastructure. For the city in situ with all infrastructure in place, LEO Forecast can be used to work out areas where LEO signals suffer from impairments. This information can then be used to identify the locations for installing relevant sensors in order to mitigate these adverse effects. If the user has the ability to update the 3D map used in a LEO Forecast, it can be used for city infrastructure planning during re-development. LEO Forecast can be used to predict the effects of the new infrastructure on LEO signals integrity and design the infrastructure for optimum LEO signals integrity in the scenarios listed next: (a) Design potential LEO interference sources to be interoperable with LEO capabilities; (b) Design infrastructure to have a lower number of disturbances to areas which are relying on LEO signals to function; (c) Design the infrastructure for vehicles to travel and communicate in optimum LEO integrity; (d) Find locations at which to install relevant sensors, for situations in which LEO signal degradations due to infrastructure are unavoidable.

In one implementation, with floating planes of signal strength, a disclosed method of visualizing LEO coverage over time for route planning, includes providing for display an interface that accepts input, receiving the input specifying at least one corridor through an urban area being traversed and visualization parameters, including elevation slices and a time range, and in some cases a flight plan through the corridor and satellite constellation(s), to depict. The method also includes accessing a 3D map of the urban area, including structure solids that block lines of sight between cuboids on the elevation slices along the corridor and satellites overhead, wherein the elevation slices are bounded planes in space between the structure solids and are parallel to a surface of the 3D map, and computing a requested visualization over time, including ray casting or tracing between the cuboids and satellites over time to calculate line of sight visibility or dilution of precision at the point location over the time range. The method further includes initializing a 3D map visualization, overlaying the elevation slices on an orthogonal projection from a viewpoint above a lowest elevation slice and below a highest elevation slice, wherein each elevation slice translucently encodes the line-of-sight visibility or dilution of precision for the cuboids on the elevation slice. In some implementations, the method includes overlaying flight plan segments through the corridor on the orthogonal projection and visually encoding the segments to indicate the line-of-sight visibility or dilution of precision along the route segments. The method also includes combining the 3D map visualization with a scrubbing slider to control a departure or arrival time depicted, and in some cases overlaying the scrubbing slider control with an indication of line-of-sight visibility or dilution of precision over the flight plan through the corridor at times in a range spanned by the scrubbing slider. The method further includes providing for display the 3D map visualization combined with the scrubbing slider control, including the overlaid elevation slices.

For visualizing signal strength via translucent clouds, in one implementation a disclosed method of visualizing LEO coverage over time for flight planning includes providing for display an interface that accepts input, and receiving the input specifying at least one corridor through an urban area being traversed and visualization parameters, including an elevation range and a time range and in some cases a flight plan through the corridor and satellite constellation(s) to depict. The disclosed method also includes accessing a 3D map of the urban area, including structure solids that block lines of sight between cuboids in the elevation range along the corridor and satellites overhead, wherein the corridor and elevation range occupy space between the structure solids of the 3D map, and computing a requested visualization over time, including ray casting or tracing between the cuboids and satellites over time to calculate line of sight visibility or dilution of precision at the point location over the time range. The method further includes initializing a 3D map visualization overlaying a translucent cloud of values of points, of equal value surfaces on an orthogonal projection, wherein the values encode the line of sight visibility or dilution of precision for the cuboids in the translucent cloud. In some implementations, the method also includes overlaying flight plan segments on the orthogonal projection and visually encoding the segments to indicate the line of sight visibility or dilution of precision along the flight plan segments. The disclosed method also includes combining the 3D map visualization with a scrubbing slider to control a departure or arrival time depicted, and can include overlaying the scrubbing slider control with an indication of line of sight visibility or dilution of precision over a route through the translucent cloud at times in a range spanned by the scrubbing slider. The method further includes providing for display the 3D map visualization combined with the scrubbing slider control, including the overlaid elevation slices.

In an additional use case, an API view enables users to visualize LEO Forecast data requested and received using the APIs. The developer can move the reticule around and view a dynamically updated display of the results of example API calls. Developers can also adjust API time window values via controls on the timeline, and can view a live response from the APIs to help debug calls to the APIs.

Bandwidth

Unlike LEO-PNT signals where reflection and multipath impact the calculation of position, communications signals from LEO-NTN satellites can be used with some amount of reflection and multipath as long as the signal strength is sufficient. Satellites with line-of-sight will generally have the best signal strength and will provide the highest possible bandwidth based on the design of the LEO-NTN satellite used by the LEO-NTN service operator. Some LEO NTN satellites have the ability to beam form their signals to focus on one or more areas on the Earth as the pass over. Beam forming cannot overcome signal obscuration from buildings and terrain, however, it does impact the amount of bandwidth available to the receivers on the ground. In one possible beam forming scenario the satellite will use the location of a receiver to focus the beam on that area as the satellite moves across the sky. Knowing the obscurations from buildings and terrain between the satellite can aid the beam forming technique and the amount of power needed to maintain an acceptable signal strength. Moreover, the total amount of bandwidth available from one or more satellites in an area at a given time can be calculated by multiplying the number of line-of-sight satellites by the highest possible bandwidth for each satellite, or satellite beam. The resulting bandwidth and satellites can be distributed in the same way as other forecast data. Similarly, statistical performance and trends over time can be calculated for LEO-NTN bandwidth, applying one or more bandwidth thresholds instead of count of line-of-sight satellites. Some LEO-NTN satellite bandwidth can be calculated as a function of the elevation above the horizon of the Earth. If this is provided the above method can include the amount of bandwidth, not just the maximum bandwidth. Similarly, signal propagation models can be applied for non-line-of-sight signals to determine more specific bandwidth for each area and time epoch.

Method for Using Risk Analysis to Determine Areas that Need Real-Time GNSS or LEO Predictions The technology disclosed extends prior Risk Analysis, as described in priority U.S. patent application Ser. No. 17/948,213 and other priority applications submitted the same day and a few days later, to reducing computation and distribution of real time DOP and satellite availability data via a CDN. Applying this new approach, Risk Analysis is performed to identify areas that have statistically high availability of line-of-sight GNSS and/or LEO satellites, consistent with receiver design. Identified considered good areas need not be included in real time forecasting and can be summarily distributed in a highly compressed format.

Risk Analysis of LEO coverage looks forward for a week, a month or some other period in a range of five days to three months. LEO coverage analysis is shorter than GNSS coverage analysis because orbits change more frequently, and more satellites are continuously being launched. Over a selected time horizon, statistical thresholds are applied to identify areas that are considered good, that nearly always have a sufficient number of line-of-sight GNSS or LEO satellites to satisfy the threshold(s). These always considered good areas can be removed from the real-time calculation and distribution of forecasts. Instead of providing minute-by-minute availability forecasts in cuboids, large contiguous areas can be encoded as always considered good, both to reduce computation and in distribution of forecasts. This reduces the amount of computation, storage needed, and bandwidth consumed to provide real-time forecast services.

Risk analysis reveals paths that can always (worst-case) or just sometimes (best-case) be followed by an autonomous vehicle and be assured of adequate coverage, which can be GNSS coverage, LEO coverage, or a combination of coverages, depending on receiver capabilities. A risk analysis, unlike a forecast, is based on historical data. For instance, three days at 0, minus 10 and minus 20 can be chosen for risk analysis. For each day of historical data, ray casting can be applied second-by-second to cuboids in a region of interest. The number of satellite vehicles with a clear line of sight from each cuboid can be tallied and DOP calculated. Adequacy of navigation coverage can be judged by the number of satellites clearly visible and/or their relative geometry. Counts or more sophisticated DOP calculation can be produced. For each day processed, there will be a best-case and worst-case analysis of coverage for each cuboid. Analysis from the three days can be combined into overall best- and worst-case analyses.

A buffer zone can be drawn around impaired areas in a worst-case plot of inadequate signal. The buffer zone will increase confidence that a chosen path avoids areas of inadequate navigation coverage.

These inventors empirically determined that paths that have adequate coverage throughout three non-consecutive historical days of worst-case analysis with buffers, will be available for GNSS signals for an extended period of three to four months and sometimes longer. Using sampling from historical data, it has been estimated that a risk analysis can be generated from just three days of historical data that is 95 to 99 percent accurate and remains so for one week to six months, typically three to four months. That is, only one to five in 100 cuboids in the region of calculation that the risk analysis indicates will have an adequate signal will actually have an inadequate signal at some time during a day. For LEO coverage, a shorter prediction of one week to one month to two months is better, due to changes in orbits and rapid expansion of LEO constellations. We believe the degree of reliability will satisfy safety guidelines applicable to autonomous drones.

When the worst-case risk analysis does not reveal any path that always is available, the best-case risk analysis may show the likelihood that such a path will available, at some time. Then, the forecast data described in prior applications can be acquired and used to select a time to travel and a path along which adequate coverage is available.

The combination of worst-case and best-case risk analysis provides a tiered approach to routing autonomous vehicles, particularly drones. With the worst-case analysis in hand, aerial thoroughfares can be plotted, and much routing can be simplified. Fleets of drones can be deployed for autonomous delivery without requiring precise forecast data for each drone. With the best-case analysis in hand, routes can be selected for further analysis. This limits the amount of detailed data that needs to be obtained and processed for routing. Detailed forecast data can be obtained, and delivery times can be set for difficult to reach destinations.

Not surprisingly, worst-case risk analyses produce different results for urban canyons lined by tall buildings than for rural or suburban areas with modest residences Urban areas may always require detailed time-specific forecasts, due to tall buildings and changing patterns of satellite coverage. In suburbs, in contrast, the main challenge is likely to be safe landing sites for drop off. Many suburban residences can be reached following aerial thoroughfares, but some residences may nonetheless have limited times for well-positioned drop offs. A residence may have a 10-meter perimeter of impaired GNSS visibility in the worst-case risk analysis, but a two-meter perimeter in the best-case risk analysis, which makes some times better than others for drop offs. The disclosed risk analysis simplifies routing.

The cloud architecture disclosed in the priority application provides a globally distributed, low latency, high-availability system for clients to request GNSS risk analysis and forecasts. This application extends the risk analysis to LEO and combined GNSS/LEO risk analysis. Clients can request the risk analysis and predictions for several applications including, but not limited to planning engines, routing engines, positioning receivers, measurement engines, positioning engines, consumer devices, telecommunication equipment, navigation systems, avionics, and vehicles for planning, operation, or validation. The disclosed Risk Analysis Service (RAS) inputs a map and satellite orbits, and outputs a risk analysis based on LOS/NLOS and/or PDOP for each 1 $m^2$ point within the map, in one implementation.

In an example system implementation, positioning risk analyses are stored directly from the risk analysis engine to the CDN, as an alternative to a redundant database for the risk analysis engine. A navigation risk analysis architecture can utilize multiple modules. A user upload can provide inputs to map processing pipeline as digital surface model (DSM) of the earth's surface and objects on it, and shapefile (SHP) that represents shapes as geospatial vector data. A map processing pipeline can complete the initial map processing and outputs 3D map data, for instance in FBX 3D data interchange format (FilmBox), along with at least one metadata file that describes the map data. The FBX is a 3D model mesh suitable for loading into a GPU and the metadata file contains geographic information about the FBX such as where the FBX "tile" is located on the earth's surface and a list of valid observable points (VOPs). FBX tiles can be different sizes. Processing to 1 $Km^2$ utilizes VOPs in a grid of cuboids at 1 m intervals, in one implementation. When creating VOPs, the building footprints are typically masked to not include VOPs inside of buildings. Automated daily upload can provides to orbit plotting service with historical data for recent satellite paths. It also can provide the GPS almanac data set that every GPS satellite transmits, which includes information about the state of the GPS satellite constellation, as well as course data on every satellite in orbit. The orbital position of each satellite is known as the ephemeris data. This ephemeris data is, effectively, a history of updated orbit reports from the satellites themselves. Automated daily uploads can provide the raw satellite navigation system data in Receiver Independent Exchange Format (RINEX) or another format, such as TLE, can be adapted to LEO constellations. Orbit plotting service can handles the initial orbit calculations and sends the orbit calculation data needed for risk analysis orchestration, in the format specified via an API.

Continuing the description of a risk analysis architecture, navigation risk analysis engine service (RAS) can generate navigation risk analysis data, via GPU ray casting on FBX data with metadata, and provides the forecast data to navigation risk analysis orchestration as specified via forecast API via forecast service call back (FSCB). Again, ray tracing is an alternative to ray casting. Management of navigation forecasts from administrator and customer side can be done over Internet browser services. A mobile interface could be utilized in another implementation. navigation risk analysis engine service (RAS) can generate navigation risk analysis data for defined cuboids. Each cuboid has unique ID (GUID). Cuboids get uploaded to navigation risk analysis CDN using forecast input API via PostGIS software program that adds support for geographic objects to the PostgreSQL object-relational database, in one implementation. A CDN provides the 3D risk analysis visualization from navigation risk analysis orchestration for display with a browser visualization, via a customer API. The risk analysis API enables the navigation risk analysis CDN to communicate to the navigation risk analysis engine service (RAS), on-demand requests or other requests for data that CDN was not able to provide to the device, in some embodiments. In summary, navigation risk analysis architecture delivers navigation risk analysis, in this example, via a content delivery network to a user/customer of the forecasts. The same CDN can be used to convey additional navigation Forecast data, on request. When a user makes a request for data, if the CDN does not have a specific cuboid in the CDN database, it creates a new entity. If a cuboid with the defined ID is available, the system can add a new time forecast or update an existing one. Cuboids are provided from navigation risk analysis engine service (RAS). In case of collision, the previous cuboid, in time, will be replaced.

A cuboid can be sliced and modified by navigation Forecast data processor, if needed. The forecast data can be processed prior to sending to the customer in some implementations.

The navigation risk analysis engine service (RAS) disclosed in the priority application inputs a map and satellite orbits and outputs a forecast of line-of-sight, non-line-of-sight (LOS/NLOS) plus PDOP for each 1 $m^2$. RAS provides the ability to determine probability, ranking, and scoring of LOS/NLOS, out-of-view navigation satellites in a navigation obscuration forecast, using historical satellite orbit and atmospheric models from Spirent SimGEN/POSApp/SimOrbit and treating each satellite as a transmission point in the sky. The disclosed technology uses a surveyed global 3D map with shape files and digital city maps (DCM) which show the dimensions of buildings, terrain, vegetation, and other obstacles to ray cast between selected points on the map, to determine if each satellite is blocked/obscured by objects in the 3D map that is based on the real world. The disclosed technology uses surveyed maps.

The technology previously disclosed included determining risk analysis of DOP band values and number of line of sight (LOS) satellites visible. Buffering areas based on variability are described. Buffering could also be applied to LOS counts.

In one example of determining risk analysis of DOP band values and number of line of sight (LOS) satellites visible, three sample days of historical data regarding satellite orbits are analyzed. This example analyzes a day 0 and two other days, ten and twenty days earlier than day 0. This is an example sampling for analysis.

The example of analyzing days 0, -10 and -20 is not crucial to generating a risk analysis. This span of 20 days was determined by detailed analysis of 200 plus consecutive days to be sufficient to reflect gradual drift in satellite orbits. Extrapolating from the detailed analysis, the parameters for analysis can be adjusted. For instance, a span of 15 days also would be sufficient to prepare a risk analysis, though more of a buffer or more frequent updating of the risk analysis may be needed if a narrower span of days is used. A longer span of days also can be used, at least for GNSS satellites, with a greater likelihood of capturing a satellite repositioning event in a longer span of days. Long term GNSS historical data is available covering years. In contrast, LEO satellite constellations are evolving quickly, so the short span of days 0, -10 and -20 is favorable. An extended LEO span of 90 to 100 days can be used. For GNSS satellites, a span of 365 days or more could be used for risk analysis. A long span inevitably captures multiple satellite launch and repositioning events. Capturing more of these unique events does not enhance the risk analysis, because past launch and repositioning events are unlikely to repeat, and the results of repositioning are quickly well settled. It has been observed that an individual GNSS satellite is unlikely to be positioned more often than once every five years, but LEO constellation reconfiguration is ongoing. Samples from three days, for instance, did not need to be separated by 10 days. Extrapolating from the detailed analysis, sampled days could be separated by five to 20 to 50 days, for instance. To save on compute, as time marches forward a day, previously computed days -11 and -21 could be reused instead of computing days -10 and -20. It is not necessary that the number of days between sample days be equal. The example sampling pattern includes three days was determined by detailed analysis to be sufficient. Extrapolating from prior detailed analysis, sampling of 4, 5 or 10 days could be used for risk analysis. Risk analysis based on data from six days, with the same frequency of analysis, would take about twice as much computing as three days. The technology disclosed entails a sampling pattern of 3 days or more; it is not expected that 100 or more sample days would be used for ongoing risk analysis, due to compute cost. In the detailed analysis, the sampling frequency within a day was each second. This could be decreased, either to improve computation efficiency or just to reduce compute cost. For instance, sample could be taken each five or ten seconds. Upon detection of a transition, of a satellite becoming visible or invisible, the sampling frequency could be increased to every second, to determine to the second when the satellite appeared or disappeared from LOS. Alternatively, based on extrapolation from the detailed analysis, sampling each five, ten or sixty seconds could be chosen to reduce compute burden. With less frequent sampling as a basis for analysis, the refresh rate of published risk analyses should be more frequent. For instance, the example sampling of days 0, -10 and -20 on a second-by-second basis could be refreshed after four or six months. Less frequent sampling could lead to a weekly refresh rate of published risk analyses.

The DOP analysis can continue with processing DOP value bands on a histogram basis, for faster processing. Six DOP value bands of 1 or better can be used, such as bands 1-2, 2-5, 5-10, 10-20 and >20. Translated into qualitative labels, these PDOP value bands or classes can be described as: "IDEAL" [0-1); "EXCELLENT" [1-2); "GOOD" [2-5); "MODERATE" [5-10); "FAIR" [10-20); "POOR" [20+); "NO DOP". e.g., "IDEAL" corresponds to a PDOP from 0 to 1, with the rounded training parenthesis indicting that exactly 1 pushes from the ideal into the excellent class. Other or fewer bands could be used, with a threshold between good enough and not good enough being the most important threshold. From the banded analysis, a score of 5 can be used as a predetermined threshold for adequate coverage or a score in a in a of range of 4 to 7. Qualitatively, EXCELLENT and GOOD scores (top two bands) can be used as adequate navigation coverage. A histogram is a count of instances in which the DOP value band falls into one of the six classes. This simplified distribution of DOP values, in bands, was determined by detailed analysis, to be sufficient for risk analysis. It could be replaced with alternative statistical calculations that require greater computation. Or, only minimums and maximums, or two to twenty minimums and maximums, could be collected. There are many ways to determine various ands.

Processing of DOP values into bands can be used to determine worst and best DOP values for each day and to determine a 90th percentile DOP. Output of the worst/best determination can be used to produce a best DOP overall, across the days sampled, a worst DOP overall, and areas of high variability between DOP values. The worst DOP overall and the areas of high variability can be combined, along with empirical data from similar environments to determine a suitable buffer zone, in a buffer area determination that extends worst case areas of inadequate DOP with a buffer zone. This buffer zone reduces risk that when flying along or across a border between adequate and inadequate GNSS coverage. Input to determination of a suitable buffer zone can flow from the forecast data, building height and density map data and identification of satellite constellations used in forecasts. The impact of building height on the size of the buffer zone is expected to be significant.

Supposing calculations are preformed using latitude and longitude values, those coordinates can be converted into cuboids or polygons with unique ids, such as 1 m×1 m polygons. The cuboids or polygons can be output as images or shapefiles.

Processing of LOS satellite counts can be used to determine worst and best LOS values for each day and to determine a 90th percentile DOP. Output of the worst/best determination can be used to produce a best LOS overall, across the days sampled, a worst LOS overall, and areas of high variability between LOS values.

Again, supposing calculations are preformed using latitude and longitude values, those coordinates can be converted into cuboids or polygons with unique ids, such as 1 m×1 m polygons. The cuboids or polygons can be output as images or shapefiles.

Worst-case DOP risk analyses can be used to reduce reliance on and even computation of forecast data, such as data used to route a drone. From worst-case DOP risk analysis, considered-good cuboids can be identified as consistently having adequate navigation signal coverage. The considered-good cuboids meet a criteria of having adequate navigation signal coverage so much of the time that real time forecasts are not needed, that the considered-good cuboids are always consider to have adequate signal coverage.

The technology disclosed includes consolidating considered-good cuboids and/or applying spatial compression to adjoining considered-good cuboids. Temporal compression is not needed, when the considered-good state applies to a whole forecasting horizon.

With or without compression, a considered-good state of an area of cuboids can be taken into account during forecasting. A cuboid that is considered-good for a forecasting horizon does not require a second-by-second, minute-by-minute or other forecast, because risk analysis already has cleared the cuboid.

On the CDN, the considered-good cuboids can be treated with extreme temporal compression (for the whole time horizon) or can be conveyed as a separate block of data. When a route is calculated, segments of the route can be marked as passing through considered-good cuboids. Then, any real time, update queries for FAN data can be limited to segments through cuboids that are not considered-good. There is no need for detailed forecast data along segments that are marked considered-good.

Applied to the drone routing use case, when both the starting position and destination are safe to fly and there is a connecting route, the route can be plotted using just the worst-case risk analysis. If a route cannot be plotted based on the worst-case risk analysis, analysis can proceed to use detailed forecast data. Assuming that the starting point and destination are outside the never fly zones, prediction data can be obtained to find a safe time to fly or to schedule a route at a particular time. The forecasting technology previously disclosed can be used to generate a series of snapshots for a selected time span, either literally or in prediction data with associated times. A route can be plotted using this granular forecast data.

The inventors have considered how long a worst-case risk analysis from GNSS data remains reliable, when derived from data for days 0, −10 and −20. Minor satellite maneuvers and major satellite maneuvers have been observed as having the greatest impact over time on DOP reliability, either decreasing or increasing reliability. LEO reliability is expected to show steady increases as constellations grow with new satellite launches. With each satellite fleet launch, there will be a period of highly dynamic coverage, as satellites are maneuvered into their intended orbits.

The technology disclosed can be configured to watch for satellite launches maneuvers, either in orbit data reported from the satellites or in data produced by a daily risk analysis of data. The orbit data from satellites is more efficiently analyzed to select days on which worst- and best-case analyses should be refreshed. Risk analysis can be refreshed whenever a constellation fleet launch or major satellite maneuver is apparent in the reported data. Or risk analysis can be partially performed to evaluate whether a full, out of schedule refresh of a published risk analysis should be performed. If there is a really big change from one day to the next in DOP, 1½ to 2 percent change. Or, a large change from the start to the present, e.g., change in DOP of 5 percent. Then, update risk analysis out of cycle, early.

The similarity regardless of calculation interval is due to linear change in satellite orbits. The majority of difference between daily cumulative count and 10- or 20-day cumulative count is caused by satellite launches and maneuvers. The satellite geometry is changed by a maneuver, which can be immediately accounted for in a daily count. Changed geometry is unlikely to be recognized in a 10- or 20-day cumulative count until several days after the maneuver, due to smoothing. Based on one day differences, a maneuver could be recognized, and a forecast immediately refreshed, when the maneuver is highly significant. Still, a maneuver of a particular satellite vehicle is unlikely to be repeated between refreshes of a risk analysis, as satellite maneuvers are separated over a large scale of time, such as once every five years for GNSS satellites.

Buffers are extended zones, in which the worst-case analysis restricts flying and requires further analysis. A buffer is larger around some map features than others, which may produce an irregularly shaped buffer zone.

Tall buildings have create larger shadows of inadequate navigation coverage. In one worst case for Aug. 16, 2021, increasing the height of the building caused an increased no fly zone. Accordingly, a larger buffer can be provided for a tall building. For instance, a 4-meter buffer is used for a building 7.25 meters average height, then a 7-meter buffer may be appropriate for a building 5 meters taller, 12.25 meters on average. Buffer zones of two to ten meters work well. Based on the data analyzed here, these buffers produced good results for GNSS through 180 days, until a satellite maneuver significantly impacted the prediction.

For reference, an example of data generated for a 1 $Km^2$ output buffer of RAS, with the Azimuth/Elevation, LOS and PDOP data is described for each 100×100 m area. Each RAS output file can contain a tiles worth of data for best-case and worst-case risk analyses. In one implementation with each LOS file estimated to be in the range of 50-60 MB in size. For a 1 $Km^2$ area at 1 m resolution to be refreshed after 4 to 6 months, the size is approximately 5 GB. For an example, scaled up to 6000 $Km^2$ the size is approximately. The size of risk analysis data files motivates compression.

Compression of GNSS Forecast data can be segmented into three types of compression: spatial, temporal, and mathematic compression. Disclosed compression-related parameters are described for the DeviceAPI.proto files above.

Spatial compression analyzes each cuboid or point in the GNSS point cloud based on location. Spatial compression analyzes the similarities and differences of the data of one cuboid to the cuboids around it, in a way that is similar to the way a video pixel is compressed based on the pixels around it (left, right, above, below, etc.). If the data in the adjacent or nearby cuboids is the same or similar, compression can be applied. A lossless compression searches for identical cuboids, encodes one fully with all the data, and then cuboids with the same data point to the reference cuboid with the full information. A lossy compression method applies a threshold to look for cuboids that have small differences relative to the reference cuboid, determines that the difference is not inconsequential to the user and points those cuboids to the reference cuboid. Another compression method changes the size of the cuboid to cover a larger area instead of using pointers. As an example, if a 1-meter cubed cuboid (1 m×1 m×1 m) has the same or similar data as three adjacent cuboids, the system can change the size of the cuboid to cover the total area with one data set. That is, the size of the cuboid would be changed to 3 m×1 m×1 m).

Spatial compression can be complemented by using different resolutions in different environment types. An urban canyon may require 1 m resolution, while a rural area may use 3 m resolution or non-cuboids, such as 3 m×3 m×10 m or 5 m×5 m×100 m or 10 m×10 m×1000 m or in any range that includes any of these resolutions.

The extreme of temporal compression is the considered-good areas identified by risk analysis. One prediction applies for the whole time horizon, because the area or cuboid is considered good.

Temporal compression analyzes each cuboid or point in the GNSS point cloud based on location and time. Temporal compression analyzes the similarities and differences of the data of one (or more) cuboid(s) over time. If the data of one or more cuboids are the same or similar over multiple time periods, compression can be applied. Either lossless or lossy compression can be used. A lossless compression, for instance based on run length encoding, looks for cuboids that do not change over multiple time periods, encodes one fully with all the data and then cuboids with the same data point to the reference cuboid with the full information. A lossy compression method, with banding or quantization, applies a threshold to look for cuboids that have small differences to the reference cuboid, determines that the difference is not inconsequential to the user and point those cuboids to the reference cuboid's time period and data. Another compression method changes the valid time period of a cuboid to cover a longer time instead of using pointers. As an example, if a 1-meter cubed cuboid (1 m×1 m×1 m) valid for one second has the same or similar data to the same cuboids over the next 29 seconds, a single cuboid and data can be stored with a 29 second valid period instead of 1 second valid period.

Spatial and temporal compressions can be combined to compress based on the similarities and differences of cuboids over the forecasted area and time. For example, a cuboid in one location and time can be the same as another cuboid in a different location and time. These cuboids can be compressed as a reference to an original cuboid and how it moves over time, in a way similar to methods used in video compression.

Mathematic compression looks at patterns in the data with or without reference to temporal or spatial information. Similar patterns are mathematically compressed. Hashes compress similar data mathematically. For instance, if there is a common combination of data such as satellite positions, visibility, DOP values, etc., these can be hashed and compressed.

The prior patent disclosed the very large amount of data that needs to be distributed via a CDN in order to provide real time signal availability and/or quality forecasts. It is estimated that more than half of terrain for which forecasts are likely to be distributed can be shown to have little or no risk of signal unavailability. It is cheaper and easier to distribute long term data for these considered-safe areas than to encode these areas using the time of availability forecasts that apply to cuboids for areas that only sometimes have good signal availability. This is particularly true for areas that have fewer buildings, flatter terrain and few other obstructions. These areas may have different satellites available at different times, but if they are nearly always sufficient for communication and or navigation there is no need to continuously predict what it is considered good.

The navigation risk analysis engine service (RAS) disclosed in the priority application inputs a map and satellite orbits and outputs a forecast of line-of-sight, non-line-of-sight (LOS/NLOS) plus PDOP for each 1 m2. RAS provides the ability to determine probability, ranking, and scoring of LOS/NLOS, out-of-view navigation satellites in a navigation obscuration forecast, using planned satellite orbit and atmospheric models from Spirent SimGEN/POSApp/SimOrbit and treating each satellite as a transmission point in the sky. The disclosed technology uses a surveyed global 3D map with shape files and digital city maps (DCM) which show the dimensions of buildings, terrain, vegetation, and other obstacles to ray cast between selected points on the map, to determine if each satellite is blocked/obscured by objects in the 3D map that is based on the real world. The disclosed technology uses surveyed maps.

Planned LEO satellite orbits can be used to assist in the design of LEO constellations. Many LEO constellations are not yet launched into orbit and are in the design phase. Companies building LEO constellations need to determine the quality and coverage of their services. In one example the final LEO constellation configuration can be input into the RAS to determine the LOS, NLOS, and PDOP for each 1 m2. If the resulting LOS, NLOS, and PDOP is better or worse than desired the LEO constellation configuration can be adjusted and run iteratively until the desired LOS, NLOS, and PDOP is achieved for the areas of interest. In a another example partial LEO constellation configuration can be input into the RAS to determine the LOS, NLOS, and PDOP for each 1 m2. The resulting LOS, NLOS, and PDOP for the partial configuration can help the LEO companies determine when the minimum viable service is reached for each 1 m2. This enables LEO companies to determine service availability for customers on a building-by-building basis versus existing methods that look at areas as large as fifty square miles and often rule out city environments with partial LEO constellations. As LEO companies plan and launch additional sets of LEO satellites, they can forecast each partial LEO constellation configuration to determine service quality, determine new areas that meet the minimum viable service and expand their customer base.

Method for Signals of Opportunity

Unlike GNSS or dedicated navigation signals, most LEO satellite signals are for communications. These non PNT LEO signals can be used as signals of opportunity to generate a position fix on the Earth and be used for navigation. For communications, a LEO NTN constellation can be used if the signals are blocked or reflected as long as the signal strength is sufficient. This is not true for navigation. When a signal is reflected the signal is delayed when compared to a line of sight (LOS) signal. This additional delay creates an error in the calculation of position. Typically, code and Doppler based methods are used to determine the distance the receiver is from each satellite and trilateration of the position. Additional methods of using the satellite signals time and phase can be used to calculate a position. If the signal is delayed by reflection, the additional time error results in an error in the satellite distance calculation, and thus the position estimation of the receiver on the Earth. Providing a LEO receiver with the line-of-sight LEO satellites aids the receiver in choosing satellite signals that have no reflections and are the best to be used as a signal of opportunity for position and navigation. Providing a LEO receiver with the non-line-of-sight LEO satellites and the amount of multipath or delay aids the receiver in choosing satellite signals that have minimal reflections and potentially correct the delays when using LEO as a signal of opportunity for position and navigation.

LEO NTN communications services operate at higher radio frequencies than LEO PNT navigation signals or GNSS signals. The higher radio frequency when combined with the shorter latency of communications, and speed of the satellites at LEO creates a larger doppler shift when compared to LEO PNT or GNSS. The larger doppler shift impacts the ability to measure position based on doppler. By providing a receiver the LOS satellites (based on 3D city modeling methods), elevation, and azimuth doppler can be more accurately determined compared to using non line of sight satellite signals.

Reference: Ferre, Ruben & Lohan, Elena Simona & Falco, Gianluca & Falletti, Emanuela. (2020). GDOP-based analysis of suitability of LEO constellations for future satellite-based positioning. 147-152. 10.1109/Wi-SEE44079.2020.9262624.

LEO NTN communications services can be used as a signal of opportunity to generate a position fix on the Earth and be used for navigation. In order to determine if the area a device, vehicle, or aircraft is operating in can use the LEO communications signals as a signal of opportunity a DOP can be calculated for the area based on the LOS of the LEO NTN satellites. A DOP calculation for LEO NTN would not normally be done because LEO NTN satellites are not primarily used for navigation. By providing a device, vehicle, or aircraft with a DOP of the LEO NTN satellites the integrity of navigation is known before the device, vehicle, or aircraft enters the area or uses the signals for navigation. If the LEO NTN DOP is too high, meaning it is not suitable for navigation, the device, vehicle, or aircraft will know that the LEO NTN signals cannot be used and alternative navigation methods must be used. Knowing this before searching for LEO NTN signals of opportunity saves power and ensures integrity of the navigation system. If LEO NTN DOP is low, meaning it is cuticle for navigation, knowing it in advance greatly improves situational awareness, integrity, and enables path planning.

LEO NTN signals of opportunity are typically used without any communication or business relationship with the LEO NTN provider. The signals are used as a free source of navigation and comes with some cyber security risk. False LEO NTN signals could be transmitted by a bad actor and possibly used by a device, vehicle, or aircraft. One benefit of a LEO NTN LOS forecast is the ability for the LEO NTN receiver to compare the signal strength of the received signals with the forecasted signals accounting for signal loss due to 3D building and terrain models. This comparison can help authenticate signals for use as a signal of opportunity. For example, without a forecast of signal strength due to 3D building and terrain a signal should uniformly increase as the LEO NTN satellite rises over the horizon to the maximum elevation and then decrease as it falls to the horizon. A LEO NTN forecast using 3D building and terrain models will predict unique changes in signal strength across the entire horizon as the LEO NTN satellite is LOS and then becomes obstructed by buildings, NLOS, with a reduced signal strength, and then LOS as the LEO NTN satellites becomes no longer blocked by a building. These oscillations in signal strength as each LEO NTN satellite crosses the horizon becomes LOS and NLOS again and again creates a unique signature that can be used to authenticate each LEO NTN satellite compared to a false signal that may have a constant signal strength or a uniform gradient. The unique signal strength forecasts can also be used as a part of the position calculation using code, doppler, and other methods that can account and potentially remove the impact of the variations versus a uniform gradient that is assumed in current implementations.

Some Particular Implementations

We describe some particular implementations and features usable for providing dilution of precision (DOP) forecasts for LEO navigation for routing of vehicles, aircraft, alerting humans in vehicles, or wireless devices; and for providing bandwidth forecasts for LEO communications next.

In one implementation, the disclosed method provides dilution of precision (abbreviated DOP) forecasts for Low Earth Satellite (LEO) constellations providing Position Navigation and Time (PNT) signals or Non-Terrestrial Networking (NTN) Communications signals, collectively referred to as LEO signals, used for navigation for routing of vehicles, aircraft, alerting humans in vehicles, or wireless devices. This method includes accessing a 3D map of an area including structure solids and generating cuboids in spaces not contained in the structure solids and, iteratively over time increments, calculating LEO satellites visible from the cuboids using the 3D map and, using at least the calculated visibility, determining a DOP forecast for LEO signals observable in the cuboids at the time increments. It involves compressing the determined DOP forecast spatially and temporally. The compressed DOP forecast is distributed via a content delivery network (abbreviated CDN), responsive to queries from requestors to an API of the CDN, whereby systems of the requestors can take into account the DOP forecast for routing the vehicles or alerting the humans in the vehicles to a predicted navigation impairment.

Some implementations are based particularly on LEO-PNT positioning signals. Others are based particularly on LEO-NTN communication signals, used as signals of opportunity, even though they were not originally intended to be used for positioning. Implementations based on LEO-NTN communication signals can take into account beamforming by particular satellites in determining whether those satellites will effectively be available to provide a signal of opportunity. The beamforming plan needs to be obtained from the satellite operators. Future implementations will use new formats of signals from LEO satellites.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

Again, the LEO signal is sometimes a LEO-NTN signal. With this signal, the DOP forecast can take into account doppler shifts of LEO signal based the LEO satellites visible, based on elevation above the horizon of respective LEO satellites. The LEO doppler shifts are more pronounced than GNSS doppler shifts, especially when a LEO satellite is nearly overhead.

Again, the LEO signal can be a LEO-PNT signal.

Practicing the 3D analysis, the area can be an urban environment and the solid structures include buildings of ten floors or more. The 3D analysis can include applying trigonometric triangulation factors when determining the dilution of precision forecasts for LEO PNT navigation using the LEO satellites visible by ray casting using predicted shadow masks from the cuboids. It can include calculating and distributing a degree of confidence measure with the dilution of precision forecasts of the LEO satellites.

The method further can include forecasting a degree of multipathing, using ray casting or ray tracing between the satellites, reflective surfaces, and the cuboids, taking into account reflections and distributing the forecast degree of multipathing via the content delivery network. It can include forecasting multipathing of signals from particular satellites, using ray casting or ray tracing between the satellites, reflective surfaces, and the cuboids, and taking into account multipath reflections in the dilution of precision forecasts. It also can include forecasting multipathing of signals from particular satellites, using ray casting or ray tracing between the satellites, reflective surfaces, and the cuboids, and distributing information about the forecasting of signal from the particular satellites via the content delivery network.

The vehicles mentioned can be wheeled vehicles, further including the 3D map including streets and limiting the cuboids to streets navigable by the wheeled vehicles. They can be autonomous capable, and that further have a driver onboard. Autonomous vehicles can use a navigation component onboard the vehicle, look ahead through a forecast along a path the vehicle is following, determine that a degraded LEO navigation dilution of precision will be encountered, and alert the driver at least a predetermined time before the encounter.

The vehicles can be flying taxis, autonomous capable, and that further have a pilot onboard. Flying taxis can use using a navigation component onboard the autonomous taxi, look ahead along a path the taxi is following, determine that a degraded LEO navigation dilution of precision will be encountered, and alert the pilot at least a predetermined time before the encounter.

Another method that applies aspects of the technology disclosed complements generating forecasts is directed to obtaining and acting upon dilution of precision forecasts for Low Earth Satellite (LEO) constellations providing Position Navigation and Time (PNT) signals or Non Terrestrial Networking (NTN) Communications signals, collectively referred to as LEO signals, used for routing of vehicles or alerting humans in vehicles. This method includes sending a request to an API to a CDN for a dilution of precision forecast, the request specifying an area to which the request applies. A compressed dilution of precision forecast represents forecasts for cuboids in spaces not contained in structure solids represented on a 3D map of an area. The forecasts have been produced by iterative calculations over time increments, of LEO satellites visible from the cuboids using the 3D map, incorporated into the dilution of precision forecast for the cuboids at the time increments. The method includes receiving responsive parts of the dilution of precision forecast and, responsive to the dilution of precision forecast, selecting a route to a destination that avoids subareas of impaired LEO precision or alerting the humans in the vehicle to a predicted navigation impairment.

The features described above and/or features described can each individually and in combination be practiced with this method and additional methods. In the interest of conciseness, the combinations of features disclosed in this application are not individually enumerated and are not repeated with each base set of features. The reader will understand how features identified in this section can readily be combined with sets of base features identified as implementations.

A further method that practices aspects of the technology disclosed provides available bandwidth forecasts for Low Earth Satellite (LEO) constellations providing Non-Terrestrial Network (NTN) services for broadband communication. This method includes accessing a 3D map of an area including structure solids and generating cuboids in spaces not contained in the structure solids and, iteratively over time increments, calculating LEO NTN satellites visible from the cuboids using the 3D map and, using at least the calculated visibility, determining a bandwidth forecast for LEO NTN signals observable in the cuboids at the time increments. The method can take into account bandwidth available from LEO NTN satellites that are partially or completely obscured, from which reflected or multi-pathed signals are received. The also method can take into account beamforming by the LEO NTN satellites that focuses broadcasts from and reception by the LEO NTN satellites. A determined bandwidth forecast is compressed spatially and temporally and distributed via a content delivery network (abbreviated CDN), responsive to queries from requestors to an API of the CDN, whereby systems of the requestors can take into account the bandwidth forecast for communication.

The technology disclosed further includes methods, CRMs and systems for using statistical analysis of GNSS dilution of precision over time to determine areas that have statistically sufficient performance that performing continuous calculations of satellite line-of-sight is not needed. One implementation is a method of reducing computing required and compressing satellite visibility forecast data for delivery via a CDN. This method includes calculating for an extended period of time, exceeding 1 week, whether a GNSS signal will be visible. Calculating includes accessing a 3D map of an area including structure solids and generating cuboids in spaces not contained in the structure solids. Iteratively over time increments, the method proceeds with calculating visibility of navigation satellites, taking into account GNSS, LEO-PNT and/or LEO-NTN satellites, consistent with navigation receiver capabilities, the navigation satellites calculated to be visible from the cuboids using the 3D map and, using at least the calculated visibility, determining a DOP forecast for positioning signals observable from the satellites in the cuboids at the time increments. Calculating incudes identifying and saving as considered-good cuboids for which the DOP forecast exceeds a configurably adequate threshold level for a predetermined percentage of time over the time increments. The method involves periodically accessing the 3D map of an area and the cuboids in spaces not contained in the structure solids to generate forecasts of satellite visibility. Periodic recalculations exclude from iterative calculations the considered-good cuboids. The recalculations include calculating iteratively over time increments navigation satellites visible from the cuboids using the 3D map and, using at least the calculated visibility, determining a DOP forecast for positioning signals observable from the satellites in the cuboids at the time increments. The method further includes compressing the considered-good cuboids and the determined DOP forecast spatially and temporally and distributing the compressed considered-good and DOP forecast via a content delivery network (abbreviated CDN), responsive to queries from requestors to an API of the CDN. As a result, systems of the requestors can take into account the DOP forecast for routing the vehicles or alerting the humans in the vehicles to a predicted navigation impairment.

In some implementations, the particular navigation satellites used are LEO-PNT satellites. In some implementations, the configurably adequate threshold is met when the precision of navigation signal coverage satisfies requirements of a Federal Aviation Administration (FAA).

Various implementations use data for risk analysis in any of the ranges given above. In some implementations, the historical navigation satellite path data includes three to ten non-consecutive days. The non-consecutive days can be separated by 5 to 20 days. The sampling can be conducted on an interval between once per half-second and once per 90 seconds. The range of hours of historical navigation satellite path data is between 12 to 24 hours.

Buffer zones can be included in methods that practice the technology disclosed. For instance, the forecasts of satellite visibility can include inadequate coverage zones. Then, the generating further includes padding worst zones with a buffer zone that extends outward from the inadequate coverage zones up to 10 meters. Alternatively, the buffer zone can extend outward up to 5 meters. With any of the buffer zones, using the historical satellite data, a best-case risk analysis can be generated for the region of calculation that reveals cuboids in which, for at least a period of time in the historical GNSS satellite path data, a time-sensitive route is available. The best-case analysis can be distributed in response to a request covering the region of interest.

Routing when a path through considered-good cuboids is unavailable or not desirable can be practiced by requesting and receiving a forecast for at least the requested range of time covering at least the likely route. Then, by finding in the forecast at least one time during which the drone can fly from the starting location to the destination through the cuboids that have the configurably adequate navigation coverage for a period within the range of time.

The technology disclosed yet further includes a method for using statistical analysis of GNSS dilution of precision over time to determine areas that have statistically sufficient performance that performing continuous calculations of satellite line-of-sight is not needed.

One method implementation reduces reducing computing required and improves compression satellite visibility forecast data for delivery via a CDN This method includes calculating for an extended period of time, exceeding 1 week, whether a GNSS signal will be visible. Calculating includes accessing a 3D map of an area including structure solids and generating cuboids in spaces not contained in the structure solids. It includes iteratively over time increments, calculating visibility of navigation satellites taking into account GNSS, LEO-PNT and/or LEO-NTN satellites, consistent with navigation receiver capabilities, the navigation satellites calculated to be visible from the cuboids using the 3D map and, using at least the calculated visibility, determining a DOP forecast for positioning signals observable from the satellites in the cuboids at the time increments. It includes identifying and saving as considered-good cuboids for which the DOP forecast exceeds a configurably adequate threshold level for a predetermined percentage of time over the time increments.

The calculating is applied periodically by accessing the 3D map of an area and the cuboids in spaces not contained in the structure solids to generate forecasts of satellite visibility. The periodic recalculation includes excluding from iterative calculations the considered-good cuboids, calculating iteratively over time increments navigation satellites visible from the cuboids using the 3D map and, using at least the calculated visibility, determining a DOP forecast for positioning signals observable from the satellites in the cuboids at the time increments. The considered-good cuboids and the determined DOP forecast are compressed spatially and temporally. The compressed results are distributed via a content delivery network (abbreviated CDN), responsive to queries from requestors to an API of the CDN, whereby systems of the requestors can take into account the DOP forecast for routing the vehicles or alerting the humans in the vehicles to a predicted navigation impairment.

In some implementations, the navigation satellites used are LEO-PNT satellites.

In some implementations, the configurably adequate threshold is met when the precision of navigation signal coverage satisfies requirements of a Federal Aviation Administration (FAA).

Various implementations use data for risk analysis in any of the ranges given above. In some implementations, the historical navigation satellite path data includes three to ten non-consecutive days.

Various implementations use data for risk analysis in any of the ranges given above. In some implementations, the historical navigation satellite path data includes three to ten non-consecutive days. The non-consecutive days can be separated by 5 to 20 days. The sampling can be conducted on an interval between once per half-second and once per 90 seconds. The range of hours of historical navigation satellite path data is between 12 to 24 hours.

Buffer zones can be included in methods that practice the technology disclosed. For instance, the forecasts of satellite visibility can include inadequate coverage zones. Then, the generating further includes padding worst zones with a buffer zone that extends outward from the inadequate coverage zones up to 10 meters. Alternatively, the buffer zone can extend outward up to 5 meters. With any of the buffer zones, using the historical satellite data, a best-case risk analysis can be generated for the region of calculation that reveals cuboids in which, for at least a period of time in the historical GNSS satellite path data, a time-sensitive route is available. The best-case analysis can be distributed in response to a request covering the region of interest.

Routing when a path through considered-good cuboids is unavailable or not desirable can be practiced by requesting and receiving a forecast for at least the requested range of time covering at least the likely route. Then, by finding in the forecast at least one time during which the drone can fly from the starting location to the destination through the cuboids that have the configurably adequate navigation coverage for a period within the range of time.

Another aspect of the technology disclosed extends to generating and comparing statistical analysis of LEO dilution of precision, bandwidth, or line of sight satellites using different orbital configurations to compare the resulting dilution of precision, bandwidth, or line of sight satellites to optimize the orbital configuration.

A method implementation of the technology disclosed provides for selecting orbit configurations for Low Earth Satellite (LEO) constellations providing Position Navigation and Time (PNT) or Non Terrestrial Networking (NTN) Communication satellites, collectively referred to as LEO satellites, including a number of satellites, orbital path, orbital shells, and orbital planes for LEO satellite deployment. This method begins with satellite orbit data for existing LEO satellites and with locations of interest for evaluating satellite deployment. With existing satellites, the method includes calculating for an extended period of time, exceeding 1 week, whether a LEO signal will be visible throughout the locations of interest The calculating includes, accessing a 3D map of an area including structure solids and generating cuboids in spaces not contained in the structure solids, iteratively over time increments, calculating LEO satellites visible from the cuboids using the 3D map and, using at least the calculated visibility, determining a DOP forecast for positioning signals observable from the satellites in the cuboids at the time increments, and saving time series evaluations of the cuboids throughout the locations of interest.

In addition to using existing satellites, the method includes using alternative proposed satellite deployments. For the alternative deployments, calculating for the extended period of time, exceeding 1 week, whether the LEO signal from the alternative proposed satellite deployments will be visible throughout the locations of interest. As above, this calculating includes accessing the 3D map of an area including structure solids and generating cuboids in spaces not contained in the structure solids, iteratively over time increments, calculating proposed satellite deployments visible from the cuboids using the 3D map and, using at least the calculated visibility, determining a DOP forecast for positioning signals observable from the proposed satellite deployments in the cuboids at the time increments, and comparing the time series evaluations of the cuboids for the existing satellites with calculated results for the proposed satellite deployments and contrasting the alternative proposed satellite deployments for effectiveness in improving positioning in the locations of interest.

This method can further include receiving data for intended beamforming by the alternative satellite deployments and using the beam forming information in the calculating for the extended period of time.

The preceding method applies to bandwidth analysis, in addition to positioning coverage analysis. In the steps above for analysis of positioning, determining the amount of LEO-NTN signal bandwidth that will be available in the cuboids at the time increments replaces DOP for positioning coverage. After calculations, the method includes comparing time series evaluations of the cuboids for the existing satellites with calculated results for the proposed satellite deployments and contrasting the alternative proposed satellite deployments for effectiveness in improving positioning in the locations of interest.

As above, this method can further include receiving data for intended beamforming by the alternative satellite deployments and using the beam forming information in the calculating for the extended period of time.

All of the foregoing methods translate into a non-transitory computer readable medium (CRM) loaded with program instructions that, when executed on processors, cause the processors to become operable to perform a method that practices an aspect of the technology disclosed. Similarly, all of the foregoing methods translate into a system comprising one or more computing devices with processors, memory coupled to the processors and computer instructions loaded into the memory, for instance from a CRM, the system configured to perform any of the disclosed methods of selecting orbit configurations. Any of the technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of providing dilution of precision (abbreviated DOP) forecasts for Low Earth Satellite (LEO) constellations providing Position Navigation and Time (PNT) signals or Non Terrestrial Networking (NTN) Communications signals, collectively referred to as LEO signals, used for navigation for routing of vehicles, aircraft, alerting humans in vehicles, or wireless devices, including:
    accessing a 3D map of an area including structure solids and generating cuboids in spaces not contained in the structure solids;
    iteratively over time increments, calculating LEO satellites visible from the cuboids using the 3D map and, using at least the calculated visibility, determining a DOP forecast for LEO signals observable in the cuboids at the time increments;
    compressing the determined DOP forecast spatially and temporally; and
    distributing the compressed DOP forecast via a content delivery network (abbreviated CDN), responsive to queries from requestors to an API of the CDN, whereby systems of the requestors can take into account the DOP forecast for routing the vehicles or alerting the humans in the vehicles to a predicted navigation impairment.

2. The method of claim 1, wherein the LEO signal is a LEO-NTN signal, wherein the DOP forecast takes into account doppler shifts of LEO signal based the LEO satellites visible, based on elevation above the horizon of respective LEO satellites.

3. The method of claim 1, wherein the LEO signal is a LEO-PNT signal.

4. The method of claim 1, wherein the area is an urban environment and the solid structures include buildings of ten floors or more.

5. The method of claim 1, further including applying trigonometric triangulation factors when determining the dilution of precision forecasts for LEO PNT navigation using the LEO satellites visible by ray casting using predicted shadow masks from the cuboids.

6. The method of claim 1, further including calculating and distributing a degree of confidence measure with the dilution of precision forecasts of the LEO satellites.

7. The method of claim 1, further including forecasting a degree of multipathing, using ray casting or ray tracing between the satellites, reflective surfaces, and the cuboids, taking into account reflections and distributing the forecast degree of multipathing via the content delivery network.

8. The method of claim 1, further including forecasting multipathing of signals from particular satellites, using ray casting or ray tracing between the satellites, reflective surfaces, and the cuboids, and taking into account multipath reflections in the dilution of precision forecasts.

9. The method of claim 1, further including forecasting multipathing of signals from particular satellites, using ray casting or ray tracing between the satellites, reflective surfaces, and the cuboids, and distributing information about the forecasting of signal from the particular satellites via the content delivery network.

10. The method of claim 1, wherein the vehicles are wheeled vehicles, further including the 3D map including streets and limiting the cuboids to streets navigable by the wheeled vehicles.

11. The method of claim 1, wherein the vehicles are wheeled vehicles, that are autonomous capable, and that further have a driver onboard, further including:
using a navigation component onboard the vehicle:
looking ahead along a path the vehicle is following;
determining that a degraded LEO navigation dilution of precision will be encountered; and
alerting the driver at least a predetermined time before the encounter.

12. The method of claim 1, wherein the vehicles are flying taxis, autonomous capable, and that further have a pilot onboard, further including:
using a navigation component onboard the autonomous taxi:
looking ahead along a path the taxi is following;
determining that a degraded LEO navigation dilution of precision will be encountered; and
alerting the pilot at least a predetermined time before the encounter.

13. A non-transitory computer readable storage medium loaded with program instructions that, when executed on processors, cause the processors to become operable to perform a method as set out in claim 1.

14. A non-transitory computer readable storage medium loaded with program instructions that, when executed on processors, cause the processors to become operable to perform a method as set out in claim 11.

15. A system comprising one or more computing devices with processors, memory coupled to the processors and computer instructions from the non-transitory computer readable storage medium of claim 13 loaded into the memory, configured to perform the method of relaying dilution of precision forecasts.

16. A method of relaying dilution of precision forecasts for Low Earth Satellite (LEO) constellations providing Position Navigation and Time (PNT) signals or Non Terrestrial Networking (NTN) Communications signals, collectively referred to as LEO signals, for routing of vehicles or alerting humans in vehicles, including:
receiving at a content delivery network (abbreviated CDN) a compressed dilution of precision forecast, wherein the compressed dilution of precision forecast represents:
for cuboids in spaces not contained in structure solids represented on a 3D map of an area;
iterative calculations over time increments, of LEO satellites visible from the cuboids using the 3D map, incorporated into the dilution of precision forecast for the cuboids at the time increments;
receiving at an API to the CDN, queries from requestors; and
responding to the queries by providing responsive parts of the dilution of precision forecast;
whereby systems of the requestors can take into account the dilution of precision forecast for routing the vehicles or alerting the humans in the vehicles to a predicted navigation impairment.

17. The method of claim 16, further including the CDN receiving and distributing a degree of confidence measure with the dilution of precision forecasts responsive to the queries.

18. The method of claim 16, further including, responsive to a first query to the API, providing a manifest of available files responsive to the first query, then receiving a second query that selects some or all of the available files, and then responding to the second query by providing selected files, from the available files, containing the dilution of precision forecast.

19. A non-transitory computer readable storage medium loaded with program instructions that, when executed on processors, cause the processors to become operable to perform a method as set out in claim 13.

20. A non-transitory computer readable storage medium loaded with program instructions that, when executed on processors, cause the processors to become operable to perform a method as set out in claim 13.

21. A system comprising one or more computing devices with processors, memory coupled to the processors and computer instructions from the non-transitory computer readable storage medium of claim 19 loaded into the memory, configured to perform the method of relaying dilution of precision forecasts.

* * * * *